(12) United States Patent
Espiau et al.

(10) Patent No.: US 8,125,153 B2
(45) Date of Patent: *Feb. 28, 2012

(54) MICROWAVE ENERGIZED PLASMA LAMP WITH DIELECTRIC WAVEGUIDE

(75) Inventors: Frederick M. Espiau, Topanga, CA (US); Yian Chang, Los Angeles, CA (US)

(73) Assignee: Luxim Corporation, Sunnyvale, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 12/392,208

(22) Filed: Feb. 25, 2009

(65) Prior Publication Data

US 2009/0243488 A1 Oct. 1, 2009

Related U.S. Application Data

(63) Continuation of application No. 11/135,047, filed on May 23, 2005, now Pat. No. 7,525,253, which is a continuation of application No. 10/356,340, filed on Jan. 31, 2003, now Pat. No. 6,922,021, which is a continuation-in-part of application No. 09/809,718, filed on Mar. 15, 2001, now Pat. No. 6,737,809.

(60) Provisional application No. 60/222,028, filed on Jul. 31, 2000.

(51) Int. Cl.
    *H05B 37/00* (2006.01)
(52) U.S. Cl. ............................ 315/39; 315/248; 313/637
(58) Field of Classification Search .................... 315/39, 315/248, 338, 344; 313/637, 638
    See application file for complete search history.

(56) References Cited

U.S. PATENT DOCUMENTS

| | | |
|---|---|---|
| 3,179,213 A | 4/1965 | Kueime et al. |
| 3,641,389 A | 2/1972 | Leidigh |
| 3,787,705 A | 1/1974 | Bolin et al. |
| 3,826,950 A | 7/1974 | Hruda et al. |
| 3,860,854 A | 1/1975 | Hollister |
| 3,942,058 A | 3/1976 | Haugsjaa et al. |

(Continued)

FOREIGN PATENT DOCUMENTS

DE  195 32 780 A1  3/1997

(Continued)

OTHER PUBLICATIONS

Counter Statement Under Rule 7(3) In the Matter of : European Patent Application No. 01957305.4 (EP 1307899), in the Name of : Luxim Corporation dated Jan. 21, 2006 and in the Matter of: An Application Under Section 12 and 82 of Patents Act 1977 and Articles 1 and 3 of the Protocol on Recognition by Cervasion Limited (Counterstatement).

(Continued)

*Primary Examiner* — David Hung Vu
(74) *Attorney, Agent, or Firm* — Schwegman, Lundberg, & Woessner, P.A.

(57) ABSTRACT

A plasma lamp including a waveguide body comprising at least one dielectric material. The body is coupled to a microwave power source which causes the body to resonate in at least one resonant mode. A lamp chamber integrated with the body contains a bulb with a fill forming a light-emitting plasma when the chamber receives power from the resonating body. A bulb either is self-enclosed or an envelope sealed by a window or lens covering the chamber aperture. Embodiments disclosed include lamps having a drive probe and a feedback probe, and lamps having a drive probe, feedback probe and start probe, which minimize power reflected from the body back to the source.

20 Claims, 25 Drawing Sheets

U.S. PATENT DOCUMENTS

| | | | |
|---|---|---|---|
| 3,943,401 A | 3/1976 | Haugsjaa et al. |
| 3,993,927 A | 11/1976 | Haugsjaa et al. |
| 4,001,631 A | 1/1977 | McNeill et al. |
| 4,041,352 A | 8/1977 | McNeill et al. |
| 4,053,814 A | 10/1977 | Regan et al. |
| 4,206,387 A | 6/1980 | Kramer et al. |
| 4,359,668 A | 11/1982 | Ury |
| 4,485,332 A | 11/1984 | Ury et al. |
| 4,498,029 A | 2/1985 | Yoshizawa et al. |
| 4,504,768 A | 3/1985 | Ury et al. |
| 4,507,587 A | 3/1985 | Wood et al. |
| 4,507,597 A | 3/1985 | Trost |
| 4,607,242 A | 8/1986 | Cozzie |
| 4,633,128 A | 12/1986 | Roberts et al. |
| 4,633,140 A | 12/1986 | Lynch et al. |
| 4,652,790 A | 3/1987 | Wood |
| 4,673,846 A | 6/1987 | Yoshizawa et al. |
| 4,691,179 A | 9/1987 | Blum et al. |
| 4,749,915 A | 6/1988 | Lynch et al. |
| 4,795,658 A | 1/1989 | Kano et al. |
| 4,887,192 A | 12/1989 | Simpson et al. |
| 4,902,935 A | 2/1990 | Wood |
| 4,908,492 A | 3/1990 | Okamoto et al. |
| 4,950,059 A | 8/1990 | Roberts |
| 4,954,755 A | 9/1990 | Lynch et al. |
| 4,975,625 A | 12/1990 | Lynch et al. |
| 4,978,891 A | 12/1990 | Ury |
| 5,021,704 A | 6/1991 | Walker et al. |
| 5,039,903 A | 8/1991 | Farrall |
| 5,051,663 A | 9/1991 | Ury et al. |
| 5,070,277 A | 12/1991 | Lapatovich |
| 5,072,157 A | 12/1991 | Greb et al. |
| 5,077,822 A | 12/1991 | Cremer |
| 5,086,258 A | 2/1992 | Mucklejohn et al. |
| 5,113,121 A | 5/1992 | Lapatovich et al. |
| 5,227,698 A | 7/1993 | Simpson et al. |
| 5,313,373 A | 5/1994 | Bjorner et al. |
| 5,334,913 A | 8/1994 | Ury et al. |
| 5,361,274 A | 11/1994 | Simpson et al. |
| 5,404,076 A | 4/1995 | Dolan et al. |
| 5,438,242 A | 8/1995 | Simpson |
| 5,448,135 A | 9/1995 | Simpson |
| 5,498,937 A | 3/1996 | Korber et al. |
| 5,525,865 A | 6/1996 | Simpson |
| 5,541,475 A | 7/1996 | Wood et al. |
| 5,548,182 A | 8/1996 | Bunk et al. |
| 5,594,303 A | 1/1997 | Simpson et al. |
| 5,786,667 A | 7/1998 | Simpson et al. |
| 5,789,863 A | 8/1998 | Takahashi et al. |
| 5,814,951 A | 9/1998 | Smolka et al. |
| 5,831,386 A | 11/1998 | Turner et al. |
| 5,841,242 A | 11/1998 | Simpson et al. |
| 5,866,980 A | 2/1999 | Dolan et al. |
| 5,903,091 A | 5/1999 | MacLennan et al. |
| 5,910,710 A | 6/1999 | Simpson |
| 5,910,754 A | 6/1999 | Simpson et al. |
| 5,923,116 A | 7/1999 | Mercer et al. |
| 5,926,079 A | 7/1999 | Heine et al. |
| 5,949,180 A | 9/1999 | Walker |
| 6,005,332 A | 12/1999 | Mercer |
| 6,016,766 A | 1/2000 | Pirkle et al. |
| 6,020,800 A | 2/2000 | Arakawa et al. |
| 6,031,333 A | 2/2000 | Simpson |
| 6,049,170 A | 4/2000 | Hochi et al. |
| 6,084,348 A | 7/2000 | Love |
| 6,084,356 A | 7/2000 | Seki et al. |
| 6,137,237 A | 10/2000 | MacLennan et al. |
| 6,181,054 B1 | 1/2001 | Levin et al. |
| 6,196,297 B1 | 3/2001 | Campbell et al. |
| 6,246,160 B1 | 6/2001 | MacLennan et al. |
| 6,252,346 B1 | 6/2001 | Turner et al. |
| 6,265,813 B1 | 7/2001 | Knox et al. |
| 6,291,936 B1 | 9/2001 | MacLennan et al. |
| 6,310,443 B1 | 10/2001 | MacLennan et al. |
| 6,313,587 B1 | 11/2001 | MacLennan et al. |
| 6,326,739 B1 | 12/2001 | MacLennan et al. |
| 6,424,099 B1 | 7/2002 | Kirkpatrick et al. |
| 6,476,557 B1 * | 11/2002 | Leng et al. ............ 313/637 |
| 6,509,675 B2 | 1/2003 | MacLennan et al. |
| 6,566,817 B2 | 5/2003 | Lapatovich |
| 6,617,806 B2 | 9/2003 | Kirkpatrick et al. |
| 6,628,079 B2 | 9/2003 | Golkowski et al. |
| 6,664,842 B1 | 12/2003 | Pobanz |
| 6,856,092 B2 | 2/2005 | Pothoven et al. |
| 6,922,021 B2 | 7/2005 | Espiau et al. |
| 6,949,887 B2 | 9/2005 | Kirkpatrick et al. |
| 6,962,426 B2 | 11/2005 | Slobodin |
| 6,980,021 B1 | 12/2005 | Srivastava et al. |
| 7,034,464 B1 | 4/2006 | Izadian et al. |
| 7,253,091 B2 | 8/2007 | Brewer |
| 7,348,732 B2 | 3/2008 | Espiau et al. |
| 7,358,678 B2 | 4/2008 | Espiau et al. |
| 7,362,054 B2 | 4/2008 | Espiau et al. |
| 7,362,055 B2 | 4/2008 | Espiau et al. |
| 7,362,056 B2 | 4/2008 | Espiau et al. |
| 7,372,209 B2 | 5/2008 | Espiau et al. |
| 7,391,158 B2 | 6/2008 | Espiau et al. |
| 2001/0030509 A1 | 10/2001 | Pothoven et al. |
| 2001/0035720 A1 | 11/2001 | Guthrie et al. |
| 2002/0001056 A1 | 1/2002 | Sandberg et al. |
| 2002/0001135 A1 | 1/2002 | Berman et al. |
| 2002/0105274 A1 | 8/2002 | Pothoven et al. |
| 2005/0057158 A1 | 3/2005 | Chang et al. |
| 2005/0099130 A1 | 5/2005 | Espiau et al. |
| 2005/0212456 A1 | 9/2005 | Espiau et al. |
| 2005/0248281 A1 | 11/2005 | Espiau et al. |
| 2005/0286263 A1 | 12/2005 | Champion et al. |
| 2006/0208645 A1 | 9/2006 | Espiau et al. |
| 2006/0208648 A1 | 9/2006 | Espiau et al. |
| 2007/0001614 A1 | 1/2007 | Espiau et al. |
| 2007/0075652 A1 | 4/2007 | Espiau et al. |

FOREIGN PATENT DOCUMENTS

| | | |
|---|---|---|
| EP | 0 035 898 A1 | 3/1981 |
| EP | 0 419 947 A2 | 9/1990 |
| JP | 8-148127 | 6/1996 |
| JP | 8148127 | 6/1996 |
| WO | WO 97/09748 A1 | 3/1997 |
| WO | WO-9828780 | 7/1998 |
| WO | WO-9936940 A2 | 7/1999 |
| WO | WO 00/16365 A1 | 3/2000 |
| WO | WO-0101448 A1 | 1/2001 |
| WO | WO-0211181 A1 | 2/2002 |
| WO | WO 03/083900 A1 | 10/2003 |

OTHER PUBLICATIONS

Order to Show Cause Bd. R. 202(d), of Patent Interference No. 105,393 between U.S. Appl. No. 09/818,092 (Guthrie, junior party) and U.S. Patent 6,737,809 (Espiau, senior party) by Administrative Patent Judge S. Medley mailed on Jan. 24, 2006 (Schedule 1 of Counterstatement).

Guthrie, C., Drawings Submitted with Suggestion of Interference filed Nov. 29, 2004 in U.S. Appl. No. 09/818,092, and Available from Order to Show Cause (OSC) in Patent Interference No. 105,393 mailed from Administrative Patent Judge S. Medley on Jan. 24, 2006. (See p. 10 Lines 1-7 and FN4 of OSC).

Decision of Hon. Thomas WM. Cain, Judge of the Superior Court of California, in *Robert P. Schiro v. Digital Reflection, Inc.*, dated May 11, 2004, (Schedule 2 of Counterstatement).

Mr. Turner's Mar. 31, 2000 Memorandum and Agreement Referred to in Paragraph 19 of the Statement of Case, DRI-00-01 and a BNDA (Schedule 3 of Counterstatement).

Fusion's International Patent Application WO 99/36940 published Jul. 22, 1999 (Schedule 4 of Counterstatement).

DRI's Schematic dated Apr. 12, 2000 (Schedule 5 of Counterstatement).

Mr. Turner's Notes from the Apr. 11, 2000 Meeting (Schedule 6 of Counterstatement).

Mr. Turner's Apr. 14, 2000 Memorandum and its Attachments including the Second Statement of Work(DRI-00-02), (Schedule 7 of Counterstatement).

DRI's Apr. 20, 2000 Presentation Materials "Dielectric Resonator Concept for Plasma Lamps" (Schedule 8 of Counterstatement).

Excerpt from Professor Joshi's Notebook dated Apr. 20, 2000, (Schedule 9 of Counterstatement).
Mr. Turner's May 12, 2000 Plasma Lamp Development Plan Memorandum, Email and other Attachments thereto, (Schedule 10 of Counterstatement.
Mr. Turner's Oct. 27, 2000 Email, (Schedule 11 of Counterstatement).
Mr. Turner's Nov. 3, 2000 Letter, (Schedule 12 of Counterstatement).
Mr. Turner's May 22, 2001 Letter, (Schedule 13 of Counterstatement).
Declaration of Patent Interference No. 105,393 between U.S. Appl. No. 09/818,092 (Guthrie, junior party) and U.S. Patent 6,737,809 (Espiau, senior party) by Administrative Patent Judge S. Medley mailed on Jan. 24, 2006.
Pisano, N.A., Amendment and Request for Interference (12pp) and Appendix A (9pp) submitted in U.S. Appl. No. 09/818,092 Guthrie, et al., to the USPTO on Nov. 29, 2004.
Prior, G.A., Declaration (6pp) submitted in U.S. Appl. No. 09/818,092 Guthrie, et al., to the USPTO on Nov. 29, 2004.
Sandberg, E., Declaration (5pp) submitted in U.S. Appl. No. 09/818,092 Guthrie, et al., to the USPTO on Nov. 29, 2004.
Turner, D., Letter to Greg Prior (3pp) dated Mar. 31, 2002 submitted in U.S. Appl. No. 09/818,092 Guthrie, et al., to the USPTO on Nov. 29, 2004.
Turner, D. Engineering Service Agreement (3pp); Statement of Work (1p) dated Mar. 31, 2002 submitted in U.S. Appl. No. 09/818,092 Guthrie, et al., to the USPTO on Nov. 29, 2004.
Turner, D., electronic mail message to Wayne Catlett (2pp) sent on Jun. 26, 2002 submitted in U.S. Appl. No. 09/818,092 Guthrie, et al., to the USPTO on Nov. 29, 2004.
Espiau, Frederick M., et al., U.S. Appl. No. 11/084,069 "Plasma Lamp with Dielectric Waveguide" filed Mar. 18, 2005.
Espiau, Frederick M., et al., U.S. Appl. No. 11/083,552 "Plasma Lamp with Dielectric Waveguide" filed Mar. 18, 2005.
Espiau, Frederick M., et al., U.S. Appl. No. 11/083,557 "Plasma Lamp with Dielectric Waveguide" filed Mar. 18, 2005.
Espiau, Frederick M., et al., U.S. Appl. No. 11/083,558 "Plasma Lamp with Dielectric Waveguide" filed Mar. 18, 2005.
Espiau, Frederick M., et al., U.S. Appl. No. 11/083,559 "Plasma Lamp with Dielectric Waveguide" filed Mar. 18, 2005.
Kirkpatrick, Douglas A., U.S. Appl. No. 60/133,885 "High Brightness Microwave Lamp" filed May 12, 1999.
Kirkpatrick, Douglas A., U.S. Appl. No. 60/177,271 "High Brightness Microwave Lamp" filed Jan. 21, 2000.
Prior, Greg, U.S. Appl. No. 60/224,059 "Wave-Guide Used for the Excitation of an Electrode-less Metal Halide Plasma Lamp Incorporating a Solid Dielectric Material" filed Aug. 9, 2000.
Prior, Greg, U.S. Appl. No. 60/224,298 "Wave-Guide Used for the Excitation of an Electrode-less Metal Halide Plasma Lamp Incorporating a Solid Dielectric Material" filed Aug. 10, 2000.
Prior, Greg, U.S. Appl. No. 60/234,415 "Quartz Bulb Enclosed in a Wave-Guide" filed Sep. 21, 2000.
Sandberg, Ed, U.S. Appl. No. 60/192,731 "Light Source for Use in Microdisplay Based Light Engines" filed Mar. 27, 2000.
Wildon, Don, U.S. Appl. No. 60/224,257 "R.F. Wave-Guide into which an Insert of a Hermetic Material that has been Either Molded or Plasma Deposited" filed Aug. 10, 2000.
Wilson, Don, U.S. Appl. No. 60/224,289 "Light Source Consisting of an Electrode-less Metal Halide Plasma Bulb that is Integrated into a Wave-Guide" filed Aug. 10, 2000.
Wilson, Don, U.S. Appl. No. 60/224,290 "Electrode-less Metal Halide Plasma Lamp with Integrated Electronics" filed Aug. 10, 2000.
Wilson, Don, U.S. Appl. No. 60/224,291 "High Temperature, Low Cost Window Sealing Technique for Plasma Lamps" filed Aug. 10, 2000.
Wilson, Don, U.S. Appl. No. 60/224,866 "Use of a Coating to Prevent the Reduction of Ceramic to Elemental Metal in the Bulb of a Wave-Guide Lamp" filed Aug. 11, 2000.
"Amended Assignment and Bill of Sale", *Guthrie Exhibit 2148, Board of Patent Appeals and Interferences* (Interference No. 105,393), (Jan. 12, 2007), 1 pg.

"Chapter 6.3—Rectangular Waveguide Cavities in: Microwave Engineering, Pozar, D. M., Editor (John Wiley & Sons, Inc.)", *Guthrie Exhibit 2413, Board of Patent Appeals and Interferences* (Interference No. 105,393), 313-318.
"Collection of Correspondence", *Guthrie Exhibit 2163, Board of Patent Appeals and Interferences* (Interference No. 105,393), (2000),23 pgs.
"CoorsTek Engineering Drawings", *Guthrie Exhibit 2142, Board of Patent Appeals and Interferences* (Interference No. 105,393), (Aug. 10, 200),6 pgs.
CoorsTek Invoice No. 1016307, *Guthrie Exhibit 2140, Board of Patent Appeals and Interferences* (Interference No. 105,393, (Oct. 12, 2000), 1 pg.
CoorsTek Invoice No. 1017845, *Guthrie Exhibit 2141, Board of Patent Appeals and Interferences* (Interference No. 105,393, (Oct. 18, 2001), 1 pg.
"Decision—Motions—Bd. R. 125(a) (Paper 83)", *Guthrie, et al. v. Espiau, et al., Board of Patent Appeals and Interferences* (Interference No. 105,393), (Feb. 27, 2007),51 pgs.
"Decision—On Rehearing—Bd. R. 125(c) (Paper 89)", *Guthrie, et al. v. Espiau, et al., Board of Patent Appeals and Interferences* (Interference No. 105,393), (Mar. 20, 2007), 13 pgs.
Decision—Rehearing—Bd. R. 127(d) (Paper 94), *Guthrie, et al. v. Espiau, et al., Board of Patent Appeals and Interferences* (Interference No. 105,393), (Apr. 18, 2007),5 pgs.
"Declaration of David Smoler", *Guthrie Exhibit 2136, Board of Patent Appeals and Interferences*(Interference No. 105,393), (Dec. 5, 2005), 17 pgs.
"Declaration of Donald M. Wilson (Corrected)", *Espiau Exhibit 1106, Board of Patent Appeals and Interferences*(Interference No. 105,393), (Dec. 12, 2005),3 pgs.
"Declaration of Tim R. Russell", *Guthrie Exhibit 2145, Board of Patent Appeals and Interferences* (Interference No. 105,393), (Feb. 1, 2006),3 pgs.
"Draft of Charles Guthries' Expense Report", *Guthrie Exhibit 2192, Board of Patent Appeals and Interferences* (Interference No. 105,393), (May 10, 2000),2 pgs.
"E-Mails between C. Guthrie and C. Lee", *Guthrie Exhibit 2167, Board of Patent Appeals and Interferences* (Interference No. 105,393), (2000),6 pgs.
"E-Mails Between T. Russell and T. Kearney", *Guthrie Exhibit 2187, Board of Patent Appeals and Interferences* (Interference No. 105,393), (2006),7 pgs.
"Engineering Sketches (faxed to Coorstek)", *Guthrie Exhibit 2137, Board of Patent Appeals and Interferences*(Interference No. 105,393), (Jul. 20, 2000), 2 pgs.
"Espiau Declaration of Janet Brant", *Espiau Exhibit 1118, Board of Patent Appeals and Interferences*(Interference No. 105,393), (May 25, 2007), 3 pgs.
"Espiau Declaration of Matthew A. Argenti", *Espiau Exhibit 1121, Board of Patent Appeals and Interferences*(Interference No. 105,393), (May 28, 2007),3 pgs.
"Espiau Declaration of Michael J. Murphy", *Espiau Exhibit 1120, Board of Patent Appeals of Interferences*(Interference No. 105,393), (May 29, 2007),4 pgs.
"Espiau Declaration of Terry Kearney", *Espiau Exhibit 1122, Board of Patent Appeals and Interferences*(Interference No. 105,393), (May 28, 2007),6 pgs.
"Espiau Declaration of W. Benjamin Glenn", *Espiau Exhibit 1119, Board of Patent Appeals and Interferences*(Interference No. 105,393), (May 28, 2007),8 pgs.
"Espiau Miscellaneous Motion 6 (Request for Rehearing of Espiau's Request for Leave to Prove Derivation by Guthrie)", *Guthrie, et al. v. Espiau, et al., Board of Patent Appeals and Interferences* (Interference No. 105,393), (Mar. 22, 2007),11 pgs.
"Espiau Opposition 6", *Guthrie, et al. v. Espiau, et al.* (Interference No. 105,393), (May 29, 2007),31 pgs.
"Guthrie Declaration of Anthony Cooper", *Guthrie Exhibit 2184, Board of Patent Appeals and Interferences* (Interference No. 105,393), (Jun. 14, 2007)6 pgs.
"Guthrie Declaration of Floyd Pothoven", *Guthrie Exhibit 2183, Board of Patent Appeals and Interferences* (Interference No. 105,393), (Jun. 15, 2007),5 pgs.

"Guthrie Declaration of Joe Bennett", *Guthrie Exhibit 2186, Board of Patent Appeals and Interferences* (Interference No. 105,393), (Jun. 14, 2007), 5 pgs.

"Guthrie Declaration of Shelby Katz", *Guthrie Exhibit 2144, Board of Patent Appeals and Interferences* (Interference No. 105,393), (May 24, 2007), 3 pgs.

"Guthrie Declaration of Vivek Gandhi", *Guthrie Exhibit 2164, Board of Patent Appeals and Interferences* (Interference No. 105,393), (May 18, 2007), 3 pgs.

"Guthrie Fifth Declaration of Madhu S. Gupta, Ph.D.", *Guthrie Exhibit 2182, Board of Patent Appeals and Interferences* (Interference No. 105,393), (Jun. 14, 2007), 23 pgs.

"Guthrie Miscellaneous Motion 6 (To Compel Testimony of Tim Russell)", *Guthrie, et al. v. Espiau, et al., Board of Patent Appeals and Interferences* (Interference No. 105,393), (May 23, 2006), 23 pgs.

"Guthrie Miscellaneous Motion 6 (Request for Rehearing)", *Guthrie, et al. v. Espiau, et al, Board of Patent Appeals and Interferences* (Interference No. 105,393), (Mar. 13, 2007), 11 pgs.

"Guthrie Opposition 6 (Opposing Espiau Motion 6 to Request Rehearing)", *Guthrie, et al. v. Espiau, et al., Board of Patent Appeals and Interferences* (Interference No. 105,393), (Apr. 3, 2007), 12 pgs.

"Guthrie Priority Motion 7", *Guthrie, et al. v. Espiau, et al., Board of Patent Appeals and Interferences* (Interference No. 105,393), (Jun. 15, 2007), 81 pgs.

"Guthrie Second Declaration of Charles Guthrie", *Guthrie Exhibit 2180, Board of Patent Appeals and Interferences* (Interference No. 105,393), (Jun. 14, 2007), 12 pgs.

"Guthrie Second Declaration of David E. Smoler", *Guthrie Exhibit 2150, Board of Patent Appeals and Interferences* (Interference No. 105,393), (May 21, 2007), 8 pgs.

"Guthrie Third Declaration of Donald Wilson", *Guthrie Exhibit 2181, Board of Patent Appeals and Interferences* (Interference No. 105,393), (Jun. 13, 2007), 22 pgs.

"Guthrie Third Declaration of Greg Prior", *Guthrie Exhibit 2185 Board of Patent Appeals and Interferences* (Interference No. 105,393), (Jun. 15, 2007), 11 pgs.

"Guthrie Third Declaration of Nicola Pisano", *Guthrie Exhibit 2189, Board of Patent Appeals and Interferences* (Interference No. 105,393), (May 23, 2007), 8 pgs.

"Manufacturing Order Documentation Form", *Guthrie Exhibit 2139, Board of Patent Appeals and Interferences*(Interference No. 105,393), (Aug. 8, 2000), 3 pgs.

"Manufacturing Quote from Coorstek", *Guthrie Exhibit 2138, Board of Patent Appeals and Interferences*(Interference No. 105,393), (Jul. 27, 2000), 2 pgs.

"Petition to Correct Inventorship in U.S. Appl. No. 09/918,092, filed Mar. 26, 2001", *Guthrie Exhibit 2166, Board of Patent Appeals and Interferences* (Interference No. 105,393), (Dec. 22, 2004), 21 pgs.

"Photograph of Lighted Half-Wavelength", *Guthrie Exhibit 2178, Board of Patent Appeals and Interferences* (Interference No. 105,393), (2002), 2 pgs.

"Smoler Voicemail Transcript" *Espiau Exhibit 1109, Board of Patent Appeals and Interferences*(Interference No. 105,393), (Nov. 21, 2005), 1 pg.

"Transcript of Deposition of Tim Russell", *Exhibit 2198, Board of Patent Appeals and Interferences* (Interference No. 105,393), (Jun. 6, 2007), 79 pgs.

"Wilson Handwritten Notes", *Espiau Exhibit 1107, Board of Patent Appeals and Interferences*(Interference No. 105,393), (Nov. 7, 2005), 2 pgs.

"Wilson Handwritten Notes", *Espiau Exhibit 1108, Board of Patent Appeals and Interferences*(Interference No. 105,393), (Nov. 15, 2005), 11 pgs.

"Wilson Technical Consulting Agreement", *Espiau Exhibit 1105, Board of Patent Appeals and Interferences*(Interference No. 105,393), (Oct. 17, 2005), 2 pgs.

Bennett, J., "E-Mail to C. Guthrie Re: Kyocera Quote for Waveguide Samples", *Guthrie Exhibit 2176, Board of Patent Appeals and Interferences* (Interference No. 105,393), (Jul. 10, 2000), 1 pg.

Brant, J., "E-Mail to Tony McGettigan", *Espiau Exhibit 1104, Board of Patent Appeals and Interferences*(Interference No. 105,393), (Oct. 20, 2005), 1 pg.

Guthrie, C., "Collection of Waveguide Drawings", *Guthrie Exhibit 2169, Board of Patent Appeals and Interferences* (Interference No. 105,393), (2000), 7 pgs.

Guthrie, C., "D.R.I. Drawing—Ceramic Substrate (SMPL004)", *Guthrie Exhibit 2171, Board of Patent Appeals and Interferences* (Interference No. 105,393), (Jun. 19, 2000), 1 pg.

Guthrie, C., "D.R.I. Drawing—Dielectric Test Sample", *Guthrie Exhibit 2154, Board of Patent Appeals and Interferences* (Interference No. 105,393), (Apr. 26, 2000), 1 pg.

Guthrie, C., "D.R.I. Drawing—High Bright Picture Element (WGC006)", *Guthrie Exhibit 2170, Board of Patent Appeals and Interferences* (Interference No. 105,393), (Jun. 14, 2000), 1 pg.

Guthrie, C., "D.R.I. Drawing—Wave Guide Lamp Concept 3d (WGC003)", *Guthrie Exhibit 2175, Board of Patent Appeals and Interferences* (Interference No. 105,393), (Jul. 3, 2000), 1 pg.

Guthrie, C., "D.R.I. Drawings—R. F. Connector Details (Versions 1 and 2)", *Guthrie Exhibit 2174, Board of Patent Appeals and Interferences* (Interference No. 105,393), (2000), 2 pgs.

Guthrie, C., "D.R.I. Drawings—Wave Guide Lamp Concept 5 (WGC005); Wave Guide Lamp Concept 6 (WGC 006); and Wave Guide Concept 7 (WGC 007)", *Guthrie Exhibit 2172, Board of Patent Appeals and Interferences* (Interference No. 105,393), (Jun. 27, 2000), 3 pgs.

Guthrie, C., "D.R.I. Drawings—Wave Guide Lamp Concept 8 (WGC008); Wave Guide Lamp Concept 9 (WGC009); and Wave Guide Lamp Concept 10 (WGC010)", *Guthrie Exhibit 2173, Board of Patent Appeals and Interferences* (Interference No. 105,393), (Jun. 28, 2000), 3 pgs.

Guthriie, C., "E-Mail to E. Sandberg, et al. re: Meeting at ITW", *Guthrie Exhibit 2179, Board of Patent Appeals and Interferences* (Interference No. 105,393), (Mar. 23, 2000), 2 pgs.

Joshi, C., "E-Mail to C. Guthrie", *Guthrie Exhibit 2177, Board of Patent Appeals and Interferences* (Interference No. 105,393), (Jul. 13, 2000), 1 pg.

Russell, T., "E-Mail to N. Pisano (Guthrie's Counsel) Re: DRI Patent Application", *Guthrie Exhibit 2188, Board of Patent Appeals and Interferences* (Interference No. 105,393), (May 19, 2007), 2 pgs.

Smoler, D., "E-Mail to C. Guthrie re: Ridged Waveguide Ideas", *Guthrie Exhibit 2149, Board of Patent Appeals and Interferences* (Interference No. 105,393), (Jun. 27, 2000), 2 pgs.

Turner, D., "E-Mail to C. Guthrie re: Dielectric Constants from Trans Tech", *Guthrie Exhibit 2168, Board of Patent Appeals and Interferences* (Interference No. 105,393), (May 7, 2000), 1 pg.

Turner, D., "E-Mail to D. Wilson and C. Guthrie (attaching Lamp Plasma Schedule)", *Guthrie Exhibit 2197, Board of Patent Appeals and Interferences* (Interference No. 105,393), (Jun. 28, 2000), 3 pgs.

Turner, D., "E-Mail to D. Wilson and C. Guthrie re: Wavelength Project List (attaching Updated Contact List)", *Guthrie Exhibit 2159, Board of Patent Appeals and Interferences* (Interference No. 105,393), (Jul. 6, 2000), 3 pgs.

Turner, D., et al. "E-Mail to D. Wilson, et al. Re: DRI Plasma Lamp—Updated Address List", *Guthrie Exhibit 2152, Board of Patent Appeals and Interferences* (Interference No. 105,393), (Apr. 24, 2000), 3 pgs.

Turner, D., "E-Mail to G. Prior Re: DRI Tasks", *Guthrie Exhibit 2165, Board of Patent Appeals and Interferences* (Interference No. 105,393), (Apr. 10, 2000), 2 pgs.

Turner, D., "E-Mail to G. Prior, et al. Re: Action Item List", *Guthrie Exhibit 2157, Board of Patent Appeals and Interferences* (Interference No. 105,393), (Jun. 28, 2000), 2 pgs.

Turner, D., "E-Mails to G. Prior, et al, Re: DRI Plasma Lamp Schedule Update", *Guthrie Exhibit 2156, Board of Patent Appeals and Interferences* (Interference No. 105,393), (Apr. 28, 2000), 4 pgs.

Turner, D., "E-Mail to G. Prior, et al. Re: Proposal to Develop Plasma Lamp Exciter and Waveguide", *Guthrie Exhibit 2151, Board of Patent Appeals and Interferences* (Interference No. 105,393), (Apr. 16, 2000), 8 pgs.

Turner, D., "E-Mail to G. Prior, et al. Re: DRI Plasma Lamp—Laser Bonding", *Guthrie Exhibit 2153, Board of Patent Appeals and Interferences* (Interference No. 105,393), (Apr. 26, 2000), 2 pgs.

Turner, D., et al., "E-Mail to J. Chan, et al. Re: Wavelength Meeting", *Guthrie Exhibit 2195, Board of Patent Appeals and Interferences* (Interference No. 105,393), (Jun. 2, 2000), 1 pg.

Turner, D., "E-Mail to W. Catlett", *Guthrie Exhibit 2160, Board of Patent Appeals and Interferences* (Interference No. 105,393), (Jul. 17, 2000), 2 pgs.

Turner, D., et al., "E-Mail to W. Catlett Re: Lamp Project Budget", *Guthrie Exhibit 2194, Board of Patent Appeals and Interferences* (Interference No. 105,393), (Jun. 1, 2000), 4 pgs.

Turner, D., "E-Mail to W. Catlett Re: Office/Lab and Deposit Account for Lamp Project", *Guthrie Exhibit 2193, Board of Patent Appeals and Interferences* (Interference No. 105,393), (May 31, 2000), 2 pgs.

Turner, D., "E-Mail to W. Catlett re: Luxim Waveguide Status Update", *Guthrie Exhibit 2158, Board of Patent Appeals and Interferences* (Interference No. 105,393), (Jul. 6, 2000), 3 pgs.

Turner, D., "E-Mail to W. Catlett re: Waveguide Lamp Status Report", *Guthrie Exhibit 2161, Board of Patent Appeals and Interferences* (Interference No. 105,393), (Aug. 1, 2000), 2 pgs.

Turner, D., "E-Mail to W. Catlett, et al. Re: Luxim Waveguide Status and Meeting", *Guthrie Exhibit 2196, Board of Appeals and Interferences* (Interference No. 105,393), (Jun. 26, 2000), 2 pgs.

"'Coating Definition', from www.answers.com", *Espiau Exhibit 1019, in Board of Patent Appeals and Interferences* (Interference No. 105,393), (Mar. 31, 2006), 5 pgs.

"'Coating' Definition from online dictionary, www.thefreedictionary.com/coating", *Espiau Exhibit 1020, in Board of Patent Appeals and Interferences* (Interference No. 105,393), (Mar. 21, 2006), 4 pgs.

"'Coating' Definition from www.WordReference.com", *Espiau Exhibit 1021, in Board of Patent Appeals and Interferences* (Interference No. 105,393), (Mar. 21, 2006), 2 pgs.

"Chapter 4—Cavity Resonators, Department of the Army Technical Manual TM 11-673—Generation and Transmission of Microwave Energy", *Guthrie Exhibit 2104, Board of Patent Appeals and Interferences* (Interference No. 105,393), (Jun. 1953), 12 pgs.

"Diligence Calendar", *Guthrie Exhibit 2044, Board of Patent Appeals and Interferences* (Interference No. 105,393), (Jul. 2000 and Aug. 2000), 1 pg.

"File History of US 6,566,817, for High Intensity Discharge Lamp With Only One Electrode, filed Sep. 24, 2001 by Lapatovich, et al.", *Espiau Exhibit 1097, Board of Patent Appeals and Interferences* (Interference No. 105,393), 94 pgs.

"File History of US 6,922,021 for a Microwave Energized Plasma Lamp With Solid Dielectric Waveguide, filed by Jul. 26, 2005 by Espiau, et al.", *Guthrie Exhibit 2078, Board of Patent Appeals and Interferences* (Interference No. 105,393), 468 pgs.

"File History of US 6,962,426 for Recirculation of Reflected Source Light in an Image Projection System, filed Nov. 29, 2001 by Slobodin", *Espiau Exhibit 1096, Board of Patent Appeals and Interferences* (Interference No. 105,393) 116 pgs.

"Fusion Lighting's Website / Lamp for Special Applications", http://www.web.archive.org/web/20010602134016/fusionlighting.com/special.htm :*Guthrie Exhibit 2125, Board of Patent Appeals and Interferences* (Interference No. 105,393), (archived Jun. 2, 2001), 2 pgs.

"Google "Coating" Definition Search Results", *Espiau Exhibit 1018, in Board of Patent Appeals and Interferences* (Interference No. 105,393), (Mar. 31, 2006), 2 pgs.

"Handout for Experiment 1: "Cavity Resonator", Electrical Engineering Department School of Engineering and Applied Science, University of California, Los Angeles", *Espiau Exhibit 1026, in Board of Patent Appeals and Interferences* (Interference No. 105,393), (Winter, 1995), 5 pgs.

"Handout for Experiment 3: "Cavity Resonator", Electrical Engineering Department School of Engineering and Applied Science, University of California, Los Angeles", *Espiau Exhibit 1025, in Board of Patent Appeals and Interferences* (Interference No. 1025), (Winter, 1991), 15 pgs.

"Luxim Corporation Consulting Agreement", *Espiau Exhibit 1090, Board of Patent Appeals and Interferences* (Interference No. 105,393), (Jun. 12, 2006), 6 pgs.

"Luxim Corporation's Website", *Guthrie Exhibit 2114, Board of Patent Appeals and Interferences* (Interference No. 105,393), (Apr. 11, 2006), 50 pgs.

"Luxim Corporation, "Microwave Energized Plasma Lamps"; ;MiPL: Product Development Plan", *Guthrie Exhibit 2009, Board of Appeals and Interferences* (Interference No. 105,393), (Aug. 2002), 14 pgs.

"Other Disclosure Materials—File: "An External Heat Sink"", *Guthrie Exhibit 2025, Board of Patent Appeals and Interferences* (Interference No. 105,393), (Jul. 28, 2000), 3 pgs.

"Other Disclosure Materials—File: Light Source 2.1", *Guthrie Exhibit 2021, Board of Patent Appeals and Interferences* (Interference No. 105,393), (Aug. 8, 2000), 4 pgs.

"Other Disclosure Materials—File: Light Source 2.11", *Guthrie Exhibit 2026, Board of Patent Appeals and Interferences* (Interference No. 105,393), (Jul. 28, 2000), 2 pgs.

"Other Disclosure Materials—File: Light Source 2.2A", *Guthrie Exhibit 2022, Board of Patent Appeals and Interferences* (Interference No. 105,393), (Jul. 27, 2000), 4 pgs.

"Other Disclosure Materials—File: Light Source 2.6", *Guthrie Exhibit 2023, Board of Patent Appeals and Interferences* (Interference No. 105,393), (Aug. 8, 2000), 2 pgs.

"Other Disclosure Materials—File: Light Source 2.9", *Guthrie Exhibit 2024, Board of Patent Appeals and Interferences* (Interference No. 2024), (Jul. 27, 2000), 3 pgs.

"Priority-Claimed Disclosure Materials—File: Light Source 2.13", *Guthrie Exhibit 2020, Board of Patent Appeals and Interferences* (Interference No. 105,393), (Aug. 3, 2000), 2 pgs.

"Priority-Claimed Disclosure Materials—File: Light Source 2.2", *Guthrie Exhibit 2014, Board of Patent Appeals and Interferences* (Interference No. 105,393), (Jul. 27, 2000), 3 pgs.

"Priority-Claimed Disclosure Materials—File: Light Source 2.3", *Guthrie Exhibit 2015, Board of Patent Appeals and Interferences* (Interference No. 105,393), (Jul. 19, 2000), 4 pgs.

"Priority-Claimed Disclosure Materials—File: Light Source 2.7", *Guthrie Exhibit 2018, Board of Patent Appeals and Interferences* (Interference No. 105,393), (Jul. 27, 2000), 4 pgs.

"Priority-Claimed Disclosure Materials—File: Light Source 2.4", *Guthrie Exhibit 2016, Board of Patent Appeals and Interferences* (Interference No. 105,393), (Aug. 8, 2000), 4 pgs.

"Priority-Claimed Disclosure Materials—File: Light Source 2.5", *Guthrie Exhibit 2017, Board of Patent Appeals and Interferences* (Interference No. 105,392), (Jul. 28, 2000), 4 pgs.

"Priority-Claimed Disclosure Materials—File: Light Source 2.8", *Guthrie Exhibit 2019, Board of Patent Appeals and Interferences* (Interference No. 105,393), (Jul. 26, 2000), 5 pgs.

"Synonyms for the Word 'Direct', from Thesaurus.com", *Guthrie Exhibit 2010, Board of Patent Appeals and Interferences* (Interference No. 105,393), (Jun. 18, 2006), 1 pg.

"Turner Engineering Company; Conceptual Design; Final PowerPoint Presentation", *Guthrie Exhibit 2070, Board of Patent Appeals and Interferences* (Interference No. 105,393), (May 22, 2000), 30 pgs.

"Turner Engineering Corporation's Website", *Guthrie Exhibit 2113, Board of Patent Appeals and Interferences* (Interference 105,393), (Jun. 13, 2006), 25 pgs.

Bergan, D. A., "E-Mail to N. Pisano With Espiau's Objections to Guthrie's Reply Exhibits (Exhibits 2123, 2124, 2125 and 2126)", *Espiau Exhibit 1103 Board of Patent Appeals and Interferenes* (Interference No. 105,393), (Sep. 8, 2006), 5 pgs.

Berman, A., "Declaration", *Guthrie Exhibit 2071, Board of Patent Appeals and Interferences* (Interference No. 105,393), (Feb. 20, 2006), 6 pgs.

Bleaney, B. J., et al., "Electricity and Magnetism, Second Edition, 1965, Oxford at the Clarendon Press", *Guthrie Exhibit 2108, Board of Patent Appeals and Interferences* (Interference 105,393), (1965), 8 pgs.

Catlett, F. W., "Deposition Transcript", *Guthrie Exhibit 2007, Board of Patent Appeals and Interferences* (Interference No. 105,393), (Jun. 1, 2005), 181 pgs.

Chang, Y., et al., "Plasma Lamp, U.S. Appl. No. 60/222,028, filed Jul. 31, 2000", *Espiau Exhibit 1012, in Board of Patent Appeals and Interferences* (Interference No. 105,393), (Jul. 31, 2000), 28 pgs.

Espaiu, F. M., et al., "File History, Plasma Lamp With Dielectric Waveguide (U.S. Appl. No. 09/809,718, filed Mar. 15, 2001)",

*Espiau Exhibit 1013, in Board of Patent Appeals and Interferences* (Interference No. 105,393), (Mar. 15, 2001), 46 pgs.

Everett, S., "Declaration", *Guthrie Exhibit 2075, Board of Patent Appeals and Interferences* (Interference No. 105,393), (Mar. 13, 2006),3 pgs.

Ghandi, O. P., "Microwave Engineering and Applications, Pergamon Press, Inc.", *Guthrie Exhibit 2119, Board of Patent Appeals and Interferences* (Interference No. 105,393), (1981),6 pgs.

Gray, E., "Reply to Office Action of Nov. 3, 2002, in Plasma Lamp With Dielectric Waveguide, U.S. Appl. No. 09/809,718, filed Mar. 11, 2001", *Guthrie Exhibit 2088, Board of Patent Appeals and Interferences* (Interference No. 105,393), (Mar. 6, 2003), 76 pgs.

Gray, E., "Reply to Office Communication for Plasma Lamp With Dielectric Waveguide, U.S. Appl. No. 09/809,718 (Espiau)", *Guthrie Exhibit 2097, Patent Appeals and Interferences* (Interference No. 105,393), (Sep. 27, 2003),66 pgs.

Gupta, M.S.., "Corrrected Third Declaration", *Guthrie Exhibit 2121, Board of Patent Appeals and Interferences* (Interference No. 105,393), (Aug. 1, 2006),34 pgs.

Gupta, M. S., "Declaration", *Guthrie Exhibit 2089, Board of Patent Appeals and Interferences* (Interference No. 105,393), (May 1, 2006),28 pgs.

Gupta, M. S., "Deposition Transcript", *Guthrie Exhibit 2122, Board of Patent Appeals and Interferences*, (Interference No. 105,393),(Aug. 16, 2006),71 pgs.

Gupta, M. S., "Deposition Transcript", *Guthrie Exhibit 2117, Board of Patent Appeals and Interferences*, (Interference No. 105,393),(Jun. 22, 2006),48 pgs.

Gupta, M. S., "Espiau Errata to the Transcript of the Aug. 16, 2006 Deposition of Madhu S. Gupta, Ph.D.", *Espiau Exhibit 1089, Board of Patent Appeals and Interferences* (Interference No. 105,393), (Aug. 16, 2006),2 pgs.

Gupta, M. S., "Fourth Declaration of Madhu S. Gupta Ph.D.", *Guthrie Exhibit 2124, Board of Patent Appeals and Interferences* (Interference No. 105,393), (Sep. 5, 2005),17 pgs.

Gupta, M. S., "Second Declaration", *Guthrie Exhibit 2105, Board of Patent Appeals and Interferences* (Interference No. 105,393), (May 22, 2006),24 pgs.

Gupta, M. S., "Transcription of Deposition of Madhu S. Gupta, Ph.D. (vol. III)", *Guthrie Exhibit 2132, Board of Patent Appeals and Interferences* (Interference No. 105,393), (Oct. 3, 2006), 106 pgs.

Guthrie, C., "'Correction Documentation' to Light Source Files 2.1-2.13", *Guthrie Exhibit 2032, Board of Patent Appeals and Interferences* (Interference No. 105,393), (Aug. 3, 2000), 2 pgs.

Guthrie, C., et al., "A Corregated Wave-Guide Used for the Excitation of an Electrode-Less Metal Halide Plasma Lamp Incorporating a Solid Dielectric Material", U.S. Appl. No. 60/224,060, filed Aug. 9, 2000 (*Guthrie Exhibit 2028, Board of Patent Appeals and Interferences* ( Interference No. 105,393)), 9 pgs.

Guthrie, C., et al. "A Method for Connecting the Antenna on a Printed Wiring Board to a Wave-Guide in a Light Source in Which an Electrode-Less Lamp is Built Into the Wave-Guide Structure", U.S. Appl. No. 60/224,061, filed Aug. 9, 2000 (*Guthrie Exhibit 2027, Board of Patent Appeals and Interferences* (Interference No. 105,393), 9 pgs.

Guthrie, C., "Ceramic Test Sample; SPL002 Engineering Drawing", *Guthrie Exhibit 2061, Board of Patent Appeals and Interferences* (Interference No. 105,393), (Apr. 27, 2000), 1 pg.

Guthrie, C., "Concept 3 With Heat Sink; WGC003 Engineering Drawing", *Guthrie Exhibit 2064, Board of Patent Appeals and Interferences* (Interference No. 105,393), (may 16, 2000), 1 pg.

Guthrie, C., et al., "Declaration", *Guthrie Exhibit 2006, Board of Patent Appeals and Interferences* (Interference No. 105,393), (Feb. 20, 2006),14 pgs.

Guthrie, C., "Half Wavelength Waveguide Drawings (CTS010)", *Guthrie Exhibit 2048, Board of Patent Appeals and Interferences* (Interference No. 105,393), (Jul. 20, 2000), 1 pg.

Guthrie, C., "Lamp With Integrated Waveguide Version I, LWG001 Engineering Drawing", *Guthrie Exhibit 2060, Board of Patent Appeals and Interferences* (Interference No. 105,393), (Apr. 27, 2000),1 pg.

Guthrie, C., "SPL020: Engineering Drawing", *Guthrie Exhibit 2043, Board of Patent Appeals and Interferences* (Interference No. 105,393), (Nov. 3, 2000),2 pgs.

Guthrie, C., "Waveguide Lamp Concept 3; WGC003 Engineering Drawing", *Guthrie Exhibit 2062, Board of Patent Appeals and Interferences* (Interference No. 105,393), (May 10, 2000), 1 pg.

Guthrie, C., "Waveguide Lamp Concept 3; WGC003 Engineering Drawing—Waveguide Package", *Guthrie Exhibit 2063, Board of Patent Appeals and Interferences* (Interference No. 105,393), (May 10, 2000), 1 pg.

Hoover, E., "Declaration", *Guthrie Exhibit 2011, Board of Patent Appeals and Interferences* (Interference No. 105,393), (Feb. 17, 2006),5 pgs.

Johnson, A., "E-Mail Message to D. Bergan with Espiau's Objections to Guthrie's Opposition Motion Exhibits (Exhibits 2119 and 2120)", *Espiau Exhibit 1102, Board of Patent Appeals and Interferences* (Interference No. 105,393), (Oct. 16, 2006),7 pgs.

Joshi, C. J., "Declaration", *Espiau Exhibit 1051, Board of Patent Appeals and Interferences* (Interference No. 105,393), (May 22, 2006),3 pgs.

Joshi, C. J., "Deposition Transcript", *Espiau Exhibit 1068, Board of Patent Appeals and Interferences* (Interference No. 105,393), (Jul. 7, 2006),50 pgs.

Joshi, C. J., "Handwritten "Integrated Lamp-Waveguide Concept", with attached note", *Espiau Exhibit 1031, Board of Patent Appeals and Interferences* (Interference No. 105,393), (Jul. 11, 2000), 13 pgs.

Joshi, C, J., "Notebook Entries", *Espiau Exhibit 1029, Board of Patent Appeals and Interferences* (Interference No. 105,393), (Apr. 12 2000 through Apr. 20, 2000),16 pgs.

Joshi, C. J., "Provisional Draft "Integrated Lamp Waveguide Concepts", attached to E-Mail from Simon, N.", *Espiau Exhibit 1032, Board of Patent Appeals and Interferences* (Interference No. 105,393), (Jul. 11, 2000),13 pgs.

Kipling, K., et al., "High Brightness Electrodeless Lamp for Projection Display, Society for Information Display", *Espiau Exhibit 1079, Board of Patent Appeals and Interferences* (Interference No. 105,393), (May 1999),4 pgs.

Kirkpatrick, D. A., "Aperture Lamps", *Proceedings, 9th International Symposium on Science & Technology of Light Sources, Espiau Exhibit 1082, Board of Patent Appeals and Interferences* (Interference No. 105,393), (Aug. 2001),10 pgs.

Lee, B. T., "Final Office Action, for U.S. Appl. No. 09/818,092, filed Mar. 26, 2001", *Espiau Exhibit 1048, Board of Patent Appeals and Interferences* (Interference No. 105,393), (Feb. 2, 2004),6 pgs.

Lee, B. T., "Office Action for U.S. Appl. No. 09/818,092, filed Mar. 26, 2001", *Guthrie Exhibit 2002, Board of Patent Appeals and Interferences* (Interference No. 105,393), (Jul. 27, 2004),6 pgs.

Lohse, T., "Declaration", *Guthrie Exhibit 2013, Board of Patent Appeals and Interferences* (Interference No. 105,393), (Feb. 20, 2006),3 pgs.

Mancuso, M. J., "Petition to Accept Unintentionally Delayed Claim for Priority Under 35 U.S.C. 119(e) for the Benefit of Prior Filed Provisional Applications", *Guthrie Exhibit 2092, Board of Patent Appeals and Interferences* (Interference No. 105,393), (Apr. 27, 2006),6 pgs.

Morgan, R. C., "Espiau Opposition 1", *Board of Patent Appeals and Interferences* (Interference No. 105,393), (Jul. 18, 2006),51 pgs.

Morgan, R. C., "Espiau Opposition 2", *Board of Appeals and Patent Interferences* (Interference No. 105,393), (Jul. 18, 2006),50 pgs.

Morgan, R. C., "Espiau Opposition 3", *Board of Patent Appeals and Interferences* (Interference No. 105,393), (Jul. 18, 2006),45 pgs.

Morgan, R. C., "Espiau Opposition 4", *Board of Patent Appeals and Interferences* (Interference No. 105,393), (Jul. 18, 2006),97 pgs.

Morgan, R. C., "Espiau Reply 2 Re: Espiau's Motion 2", *Board of Patent Appeals and Interferences* (Interference No. 105,393), (Sep. 5, 2006),101 pgs.

Morgan, R. C., "Espiau Reply 4", *Board of Patent Appeals and Interferences* (Interference No. 105,393), (Sep. 5, 2005), 95 pgs.

Morgan, R., "Espiau Reply on Motion 3", *Board of Patent Appeals and Interferences* (No. 105,393), (Sep. 5, 2006),83 pgs.

Morgan, M., "Order Approving Trustee's Sale of Debtor's Assets to Wilson/Guthrie (United States Bankruptcy Court—Northern District of California", *Espiau Exhibit 1086, Board of Patent Appeals and Interferences* (Interference No. 105,393), (Mar. 10, 2004),29 pgs.

Neate, A., "Declaration", *Guthrie Exhibit 2057, Board of Patent Appeals and Interferences* (Interference No. 105,393), (Feb. 21, 2006),4 pgs.

Neifeld, R., "E-Mail Message To T. Kearney, et al., With Espiau's Objections to Guthrie's Preliminary Motions Exhibits", *Espiau Exhibit 1100, Board of Patent Appeals and Interferences* (Interference No. 105,393), (May 9, 2006),7 pgs.

Neifeld, R., "E-Mail to T. Kearney, et al. With Espiau's Objections to Guthrie's Responsive Motion Exhibits", *Espiau Exhibit 1101, Board of Patent Appeals and Interferences* ( Interference No. 105,393), (May 30, 2006),5 pgs.

Neifeld, R., "Espiau Motion 2, Espiau's Claims are not patentable to Guthrie", *Board of Patent Appeals and Interferences* (Interference No. 105,393), (May 2, 2006),49 pgs.

Neifeld, R., "Espiau Motiion 3 to Deny Guthrie Benefit of Provisionals", *Board of Patent Appeals and Interferences* (Interference No. 105,393), (May 2, 2006),42 pgs.

Neifeld, R., "Espiau Motion 4 to Add Count 2", *Board of Patent Appeals and Interferences* (Interference No. 105,393), (May 2, 2006),83 pgs.

Patel, M., "Declaration", *Guthrie Exhibit 2073, Board of Patent Appeals and Interferences* (Interference No. 105,393), Mar. 14, 2006),5 pgs.

Pisano, N. A., "Amendment and Request Under 35 U.S.C. Sec. 1.604 For Interference With Application", *Guthrie Exhibit 2001, Board of Patent Appeals and Interferences* (Interference No. 105,393), (Apr. 30, 2004),25 pgs.

Pisano, N. A., "Declaration", *Guthrie Exhibit 2072, Board of Patent Appeals and Interferences* (Interference No. 105,393), (Feb. 21, 2006), 14 pgs.

Pisano, N. A., "Guthrie Contingent Responsive Motion 4", *Board of Patent Appeals and Interferences* (Interference No. 105,393), (May 23, 2006),57 pgs.

Pisano, N. A., "Guthrie Miscellaneous Motion 2", *Board of Patent Appeals and Interferences* (Interference No. 105,393), (May 2, 2006),64 pgs.

Pisano, N. A., "Guthrie Opposition to Espiau Motion 2", *Board of Patent Appeals and Interferences* (Interference No. 105,393), (Jul. 18, 2006),84 pgs.

Pisano, N. A., "Guthrie Opposition to Espiau Motion 3", *Board of Patent Appeals and Interferences* (Interference No. 105,393), (Jul. 18, 2006),70 pgs.

Pisano, N. A., "Guthrie Opposition to Espiau Motion 4", *Board of Patent Appeals and Interferences* (Interference No. 105,393), (Jul. 18, 2006),92 pgs.

Pisano, N. A., "Guthrie Preliminary Motion 1", *Board of Patent Appeals and Interferences* (Interference No. 105,393), (May 2, 2006), 27 pgs.

Pisano, N. A., "Guthrie Preliminary Motion 3", *Board of Patent Appeals and Interferences* (Interference No. 105,393), (May 2, 2006), 18 pgs.

Pisano, N. A., "Guthrie Reply 1", *Board of Patent Appeals and Interferences* (Interference No. 105,393), (Sep. 5, 2006),52 pgs.

Pisano, N. A., "Guthrie Reply 2", *Board of Patent Appeals and Interferences* (Interference No. 105,393), (Sep. 5, 2006),47 pgs.

Pisano, N. A., "Guthrie Reply 3", *Board of Patent Appeals and Interferences* (Interference No. 105,393), (Sep. 5, 2006),45 pgs.

Pisano, N. A., "Guthrie Reply 4", *Board of Patent Appeals and Interferences* (Interference No. 105,393), (Sep. 5, 2006),93 pgs.

Pisano, N. A., "Guthrie's Objections to Espiau's Opposition Exhibits", *Guthrie Exhibit 2129, Board of Patent Appeals and Interferences* (Interference No. 105,393), (Jul. 25, 2006),12 pgs.

Pisano, N. A., "Guthrie's Objections to Espiau's Preliminary Motion Exhibits", *Guthrie Exhibit 2127, Board of Patent Appeals and Interferences* (Interference No. 105,393), (May 9, 2006),10 pgs.

Pisano, N. A., "Guthrie's Objections to Espiau's Reply Exhibits", *Guthrie Exhibit 2130, Board of Patent Appeals and Patent Interferences* (Interference No. 105,393), (Sep. 12, 2006),11 pgs.

Pisano, N. A., "Guthrie's Objections to Espiau's Supplemental Preliminary Motion Exhibits", *Guthrie Exhibit 2128, Board of Patent Appeals and Interferences* (Interference No. 105,393), (May 31, 2006), 7 pgs.

Pisano, N. A., "Guthrie's Objections to Exhibits Introduced in Espiau's Motion to Exclued", *Guthrie Exhibit 2134, Board of Patent Appeals and Interferences* (Interference No. 105,393), (Oct. 23, 2006),4 pgs.

Pisano, N. A., "Second Declaration", *Guthrie Exhibit 2076, Board of Patent Appeals and Interferences* (Interference No. 105,393), (Mar. 14, 2006),3 pgs.

Pisano, N. A., et al., "Transcript of Mar. 21, 2006 Telephone Conference", *Espiau Exhibit 1069, Board of Patent Appeals and Interferences* (Interference No. 105,393), (Mar. 21, 2006),117 pgs.

Pisano, N. A., et al., "Transcript of Telephonic Hearing before Administrative Patent Judge Sally C. Medley", *Guthrie Exhibit 2123, Board of Patent Appeals and Interferences* (Interference No. 105,393), (Aug. 24, 2006),33 pgs.

Pobanz, C.J., "Declaration", *Espiau Exhibit 1030, Board of Patent Appeals and Interferences* (Interference No. 105,393), (Apr. 27, 2006),7 pgs.

Pobanz, C. W., "MasterCard Statement", *Espiau Exhibit 1052, Board of Patent Appeals and Interferences* (Interference No. 105,393), (Apr. 7, 2000),3 pgs.

Pobanz, C. W., "MasterCard Statement", *Espiau Exhibit 1053, Board of Patent Appeals and Interferences* (Interference No. 105,393), (May 8, 2000),2 pgs.

Pobanz, C. W., "Second Declaration", *Espiau Exhibit 1054, Board of Patent Appeals and Interference* (Interference No. 105,393), (May 20, 2006),3 pgs.

Pozar, D. M., "Declaration", *Espiau Exhibit 1056, Board of Patent Appeals and Interferences* (Interference No. 105,393), (Apr. 29, 2006), 14 pgs.

Pozar, D. M., "Deposition Transcript", *Espiau Exhibit 1063, Board of Patent Appeals and Interferences* (Interference No. 105,393), (Jun. 19, 2006),67 pgs.

Pozar, D. M., "Errata to the Transcript of the Jun. 19, 2006 Deposition of David M. Pozar", *Espiau Exhibit 1064, Board of Patent Appeals and Interferences* ( Interference No. 105,393), (Jul. 6, 2006),3 pgs.

Pozar, D. M., "Fourth Declaration of David M. Pozar", *Espiau Exhibit 1085, Board of Patent Appeals and Interferences* (Interference No. 105,393), (Aug. 31, 2006),14 pgs.

Pozar, D. M., "Second Declaration", *Espiau Exhibit 1057, Board of Patent Appeals and Interferences* ( Interference No. 105,393), (May 21, 2006),4 pgs.

Pozar, D. M., "Section 4.7 Excitation of Waveguides—Electric and Magnetic Currents", In: Microwave Engineering, 3rd Edition, 2005 (John Wiley & Sons, Inc.), *Espiau Exhibit 1077, Board of Patent Appeals and Interferences* (Interference No. 105,393), (2005),8 pgs.

Pozar, D. M., "Section 5.8 Tapered Lines", In: Microwave Engineering, 3rd Edition, 2005 (John Wiley & Sons, Inc.), *Espiau Exhibit 1036, Board of Patent Appeals and Interferences* (Interference No. 105,393), (2005),9 pgs.

Pozar, D. M., "Section 6.4 Circular Waveguide Cavities", In: Microwave Engineering, 3rd Edition, 2005 (John Wiley & Sons, Inc.), *Espiau Exhibit 1076, Board of Patent Appeals and Interferences* (Interference No. 105,393), (2005),8 pgs.

Pozar, D M., "Third Declaration", *Espiau Exhibit 1078, Board of Patent Appeals and Interferences* (Interference No. 105,393), (Jul. 13, 2006),9 pgs.

Prior, G.A., *Patent Disclosure Summary*, (undated), 2 pgs.

Prior, G. A., et al., *Patent Disclosure Summary*, (Aug. 10, 2000),3 pages.

Prior, G., et al., "Quartz Bulb Enclosed in a Wave-Guide", U.S. Appl. No. 60/234,415, filed Sep. 21, 2000 (*Espiau Exhibit 1006, Board of Patent Appeals and Interferences* (Interference No. 105,393)).

Prior, G., et al., "Wave-Guide Used for the Excitation of an Electrode-Less Metal Halide Plasma Lamp Incorporating a Sold Dielectric Material", U.S. Appl. No. 60/224,059, filed Aug. 9, 2000 (*Guthrie Exibit 2049, Board of Patent Appeals and Interferences* (Interference No. 105,393)).

Prior, G., et al., "Wave-Guide Used for the Excitation of an Electrode-Less Metal Halide Plasma Lamp Incorporating a Solid Dielectric Material", U.S. Appl. No. 60/224,298, filed Aug. 10, 2000 (*Guthrie Exhibit 2054, Board of Patent Appeals and Interferences* (Interference No. 105,393)).

Sandberg, E., et al., "A Mechanical Means of Sealing the Window to an Electrode-Less Metal Halide Bulb That is Integrated Into a Waveguide", U.S. Appl. No. 60/262,536, filed Jan. 17, 2001 (*Guthrie Exhibit 2094, Board of Patent Appeals and Interferences* (Interference 105,393)), 6 pgs.

Sandberg, E., "An Improved Drive Circuit for an Electrode-Less Plasma Lamp That is Embedded in a Waveguide", U.S. Appl. No. 60/241,198, filed Oct. 17, 2000 (*Guthrie Exhibit 2093, Board of Patent Appeals and Interferences* (Interference No. 105,393)), 7 pgs.

Sandberg, E., "Declaration", *Guthrie Exhibit 2035, Board of Patent Appeals and Interferences* (Interference No. 105,393), (Dec. 12, 2005),3 pgs.

Sandberg, E., "Declaration of Edmund Sandberg", *Guthrie Exhibit 2010, Board of Patent Appeals and Interferences* (Interference No. 105,393), (Feb. 20, 2006),14 pgs.

Sandberg, E., et al., "High Efficiency Prism Assembly for Image Projection", U.S. Appl. No. 60/192,258, filed Mar. 27, 2000 (*Espiau Exhibit 1094, Board of Patent Appeals and Interferences* (Interference No. 1094)), 21 pgs.

Sandberg, E., "Light Source for Use in Microdisplay Based Light Engines", U.S. Appl. No. 60/192,731, filed Mar. 27, 2000 (*Guthrie Exhibit 2045, Board of Patent Appeals and Interferences* (Interference No. 105,393)).

Shatz, N., et al., "Optimal Design of Nonimaging Projector Lens for Use With an RF-Powered Source and a Rectangular Target", *Proceedings of SPIE*, vol. 4446, *Espiau Exhibit 1080, Board of Patent Appeals and Interferences* (Interference No. 105,393), (2002), 14 pgs.

Simon, N., "Declaration", *Espiau Exhibit 1055, Board of Patent Appeals and Interferences* (Interference No. 105,393), (May 18, 2006),4 pgs.

Smoler, D. E., "Declaration", *Guthrie Exhibit 2074, Board of Patent Appeals and Interferences* (Interference No. 105,393), (Mar. 13, 2006),6 pgs.

Stallman, M., "Declaration", *Guthrie Exhibit 2012, Board of Patent Appeals and Interferences* (Interference No. 105,393), (Feb. 21, 2006),4 pgs.

Thomas, T., "Guthrie Declaration of Tony Thomas", *Guthrie Exhibit 2008, Board of Patent Appeals and Interferences* (Interference No. 105,393), (Feb. 19, 2006),4 pgs.

Turner, B. P., "Declaration", *Espiau Exhibit 1066, Board of Patent Appeals and Interferences* ( Interference No. 105,393), (Jul. 12, 2006),4 pgs.

Turner, D., "Declaration", *Espiau Exhibit 1034, Board of Patent Appeals and Interferences* (Interference No. 105,393), (Apr. 27, 2006),5 pgs.

Turner, B. P., "Deposition Transcript of Brian P. Turner, Ph.D", *Espiau Exhibit 1099, Board of Patent Appeals and Interferences* (Interference No. 105,393), (Oct. 6, 2005),85 pgs.

Turner, D. B., "Deposition Transcript of David B. Turner", *Espiau Exhibit 1067, Board of Patent Appeals and Interferences* (Interference No. 105,393), (Jul. 6, 2006),56 pgs.

Turner, D., "E-Mail Message to Chan Joshi, et al.", *Guthrie Exhibit 2065, Board of Patent Appeals and Interferences* (Interference No. 105,393), (May 15, 2000),1 pg.

Turner, D., "E-Mail Message to Chan Joshi, et al., with attached PowerPoint Presentation", *Guthrie Exhibit 2069, Board of Patent Appeals and Interferences* (Interference No. 105,393), (May 18, 2000),32 pgs.

Turner, D., "E-Mail Message to Charles Guthrie", *Guthrie Exhibit 2068, Board of Patent Appeals and Interferences* (Interference No. 105,393), (May 17, 2000),1 pg.

Turner, D., "E-Mail Message to Charlie Guthrie", *Guthrie Exhibit 2066, Board of Patent Appeals and Interferences* (Interference No. 105,393), (May 15, 2000),1 pg.

Turner, D., "E-Mail Message to Greg Prior", *Guthrie Exhibit 2059, Board of Patent Appeals and Interferences* (Interference No. 105,393), (Apr. 16, 2000),1 pg.

Turner, B. P., "Second Declaration of Brian P. Turner", *Espiau Exhibit 1091, Board of Patent Appeals and Interferences* (Interference No. 105,393), (Sep. 19, 2006),2 pgs.

Vu, D. H., "Notice of Allowability for "Plasma Lamp With Dielectric Waveguide", U.S. Appl. No. 09/809,718, filed Mar. 15, 2001", *Espiau Exhibit 1047, Board of Patent Appeals and Interferences* (Interference No. 105,393), (Dec. 12, 2003),3 pgs.

Vu, D. H., "Office Action re: Plasma Lamp With Dielectric Waveguide, U.S. Appl. No. 09/809,718, filed Mar. 15, 2001", *Guthrie Exhibit 2087, Board of Patent Appeals and Interferences* (Interference No. 105,393), (Nov. 6, 2002),18 pgs.

Vu, D. H., "Office Communication for U.S. Appl. No. 09/809,718, filed Jul. 18, 2003", *Guthrie Exhibit 2096, Board of Patent Appeals and Interferences* (Interference No. 105,393), (Jul. 18, 2006),2 pgs.

Westberg, D. J., "Response to Office Action Mailed Jun. 17, 2002 (in Improved High Intensity Light Source, U.S. Appl. No. 09/818,092, filed Mar. 26, 2001)", *Espiau Exhibit 1043, Board of Patent Appeals and Interferences* (Interference No. 105,393), (Jun. 5, 2003),27 pgs.

Wharmby, D. O., "Chapter 11—Electrodeless Lamps", In: Lamps & Lighting, 4th Edition, 1997 (Arnold & John Wiley & Sons, Inc., *Espiau Exhibit 1039, Patent Appeals and Interferences* (Interference No. 105,393), (1997),13 pgs.

Wharmby, D. O., "Corrected Third Declaration of David O. Wharmby", *Espiau Exhibit 1083, Board of Patent Appeals and Interferences* (Interference No. 105,393), (Aug. 3, 2006),28 pgs.

Wharmby, D. O., "Curriculum Vitae", *Espiau Exhibit 1038, Board of Patent Appeals and Interferences* (Interference No. 105,393), (Nov. 2005),7 pgs.

Wharmby, D. O., "Declaration", *Espiau Exhibit 1040, Board of Patent Appeals and Interferences* (Interference No. 105,393), (May 2, 2006),20 pgs.

Wharmby, D. O., "Deposition Transcript", *Espiau Exhibit 1061, Board of Patent Appeals and Interferences* (Interference No. 105,393), (Jun. 15, 2006),57 pgs.

Wharmby, D. O., "Electrodeless Lamps for Lighting: A Review", *IEE Proceedings-A*, vol. 140(6), *Guthrie Exhibit 2085, Board of Patent Appeals and Interferences* (Interference No. 105,393), (Nov. 1993),9 pgs.

Wharmby, D. O., "Errata to the Transcript of the Jun. 15, 2006 Deposition of David O Wharmby", *Espiau Exhibit 1062, Board of Patent Appeals and Interferences* (Interference No. 105,393), (Jul. 7, 2006),4 pgs.

Wharmby, D. O., "Fourth Declaration of David O. Wharmby", *Espiau Exhibit 1084, Board of Patent Appeals and Interferences* (Interference No. 105,393), (Aug. 31, 2006),18 pgs.

Wharmby, D. O., "Second Declaration", *Espiau Exhibit 1058, Board of Patent Appeals and Interferences* (Interference No. 105,393), (May 23, 2006),5 pgs.

Wilson, D., "Declaration", *Guthrie Exhibit 2034, Board of Patent Appeals and Interferences* (Interference No. 105,393), (Dec. 12, 2005),3 pgs.

Wilson, D., et al., "Electrode-Less Metal Halide Plasma Lamp With Integrated Electronics", U.S. Appl. No. 60/224,290, filed Aug. 10, 2000 (*Guthrie Exhibit 2052, Board of Patent Appeals and Interferences* (Interference No. 105,393)).

Wilson, D., "Guthrie Declaration of Donald Wilson", *Guthrie Exhibit 2039, Board of Patent Appeals and Interferences* (Interference No. 105,393), (Feb. 18, 2006),10 pgs.

Wilson, D., et al., "High Temperature, Low Cost Window Sealing Technique for Plasma Lamps", U.S. Appl. No. 60/224,291, filed Aug. 10, 2000 (*Guthrie Exhibit 2053, Board of Patent Appeals and Interferences* (Interference No. 105,393)).

Wilson, D., et al., "Light Source Consisting of an Electrode-Less Metal Halide Plasma Bulb That is Integrated Into a Wave-Guide", U.S. Appl. No. 60/224,289, filed Aug. 10, 2000 (*Guthrie Exhibit 2051, Board of Patent Appeals and Interferences* (Interference No. 105,393)).

Wilson, D., et al., "Means to Reduce EMI in a Wave-Guide", U.S. Appl. No. 60/224,503, filed Aug. 10, 2000 (*Guthrie Exhibits 2029 and 2102, Board of Patent Appeals and Interferences* (Interference No. 105,393)), 20 pgs.

Wilson, D., et al., "R.F. Wave-Guide Into Which an Insert of a Hermetric Material That Has Been Either Molded or Plasma Deposited", U.S. Appl. No. 60/224,257, filed Aug. 10, 2000 (*Guthrie Exhibit 2050, Board of Patent Appeals and Interferences* (Interference No. 105,393)).

Wilson, D,, et al., "Use of a Coating to Prevent the Reduction of Ceramic to Elemental Metal in the Bulb of a Wave-Guide Lamp", U.S. Appl. No. 60/224,866, filed Aug. 11, 2000 (*Guthrie Exhibit 2055, Board of Patent Appeals and Interferences* (Interference No. 105,393)).

Wilson, D., et al. "Use of a Heat Sink in a Plasma Light Source (Located Between a Wave Guide That Incorporates the Bulb and the Drive Electronics", U.S. Appl. No. 60/224,961, filed Aug. 11, 2000 (*Guthrie Exhibit 2030, Board of Patent Appeals and Interferences* (Interference No. 105,393)), 6 pgs.

Wilson, D., et al., "Use of a Heat Sink in a Plasma Light Source (Located Externally and Surrounding the Lamp Assembly)", U.S. Appl. No. 60/224,617, filed Aug. 11, 2000 (*Guthrie Exhibits 2031 and 2103, Board of Patent Appeals and Interferences* (Interference No. 105,393)), 20 pgs.

"A Ceramic Wave-Guide Lamp—From a Concept to Reality", *Espiau Exhibit 1208, Board of Patent Appeals and Interferences*(Interference No. 105,393), (Aug. 4, 2000),12 pgs.

"An Integrated Lamp—Waveguide Concept", *Espiau Exhibit 1032, Board of Patent Appeals and Interferences*(Interference No. 105,393), (Jul. 11, 2000),13 pgs.

"U.S. Appl. No. 09/809,718, Amendments Under 37 C.F.R. Sec. 1.312 mailed Dec. 15, 2003", 9 pgs.

"U.S. Appl. No. 10/356,340, Non Final Office Action mailed Jun. 10, 2004", 6 pgs.

"U.S. Appl. No. 10/356,340, Notice of Allowance mailed Oct. 21, 2004", 4 pgs.

"U.S. Appl. No. 10/356,340, Notice of Allowance mailed Feb. 23, 2005", 4 pgs.

"U.S. Appl. No. 10/356,340, Reply filed Oct. 7, 2004 to Office Action mailed Jun. 10, 2004", 95 pgs.

"U.S. Appl. No. 10/947,800 Non Final Office Action mailed Jul. 12, 2007", 16 pgs.

"U.S. Appl. No. 11/010,093 Non Final Office Action mailed Apr. 4, 2007", 22 pgs.

"U.S. Appl. No. 11/010,093 Non Final Office Action mailed Jun. 14, 2006", 25 pgs.

"U.S. Appl. No. 11/010,093 Response filed Dec. 13, 2006 to Non Final Office Action mailed Jun. 14, 2006", 13 pgs.

"U.S. Appl. No. 11/083,552 Non Final Office Action mailed Aug. 10, 2007", OARN,34 pgs.

"U.S. Appl. No. 11/083,552 Preliminary Amendment filed Jul. 15, 2005", 4 pgs.

"U.S. Appl. No. 11/083,557 Non Final Office Action mailed Aug. 30, 2006", 18 pgs.

"U.S. Appl. No. 11/083,557 Notice of Allowance mailed May 3, 2007", 19 pgs.

"U.S. Appl. No. 11/083,557 Preliminary Amendment filed Jul, 15, 2005", 4 pgs.

"U.S. Appl. No. 11/083,557 Response filed Jan. 19, 2007 to Non Final Office Action mailed Aug. 30, 2006", 13 pgs.

"U.S. Appl. No. 11/083,558 Preliminary Amendment filed Apr. 26, 2007", 5 pgs.

"U.S. Appl. No. 11/083,558 Preliminary Amendment filed Jul. 15, 2005", 4 pgs.

"U.S. Appl. No. 11/083,559 Preliminary Amendment filed Jul. 15, 2005", 4 pgs.

"U.S. Appl. No. 11/084,069, Non-Final Office Action mailed Aug. 9, 2007", 35 pgs.

"U.S. Appl. No. 11/084,177 Non Final Office Action mailed Aug. 9, 2007", OARN,34 pgs.

"U.S. Appl. No. 11/084,177 Preliminary Amendment filed Jul. 15, 2005", 4 pgs.

"U.S. Appl. No. 11/618,673 Preliminary Amendment filed Dec. 29, 2006", 8 pgs.

"Channel Microwave Quote No. 100102 re: Various Items", *Espiau Exhibit 1162, Board of Patent Appeals and Interferences*(Interference No.105, 393), (May 18, 200),2 pgs.

"Complaint for Damages and Injunctive and Other Relief",*Guthrie Exhibit 2229, Board of Patent Appeals and Interferences* (Interference No. 105,393), (Oct. 23, 2001),38 pgs.

"Conference Call", *Guthrie Exhibit 2230, Board of Patent Appeals and Interferences* (Interference No. 105,393), (Feb. 9, 2006),25 pgs.

"Conference Call", *Guthrie Exhibit 2225, Board of Patent Appeals and Interferences* (Interference No. 105,393), (Mar. 8, 2007),24 pgs.

"Coorstek Quotation", *Espiau Exhibit 1197, Board of Patent Appeals and Interferences*(Interference No. 105,393), (Aug. 2, 2000),3 pgs.

"Cross-Examination of Carl W., Pobanz", *Espiau Exhibit 1236, Board of Patent Appeals and Interferences* (Interference No. 105,393), Merrill Legal Solutions,(Aug. 19, 2007),68 pgs.

"Cross-Examination of David Pozar", *Espiau Exhibit 1063, Board of Patent Appeals and Interferences*(Interference No. 105,393), (Jun. 19, 2006),196 pgs.

"Cross-Examination of Matt Espiau (Videotaped )", *Espiau Exhibit 1239, Board of Patent Appeals and Interferences*(Interference No. 105,393), Merrill Legal Solutions,(Aug. 17, 2007),225 pgs.

"Declaration of Carl W. Pobanz", *Espiau Exhibit 1030, Board of Patent Appeals and Interferences*(Interference No. 105,393), (Apr. 27, 2006),7 pgs.

"Declaration of Chandrashekhar J. Joshi", *Espiau Exhibit 1051, Board of Patent Appeals and Interferences*(Interference No. 105,393), (May 22, 2006),3 pgs.

"Declaration of David Turner", *Espiau Exhibit 1034, Board of Patent Appeals and Interferences*(Interference No. 105,393), (Apr. 27, 2006),5 pgs.

"Declaration of Ellen Thotus", *Espiau Exhibit 1242, Board of Patent Appeals and Interferences* (Interference No. 105,393), (Aug. 29, 2007),3 pgs.

"Declaration of Frederick Matthew Espiau", *Guthrie Exhibit 2227, Board of Patent Appeals and Interferences* (Interference No. 105,393), (Jun. 9, 2000),68 pgs.

"Declaration of Frederick Matthew Espiau", *Espiau Exhibit 1168, Board of Patent Appeals and Interferences*(Interference No. 105,393), (Jul. 29, 2007),17 pgs.

"Declaration of Penny Ortega", *Espiau Exhibit 1244, Board of Patent Appeals and Interferences* (Interference No. 105,393), (Aug. 29, 2007),3 pgs.

"Declaration of Regis C.Worley, Jr.", *Guthrie Exhibit 2234, Board of Patent Appeals and Interferences* (Interference No. 105,393), (Aug. 20, 2007),3 pgs.

"Deposition (video transcript) of Chandrashekhar Joshi, M.D.", *Espiau Exhibit 1234, Board of Patent Appeals and Interferences*(Interference No. 105,393), Merrill Legal Solutions,(Aug. 13, 2007),152 pgs.

"Deposition of Anthony Cooper", *Guthrie Exhibit 2218, Board of Patent Appeals and Interferences* (Interference No. 105,393), (Aug. 9, 2007),27 pgs.

"Deposition of Chandrashekhar J. Joshi",*Espiau Exhibit 1068, Board of Patent Appeals and Interferences*(Interference No. 105,393), (Jul. 7, 2006),139 pgs.

"Deposition of Charles Guthrie", *Guthrie Exhibit 2222, Board of Patent Appeals and Interferences* (Interference No. 105,393), (Aug. 14, 2007),23 pgs.

"Deposition of David B. Turner", *Espiau Exhibit 1237 Board of Patent Appeals and Interferences* (Interference No. 105,393), Merrill Legal Services,(Aug. 20, 2007),201 pgs.

"Deposition of David Smoler", *Guthrie Exhibit 2223, Board of Patent Appeals and Interferences* (Interference No. 105,393), (Aug. 15, 2007),19 pgs.

"Deposition of Dennis R. Nunes", *Guthrie Exhibit 2214, Board of Patent Appeals and Interferences* (Interference No. 105,393), (Aug. 6, 2007),24 pgs.

"Deposition of Donald M. Wilson",*Guthrie Exhibit 2215, Board of Patent Appeals and Interferences* (Interference No. 105,393), (Aug. 6, 2007),77 pgs.

"Deposition of Floyd Pothoven", *Guthrie Exhibit 2219, Board of Patent Appeals and Interferences* (Interference No. 105,393), (Aug. 9, 2007),23 pgs.

"Deposition of Gregory Prior", *Guthrie Exhibit 2216, Board of Patent Appeals and Interferences* (Interference No. 105,393), (Aug. 7, 2007),43 pgs.

"Deposition of Joseph Bennett", *Guthrie Exhibit 2221, Board of Patent Appeals and Interferences* (Interference No. 105,393), (Aug. 12, 2007),17 pgs.

"Deposition of Madhu S. Gupta, Ph.D.", *Guthrie Exhibit 2220, Board of Patent Appeals and Interferences* ( Interference No. 105,393), (Aug. 10, 2007),38 pgs.

"Deposition of Shelby Katz", *Guthrie Exhibit 2224, Board of Patent Appeals and Interferences* (Interference No. 105,393), (Aug. 16, 2007),15 pgs.

"Deposition of Vivek Gandhi", *Guthrie Exhibit 2217, Board of Patent Appeals and Interferences* (Interference No. 105,393), (Aug. 8, 2007),14 pgs.

"Diagram", *Guthrie Exhibit 2205, Board of Patent Appeals and Interferences*(Interference No. 105,393), (No date listed),1 pg.

"Dielectric Resonator Concept for Plasma Lamps", *Espiau Exhibit 1138, Board of Patent Appeals and Interferences*(Interference No. 105,393), (Apr. 20, 2000),5 pgs.

"DRI—Tenco Team Plasma Lamp Business Model", *Espiau Exhibit 1145, Board of Patent Appeals and Interferences*(Interference No. 105,393), (prior to Jul. 30, 2007),1 pg.

"DRI Schematic", *Espiau Exhibit 1132, Board of Patent Appeals and Interferences*(Interference No. 105,393), (Jul. 30, 2007),2 pgs.

"E-mail to D. Turner et al", *Espiau Exhibit 1228, Board of Patent Appeals and Interferences*(Interference No. 105,393), (May 14, 2002),1 pg.

"E-mail to Espiau re: Lamp Project", *Espiau Exhibit 1226, Board of Patent Appeals and Interferences*(Interference No. 105,393), (Apr. 23, 2002),1 pg.

"E-mail to Espiau re: Meeting", *Espiau Exhibit 1227, Board of Patent Appeals and Interferences*(Interference No. 105,393), (Apr. 26, 2002),1 pg.

"E-mail to Nicola A Pisano", *Guthrie Exhibit 2232, Board of Patent Appeals and Interferences* (Interference No. 105,393), (May 23, 2007),1 pg.

"E-mail to Nicola A Pisano", *Guthrie Exhibit 222, Board of Patent Appeals and Interferences* (Interference No. 105,393), (Aug. 21, 2007),1 pg.

"E-mail to Wayne Catlett et al, re Lamp Schedule", *Espiau Exhibit 1224, Board of Patent Appeals and Interferences*(Interference No. 105,393), (Jul. 21, 2000),1 pg.

"Errata to the transcript of the Aug. 13, 2007 deposition of Chandrashekhar J. Joshi", *Espiau Exhibit 1235, Board of Patent Appeals and Interferences* (interference No. 105,393), (Aug. 28, 2007),5 pgs.

"Errata to the transcript of the Aug. 14, 2007 deposition of Charles Guthrie", *Guthrie Exhibit 2238, Board of Patent Appeals and Interferences* (Interference No. 105,393), (Aug. 30, 2007),3 pgs.

"Errata to the transcript of the Aug. 15, 2007 deposition of David Smoler", *Guthrie Exhibit 2237, Board of Patent Appeals and Interferences* (Interference No.105,393), (Aug. 29, 2007),3 pgs.

"Errata to the transcript of the Aug. 17, 2007 Deposition of Frederick "Matt" Espiau", *Espiau Exhibit 1240, Board of Patent Appeals and Interferences* (Interference No. 105,393), (Aug. 28, 2007),4 pgs.

"Errata to the transcript of the Aug. 20, 2007 Deposition of David B. Turner", *Espiau Exhibit 1238, Board of Patent Appeals and Interferences* (Interference No. 105,393), (Aug. 27, 2007),3 pgs.

"Errata to the transcript of the Aug. 6, 2007 deposition of Donald M. Wilson", *Guthrie Exhibit 2236, Board of Patent Appeals and Interferences* (Interference No. 105,393), (Aug. 29, 2007),3 pgs.

"Errata to the transcript of the Aug. 9, 2007 deposition of Anthony Cooper", *Guthrie Exhibit 2239, Board of Patent Appeals and Interferences* (Interference No. 105,393), (Aug. 30, 2007),3 pgs.

"Errata to the transcript of the Aug. 9, 2007 of Floyd Pothoven", *Guthrie Exhibit 2235, Board of Patent Appeals and Interferences* (Interference No. 105,393), (Aug. 29, 2007),3 pgs.

"Espiau Motion 7 for Priority", *Guthrie, et al. v. Espiau, et al., Board of Patent Appeals and Interferences* (Interference No. 105,393), (Jul. 30, 2007),94 pgs.

"Espiau notice of deposition for cross examination and intent to vido record the depositon of Dennis Nunes", *Espiau Exhibit 1223, Board of Patent Appeals and Interferences*(Interference No. 105,293), (Aug. 6, 2007),3 pgs.

"Espiau Opposition 7 (to Guthrie Priority Motion 7)", *Espiau, Board of Patent Appeals and Interferences* (Interference No. 105,393), (Aug. 31, 2007),121 pgs.

"Espiau Third Declaration of David B. Turner", *Espiau Exhibit 1233, Board of Patent Appeals and Interferences* (Interference No. 105,393), (Aug. 21, 2007),10 pgs.

"Experiment 1: Cavity Resonator, School of Engineering and Applied Science", *Espiau Exhibit 1026, Board of Patent Appeals and Interferences*(Interference No. 105,393), (Winter, 1995),5 pgs.

"Experiment 3: Cavity Resonator, School of Engineering and Applied Science", *Espiau Exhibit 1025, Board of Patent Appeals and Interferences*(Interference No. 105,393), (Oct. 24, 1990),15 pgs.

"Fifth Declaration of David M. Pozar", *Espiau Exhibit 1183, Board of Patent Appeals and Interferences*(Interference No. 105,393), (Jul. 30, 2007),17 pgs.

"Financial Ledger", *Espiau Exhibit 1241, Board of Patent Appeals and Interferences* (Interference No. 105,393), (1999-2001),3 pgs.

"Graph With Handwritten Notes", *Espiau Exhibit 1155, Board of Patent Appeals and Interferences*(Interference No. 105,393), (prior to Jul. 30, 2007),3 pgs.

"Guthrie Exhibit List", *Espiau, Board of Patent Appeals and Interferences* (Interference No. 105,393), (Aug. 31, 2007),13 pgs.

"Guthrie Opposition 7", *Espiau, Board of Patent Appeals and Interferences* (Interference No. 105,393), (Aug. 31, 2007),122 pgs.

"Handwritten Provisional Draft for An Integrated Lamp Waveguide Concept", *Espiau Exhibit 1031, Board of Patent Appeals and Interferences*(Interference No. 105,393), (Jul. 30, 2007),13 pgs.

"Handwritten Notes re: Discussion with Wayne, Ingmar, David and Chan", *Espiau Exhibit 1207, Board of Patent Appeals and Interferences*(Interference No. 105,393), (prior to Jul. 30, 2007),1 pg.

"http://www.laseraware.com/history.html", *Guthrie Exhibit 2206, Board of Patent Appeals and Interferences*(Interference No. 105,393), (Apr. 11, 2006),1 pg.

"In Re Digital Reflections, Inc.—Chapter 7 Bankruptcy", *Espiau Exhibit 1243, Board of Patent Appeals and Interferences* (Interference No. 105,393), (May 28, 2002),57 pgs.

"Invoice relating to DRI Plasma Lamp Project", *Exhibit 1219, Board of Patent Appeals and Interferences*(Interference No. 105,393), (Jun. 6, 2000),3 pgs.

"IPLDWC Design I Drawings", *Espiau Exhibit 1180, Board of Patent Appeals and Interferences*(Interference No. 105,393), (Jul. 14, 2000),2 pgs.

"Luxim Corporation Project Summit", *Guthrie Exhibit 2201, Board of Patent Appeals and Interferences*(Interference No. 105,393), (Jun. 17, 2007),20 pgs.

"MasterCard Statement—TravelersBank", *Espiau Exhibit 1027, Board of Patent Appeals and Interferences*(Interference No. 105,393), (Apr. 2000),1 pg.

"May 21, 2007 Hearing", *Guthrie Exhibit 2231, Board of Patent Appeals and Interferences* (Interference No. 105,393), (May 21, 2007),33 pgs.

"Miscellaneous Handwritten Notes", *Espiau Exhibit 1213, Board of Patent Appeals and Interferences*(Interference No. 105,393), (prior to Jul. 30, 200),1 pg.

"Miscellaneous Handwritten Notes", *Espiau Exhibit 1189, Board of Patent Appeals and Interferences*(Interference No. 105,393), (Jul. 28, 2000),2 pgs.

"Miscellaneous Handwritten Notes", *Espiau Exhibit 1153, Board of Patent Appeals and Interferences*(Interference No. 105,393), (May 3, 2000),4 pgs.

"Miscellaneous Handwritten Notes", *Espiau Exhibit 1137, Board of Patent Appeals and Interferences*(Interference No. 105,393), (Apr. 20, 2000),3 pgs.

"Miscellaneous Handwritten Notes", *Espiau Exhibit 1169, Board of Patent Appeals and Interferences*(Interference No. 105,393), (Jun. 12, 2000),1 pg.

"Miscellaneous Handwritten Notes", *Espiau Exhibit 1190, Board of Patent Appeals and Interferences*(Interference No. 105,393), (Jul. 28, 2000),2 pgs.

"Notebook Pages from Matt Espiau", *Espiau Exhibit 1127, Board of Patent Appeals and Interferences*(Interference No. 105,393), (Apr. 27, 2000),13 pgs.

"Notebook Pages from Yian Chang", *Espiau Exhibit 1126, Board of Patent Appeals and Interferences*(Interference No. 105,393), (Aug. 2000),57 pgs.

"Notes", *Espiau Exhibit 1229, Board of Patent Appeals and Interferences*(Interference No. 105,393), (May 14, 2002),2 pgs.

"Notes from Meeting with Joshi, Turner, Espiau regarding Review of Samples", *Espiau Exhibit 1209, Board of Patent Appeals and Interferences*(Interference No. 105,393), (Aug. 8, 2000),2 pgs.

"Notes re: Alumina Puck and Testing of Puck", *Espiau Exhibit 1125, Board of Patent Appeals and Interferences*(Interference No. 105,393), (Aug. 8, 2000),143 pgs.

"Notes Regarding Lighting of Lamp", *Espiau Exhibit 1210, Board of Patent Appeals and Interferences*(Interference No. 105,393), (Aug. 12, 2000),1 pg.

"Patent Disclosure Summary", *Espiau Exhibit 1225, Board of Patent Appeals and Interferences*(Interference No. 105,393), (Apr. 22, 2000),4 pgs.

"Photo", *Guthrie Exhibit 2213, Board of Patent Appeals and Interferences* (Interference No. 105,393), (Aug. 20, 20007),1 pg.

"Photograph", *Espiau Exhibit 1222, Board of Patent Appeals and Interferences*(Interference No. 105,393), (prior to Jul. 30, 2007),1 pg.

"Photograph", *Espiau Exhibit 1221, Board of Patent Appeals and Interferences*(Interference No. 105,393), (prior to Jul. 30, 2007),1 pg.

"Schematic", *Espiau Exhibit 1173, Board of Patent Appeals and Interferences*(Interference No. 105,393), (prior to Jul. 30, 2007),1 pg.

"Schematic re: Plasma Lamp Concept", *Espiau Exhibit 1150, Board of Patent Appeals and Interferences*(Interference No. 105,393), (prior to Jul. 30, 2007),1 pg.

"Schematics re: Retangular Waveguide", *Espiau Exhibit 1166, Board of Patent Appeals and Interferences*(Interference No. 105,393), (Jun. 6, 2000),2 pgs.

"Second Declaration of Carl W. Pobanz", *Espiau Exhibit 1054, Board of Patent Appeals and Interferences*(Interference No. 105,393), (May 20, 2006),3 pgs.

"Second Declaration of Chandrashekhar J. Joshi", *Espiau Exhibit 1160, Board of Patent Appeals and Interferences*(Interference No. 105,393), (Jul. 29, 2007),15 pgs.

"Second Declaration of David B. Turner", *Espiau Exhibit 1158, Board of Patent Appeals and Interferences*(Interference No. 105,393), (Jul. 24, 2007),19 pgs.

"Sixth Declaration of David M. Pozar", *Espiau Exhibit 1254, Board of Patent Appeals and Interferences* (Interference No. 105,393), (Aug. 31, 2007),15 pgs.

"Sound Deposition Services, Inc. *Guthrie* vs. *Espiau:* Exhibit 1211", *Guthrie Exhibit 2226, Board of Patent Appeals and Interferences* (Interference No. 105,393), (Aug. 23, 2007),14 pgs.

"The Center for High Frequency Electronics", *Guthrie Exhibit 2228, Board of Patent Appeals and Interferences* (Interference No. 105,393), http://www.chfe.ee.ucla.edu/8/26/2007,(2007),1 pg.

"Trip Report—Chan, Don, Matt", *Espiau Exhibit 1220, Board of Patent Appeals and Interferences*(Interference No. 105,393), (Jul. 30, 2007),1 pg.

"Turner Engineering Purchase Order T62801 / Trade References / T. Weaver's Quote", *Espiau Exhibit 1175, Board of Patent Appeals and Interferences*(Interference No. 105,393), (prior to Jul. 30, 2007),3 pgs.

"United States Securities and Exchange Commission Form D", *Guthrie Exhibit 2202, Board of Patent Appeals and Interferences*(Interference No. 105,393), (May 26, 2007),6 pgs.

Brougher, S., "E-Mail to D. Turner re: Lamp Project Schedule", *Espiau Exhibit 1146, Board of Patent Appeals and Interferences*(Interference No. 105,393), (Apr. 17, 2000),1 pg.

Catlett, W., "E-Mail to D. Turner re: DRI Luxim Waveguide Project", *Espiau Exhibit 1186, Board of Patent Appeals and Interferences*(Interference No. 105,393), (Jul. 22, 2000),2 pgs.

Chang, Y., "E-Mail to D. Turner enclosing June Invoice", *Espiau Exhibit 1177, Board of Patent Appeals and Interferences*(Interference No. 105,393), (Jul. 5, 2000),2 pgs.

Chang, Y., "E-Mail to D. Turner re: Time and Expenses for July", *Espiau Exhibit 1204, Board of Patent Appeals and Interferences*(Interference No. 105,393), (Aug. 1, 2000),14 pgs.

Chang, Y., "E-Mail to Espiau re: Integrated Lamp Waveguide Concept", *Espiau Exhibit 1192, Board of Patent Appeals and Interferences*(Interference No. 105,393), (Jul. 24, 2000),1 pg.

Chang, Y., "E-Mail to Espiau re: Lamp Assy. Figures", *Exhibit 1201, Board of Patent Appeals and Interferences*(Interference No. 105,393), (Jul. 30, 2000),3 pgs.

Chang, Y., "E-Mail to J. Chandrashekhar, et al. re: Integrated Lamp Waveguide Concept", *Espiau Exhibit 1200, Board of Patent Appeals and Interferences*(Interference No. 105,393), (Jul. 30, 2000),1 pg.

Chang, Y., "E-Mail to M. Espiau re: Drawings", *Espiau Exhibit 1181, Board of Patent Appeals and Interferences*(Interference No. 105,393), (Jul. 16, 2000),1 pg.

Chang, Y., "E-Mail to M. Espiau re: Integrated Lamp Waveguide Concept w/ Lastest Revisions With Drawings", *Espiau Exhibit 1198, Board of Patent Appeals and Interferences*(Interference No. 105,393), (Jul. 27, 2000),1 pg.

Chang, Y., "E-Mail to M. Espiau re: New Figures / Patent Drawings", *Espiau Exhibit 1194, Board of Patent Appeals and Interferences*(Interference No. 105,393), (Jul. 25, 2000),1 pg.

Chang, Y., "E-Mail to M. Espiau re: Figures / Patent Drawings", *Espiau Exhibit 1193, Board of Patent Appeals and Interferences*(Interference No. 105,393), (Jul. 25, 2000),1 pg.

Chang, Y., "E-Mail to M. Espiau, et al. re: Integrated Lamp Waveguide Concept w/ Latest Revisions With Drawings", *Espiau Exhibit 1196, Board of Patent Appeals and Interferences*(Interference No. 105,393), (Jul. 26, 2000),1 pg.

Chang, Y., "Notes re: The Integrated Dielectric Waveguide Plasma Lamp Concept", *Espiau Exhibit 1152, Board of Patent Appeals and Interferences*(Interference No. 105,393), (2000),32 pgs.

Espiau, M., "E-Mail to D. Turner re: Three Phase Service", *Espiau Exhibit 1176, Board of Patent Appeals and Interferences*(Interference No. 105,393), (Jun. 29, 2000),2 pgs.

Espiau, M., "E-Mail to Y. Chang re: Integrated Lamp Waveguide Concept", *Espiau Exhibit 1199, Board of Patent Appeals and Interferences*(Interference No. 105,393), (Jul. 28, 2000),1 pg.

Espiau, M., "E-Mail to Y. Chang, et al. re: Integrated Lamp Waveguide Concept", *Espiau Exhibit 1195, Board of Patent Appeals and Interferences*(Interference No. 105,393), (Jul. 26, 2000),1 pg.

Espiau, M., "E-Mail to Y. Chang, et al. re: Integrated Lamp Waveguide Concept", *Espiau Exhibit 1191, Board of Patent Appeals and Interferences*(Interference No. 105,393), (Jul. 24, 2000),1 pg.

Espiau, M., "E-Mail to Y. Chang, et al. re: Integrated Lamp Waveguide Concept", *Espiau Exhibit 1182, Board of Patent Appeals and Interferences*(Interference No. 105,393), (Jul. 16, 2000),1 pg.

Espiau, M., "E-Mail to Y. Chang, et al. re: Integrated Lamp Waveguide Concept", *Espiau Exhibit 1179, Board of Patent Appeals and Interferences*(Interference No. 105,393), (Jul. 13, 2000),1 pg.

Guthrie, C., "E-Mail to D. Turner re: Amplifier for Development", *Espiau Exhibit 1144, Board of Patent Appeals and Interferences*(Interfererence No. 105,393), (May 6, 2000),1 pg.

Guthrie, C., "E-Mail to D. Turner re: Dielectric Constants from Trans Tech", *Espiau Exhibit 1154, Board of Patent Appeals and Interferences*(Interference No. 105,393), (May 6, 2000), 1 pg.

Guthrie, C., "E-Mail to D. Turner re: Visit / Potential Meeting",*Espiau Exhibit 1156, Board of Patent Appeals and Interferences*(Interference No. 105,393), (May 6, 2000),1 pg.

Ishii, T. K., "Microwave Engineering (Second Edition)", *Guthrie Exhibit 2204, Board of Patent Appeals and Interferences*(Interference No. 105,393), (1989),3 pgs.

Ishii, T. K., "Microwave Engineering (Second Edition)",*Espiau Exhibit 1232, Board of Patent Appeals and Interferences*(Interference No. 105,393), (1989),3 pgs.

Joshi, C., "E-Mail to M. Espiau re: ILWC Patent Paper", *Espiau Exhibit 1178, Board of Patent Appeals and Interferences*(Interference No. 105,393), (Jul. 13, 2000),2 pgs.

Mullen, D., "E-Mail to D. Turner re: DRI Meeting", *Espiau Exhibit 1139, Board of Patent Appeals and Interferences*(Interference No. 105,393), (Apr. 20, 2000),1 pg.

Mullen, D., "E-Mail to Joshi, et al. re: First Pass Thermal Model of Lamp Housing (attaching plasma lamp geometry)", *Espaiu Exhibit 1151, Board of Patent Appeals and Interferences*(Interference No. 105,393), (May 1, 2000),2 pgs.

Pozar, David M., "Microwave Engineering, Third Edition", *Espiau Exhibit 1250, Board of Patent Appeals and Interferences* (Interference No. 105,393), From Chapter 2,(2005),10 pgs.

Pozar, David M., "Microwave Engineering, Third Edition",*Espiau Exhibit 1251, Board of Patent Appeals and Interferences* (Interference No. 105,393), Chapter 5—Impedance Matching and Tuning,(2005),46 pgs.

Pozar, David M., "Microwave Engineering, Third Edition", *Espiau Exhibit 1252, Board of Patent Appeals and Interferences* (Interference No. 105,393), Chapter 6, Microwave Resonators,(2005),14 pgs.

Rizzi, Peter A., "Microwave Engineering Passive Circuits", *Espiau Exhibit 1231, Board of Patent Appeals and Interferences*(Interference No. 105,393), (1988),4 pgs.

Turner, D., "E-Mail to D. Mullen confirming DRI Meeting",*Espiau Exhibit 1136, Board of Patent Appeals and Interferences*(Interference No. 105,393), (Apr. 18, 2000), 1 pg.

Turner, D., "E-Mail to C. Joshi re: Property Info", *Espiau Exhibit 1143, Board of Patent Appeals and Interferences*(Interference No. 105,393), (Apr. 25, 2000),2 pgs.

Turner, D., "E-Mail to C. Joshi, et al. re: DRI—Resume, etc.", *Espiau Exhibit 1142, Board of Patent Appeals and Interferences*(Interference No. 105,393), (Apr. 24, 2000),3 pgs.

Turner, D., "E-Mail to C. Joshi, et al. re: Material Specification",*Espiau Exhibit 1167, Board of Patent Appeals and Interferences*(Interference No. 105,393), (Jun. 9, 2000),3 pgs.

Turner, D., "E-Mail to C. Joshi, et al, re: DRI / Luxim Agreements", *Espiau Exhibit 1170, Board of Patent Appeals and Interferences*(Interference No. 105,393), (Jun. 20, 2000),14 pgs.

Turner, D., "E-Mail to C. Joshi, et al. re: First Dielectric Donut Tests",*Espiau Exhibit 1165, Board of Patent Appeals and Interferences*(Interference No. 105,393), (Jun. 8, 2000),1 pg.

Turner, D., "E-Mail to D. Mullen re: Dielectric Constants from Trans Tech ", *Espiau Exhibit 1157, Board of Patent Appeals and Interferences*(Interference No. 105,393), (May 6, 2000),1 pg.

Turner, D., "E-Mail to S. Brougher re: DRI Plasma Lamp Schedule Update", *Espiau Exhibit 1147, Board of Patent Appeals and Interferences*(Interference No. 105,393), (Apr.28, 2000),1 pg.

Turner, D., "E-Mail to S. Brougher re: Lamp Schedule", *Espiau Exhibit 1184, Board of Patent Appeals and Interferences*(Interference No. 105,393), (Jul. 19, 2000),5 pgs.

Turner, D., "E-Mail to S. Brougher, et al. re: DRI Luxim Waveguide Schedule", *Espiau Exhibit 1206, Board of Patent Appeals and Interferences*(Interference No. 105,393), (Aug. 2, 2000),5 pgs.

Turner, D., "E-Mail to W. Catlett re: DRI—Luxim Business Structure",*Espiau Exhibit 1214, Board of Patent Appeals and Interferences*(Interference No. 105,393), (Aug. 29, 2000),2 pgs.

Turner, D., "E-Mail to W. Catlett re: DRI Luxim License Business Structure", *Espiau Exhibit 1217, Board of Patent Appeals and Interferences*(Interference No. 105,393), (Sep. 13, 2000),2 pgs.

Turner, D., "E-Mail to W. Catlett re: DRI Plasma Lamp Business Meeting", *Espiau Exhibit 1149, Board of Patent Appeals and Interferences*(Interference No. 105, 393), (Apr. 28, 2000),6 pgs.

Turner, D., "E-Mail to W. Catlett re: DRI-Tenco Product Development—Next Steps", *Espiau Exhibit 1161, Board of Patent Appeals and Interferences*(Interference No. 105,393), (May 12, 2000),7 pgs.

Turner, D., "E-Mail to W. Catlett re: Plasma Lamp Project", *Espiau Exhibit 1163, Board of Patent Appeals and Interferences*(Interference No. 105,393), (May 22, 2000),1 pg.

Turner, D., "E-Mail to W. Catlett re: DRI—Luxim License Business Structure", *Espiau Exhibit 1215, Board of Patent Appeals and Interferences*(Interference No. 105,393), (Sep. 11, 2000),2 pgs.

Turner, D., "E-Mail to W. Catlett re: DRI—Luxim License Framework", *Espiau Exhibit 1216, Board of Patent Appeals and Interferences*(Interference No. 105,393), (Sep. 11, 2000),2 pgs.

Turner, D., "Memorandum to G. Prior re: Tenco Proposal to Develop a Plasma Lamp Excitor and Waveguide", *Espiau Exhibit 1134, Board of Patent Appeals and Interferences*(Interference No. 105,393), (Apr. 14, 2000),7 pgs.

Turner, D., "Memorandum to G. Prior re: Tenco Engineering Service for Digital Reflection", *Espiau Exhibit 1130, Board of Patent Appeals and Interferences*(Interference No. 105,393), (Mar. 31, 2000),10 pgs.

Turner, D., "Memorandum to J. Legge re: Production Engineering to DRI Components", *Espiau Exhibit 1133, Board of Patent Appeals and Interferences*(Interference No. 105,393), (Mar. 31, 2000),5 pgs.

Turner, D., "Memorandum to T. Alton re: Issuing Purchase Order to Kyocera", *Espiau Exhibit 1172, Board of Patent Appeals and Interferences*(Interference No. 105,393), (Jun. 22, 2000),5 pgs.

Turner, D., "Memorandum to W Catlett re: Business Structures for Joint DRI—Luxim Development", *Espiau Exhibit 1212, Board of Patent Appeals and Interferences*(Interference No. 105,393), (Aug. 10, 2000),3 pgs.

Turner, D., "Memorandum to W. Catlett re: Non-Disclosure Agreement and Interim Product Development Agreement", *Espiau Exhibit 1174, Board of Patent Appeals and Interferences*(Interference No. 105,393), (Jun. 23, 2000),12 pgs.

Turner, D., "Memorandum to W. Catlett re: Termination of Development Activities relating to Projection Light Engine Waveguide Development", *Espiau Exhibit 1218, Board of Patent Appeals and Interferences*(Interference No. 105,393), (Nov. 3, 2000),1 pg.

Turner, D., "Notes", *Espiau Exhibit 1131, Board of Patent Appeals and Interferences*(Interference No. 105,393), (Apr. 11, 2000),3 pgs.

Turner, "Notes", *Espiau Exhibit 1128, Board of Patent Appeals and Interferences*(Interference No. 105,393), (Mar. 6, 2000),1 pg.

Turner, "Notes", *Espiau Exhibit 1129, Board of Patent Appeals and Interferences*(Interference No. 105,393), (Mar.8, 2000),1 pg.

Turner, "Notes", *Espiau Exhibit 1135, Board of Patent Appeals and Interferences*(Interference No. 105,393), (Apr. 17, 2000),3 pgs.

Turner, "Notes", *Espiau Exhibit 1141, Board of Patent Appeals and Interferences*(Interference No. 105,393), (Apr. 24, 2000),2 pgs.

Turner, "Notes", *Espiau Exhibit 1148, Board of Patent Appeals and Interferences*(Interference No. 105,393), (May 1, 2000),1 pg.

Turner, "Notes from the Jun. 21, 2000 Meeting", *Espiau Exhibit 1171, Board of Patent Appeals and Interferences*(Interference No. 105,393), (Jun. 21, 2000),6 pgs.

Turner, "Notes re: DRI Plasma Light from the May 9, 2000 Meeting", *Espiau Exhibit 1159, Board of Patent Appeals and Interferences*(Interference No. 105,393), (May 9, 2000),3 pgs.

"U.S. Appl. No. 60/337,057 Filing Material", (Nov. 6, 2001),8 pgs.

"U.S. Appl. No. 09/818,092—Revocation of Power of Attorney with New Power of Attorney and Change of Correspondence Address", *Espiau Exhibit 1256, Board of Patent Appeals and Interferences*(Interference No. 105,393), (Aug. 3, 2005),3 pgs.

"Combination Diagram", *Espiau Exhibit 1270, Board of Patent Appeals and Interferences*(Interference No. 105,393), (Jul. 8, 2000),1 pg.

"Decision—Interlocutory Motions—Bd.R. 125(b)", *Guthrie v. Espiau, Board of Patent Appeals and Interferences* (Interference No. 105,393), (Sep. 20, 2007),3 pgs.

"Decision—Interlocutory Motions—Bd.R. 125(b)", *Guthrie v. Espiau, Board of Patent Appeals and Interferences* (Interference No. 105,393), (Oct. 16, 2007),3 pgs.

"Deposition of Benjamin Glenn", *Espiau Exhibit 1260, Guthrie v. Espiau, Board of Patent Appeals and Interferences* (Interference No. 105,393), (Sep. 18, 2007),66 pgs.

"Deposition of Ellen Thotus", *Espiau Exhibit 1259, Guthrie v. Espiau, Board of Patent Appeals and Interferences* (Interference No. 105,393), (Sep. 17, 2007),42 pgs.

"Deposition of Penny Ortega", *Espiau Exhibit 1261, Guthrie v. Espiau, Board of Patent Appeals and Interferences* (Interference No. 105,393), (Sep. 18, 2007),24 pgs.

"Errata to the Transcript of the Sep. 17, 2007 Deposition of Ellen Thotus", *Espiau Exhibit 1264, Guthrie v. Espiau, Board of Patent Appeals and Interferences* (Interference No. 105,393), (Sep. 26, 2007),3 pgs.

"Errata to the Transcript of the Sep. 18, 2007 Deposition of Benjamin Glenn",*Espiau Exhibit 1263, Guthrie v. Espiau, Board of Patent Appeals and Interferences* (Interference No. 105,393), (Sep. 27, 2007),3 pgs.

"Espiau List of Exhibits",*Guthrie v. Espiau, Board of Patent Appeals and Interferences* (Interference No. 105,393), (Oct. 11, 2007),15 pgs.

"Espiau Miscellaneous Motion 8 (to Exclude Exhibits 2240 and 2242, and to Strike Exhibit 2244 and Corresponding Portions of Guthrie Reply 7 and Guthrie Substitute Reply 7)", *Guthrie v. Espiau, Board of Patent Appeals and Interferences* (Interference No. 105,393), (Oct. 11, 2007),32 pgs.

"Espiau Reply 7", *Guthrie v. Espiau, Board of Patent Appeals and Interferences* (Interference No. 105,393), (Sep. 28, 2007),129 pgs.

"Espiau Second Declaration of F. Matthew Espiau", *Espiau Exhibit 1257, Board of Patent Appeals and Interferences*(Interference No. 105,393), (Sep. 17, 2007),5 pgs.

"Espiau Second Declaration of Matthew Argenti", *Espiau Exhibit 1271, Board of Patent Appeals and Interferences*(Interference No. 105,393), (Oct. 10, 2007),5 pgs.

"Espiau Third Declaration of Brian P. Turner", *Espiau Exhibit 1262, Board of Patent Appeals and Interferences*(Interference No. 105,393), (Sep. 25, 2007),4 pgs.

"Espiau's Objections to Guthrie's Exhibits Served with its Reply 7", *Espiau Exhibit 1273, Guthrie v. Espiau, Board of Patent Appeals and Interferences* (Interference No. 105,393), (Oct. 5, 2007),12 pgs.

"Faxing 2 page Application to Lease 646 University Ave.", *Espiau Exhibit 1255, Board of Patent Appeals and Interferences*(Interference No. 105,393), To Vito Modugno From George Thotus,(Jul. 21, 2000),1 pg.

"Guthrie Declaration of James E. King, Esq,", *Guthrie Exhibit 2244, Board of Patent Appeals and Interferences* (Interference No. 105,393), (Sep. 27, 2007),13 pgs.

"Guthrie Declaration of Ray Paquette", *Guthrie Exhibit 2241, Board of Appeals and Interferences* (Interference No. 105,393), (Sep. 30, 2007),22 pgs.

"Guthrie Motion 8 (To Exclude Evidence)", *Guthrie v.Espiau, Board of Patent Appeals and Interferences* (Interference No. 105,393), (Oct. 10, 2007),49 pgs.

"Guthrie Reply 7", *Guthrie v. Espiau, Board of Patent Appeals and Interferences* (Interference No. 105,393), (Sep. 28, 2007),176 pgs.

"Guthrie Second Declaration of Joe Bennett", *Guthrie Exhibit 2240, Board of Patent Appeals and Interferences* (Interference No. 105,393), (Sep. 24, 2007),5 pgs.

"Guthrie Sixth Declaration of Madhu S. Gupta PhD". *Guthrie Exhibit 2243, Board of Patent Appeals and Interferences* ( Interference No. 105,393), (Sep. 27, 2007),24 pgs.

"Guthrie Third Declaration of Charles Guthrie", *Guthrie Exhibit 2242, Board of Patent Appeals and Interferences* (Interference No. 105,393), (Sep. 26, 2007),8 pgs.

"Guthrie's Objectives to Espiau's Evidence", *Guthrie Exhibit 2250, Board of Patent Appeals and Interferences* (Interference No. 105,393), (Aug. 14, 2007),3 pgs.

"Guthrie's Objections to Espiau's Exhibits 1255 and 1256", *Guthrie Exhibit 2252, Board of Patent Appeals and Interferences* (Interference No. 105,393), (Sep. 24, 2007),2 pgs.

"Guthrie objections to Espiau's exhibits served with its opposition 7", *Guthrie Exhibit 2251, Board of Patent Appeals and Interferences* (Interference No. 105,393), (Sep. 10, 2007),10 pgs.

"Guthrie's Objections to Espiau's Exhibits Served with its Reply 7", *Guthrie Exhibit 2253, Board of Patent Appeals and Interferences* (Interference No. 105,393), (Oct. 1, 2007),4 pgs.

"Guthrie's Objections to Espiau's Motion 7 Evidence", *Guthrie Exhibit 2249, Board of Patent Appeals and Interferences* (Interference No. 105,393), (Aug. 7, 2007),35 pgs.

"Guthrie's Objections to Espiau's Opposition 6 Evidence", *Guthrie Exhibit 2248, Board of Patent Appeals and Interferences* (Interference No. 105,393), (Jun. 5, 2007),13 pgs.

"King Declaration E-Mail", *Espiau Exhibit 1272, Board of Patent Appeals and Interferences*(Interference No. 105,393), From Robert Morgan to Nicola Pisano,(Oct. 1, 2007),1 pg.

"Photograph of basement of 644 University Avenue, Los Gatos, California", *Espiau Exhibit 1267, Board of Patent of Appeals and Interferences*(Interference No. 105,393), (No date listed),1 pg.

"Sound Deposition Services, Inc. Transcript", *Guthrie Exhibit 2247, Board of Patent Appeals and Interferences* (Interference No. 105,393), The transcript was derived from the video located at http://www.redherring.tv/luxim.htm,(Sep. 11, 2007),11 pgs.

"Teleconference Transcript for Call before Judge James Moore", *Guthrie v. Espiau, Board of Patent Appeals and Interferences*(Interference No. 105,393), (Oct. 4, 2007),22 pgs.

"Teleconference Transcript for Call before Judge Sally C. Medley", *Guthrie Exhibit 2245, Board of Patent Appeals and Interferences* (Interference No. 105,393), (Aug. 1, 2007),30 pgs.

"Teleconference Transcript for Call before Judge Sally C. Medley", *Guthrie v. Espiau, Board of Patent Appeals and Interferences* (Interference No. 105,393), (Mar. 8, 2007),27 pgs.

"Teleconference Transcript for Call before Judge Sally C. Medley", *Guthrie v. Espiau, Board of Patent Appeals and Interferences* (Interference No. 105,393), (Oct. 15, 2007),26 pgs.

"Second Declaration of James E. King, Esq.", *Guthrie Exhibit 2256 Board of Patent Appeals and Interferences* (Interference No. 105,393), (Oct. 19, 2007), 5 pgs.

"Guthrie Fourth Declaration of Charles Guthrie", *Guthrie Exhibit 2255, Board of Patent Appeals and Interferences*(Interference No. 105,393), (Oct. 19, 2007), 4 pg.

"E-mail from Morgan to Pisano", *Exhibit 2260, Guthrie v. Espiau*, Patent Interference 105,393, (Oct. 8, 2007),1 pg.

"Espiau Opposition 8 (to Guthrie's Miscellaneous Motion 8 to exclude evidence)", *Guthrie v. Espiau*, Patent Interference 105,393, (Oct. 24, 2007),71 pgs.

"Guthrie Opposition 8 (opposing Espiau miscellaneous motion 8)", *Guthrie v. Espiau*, Patent Interference 105,393, (Oct. 24, 2007),63 pgs.

"Guthrie's objections to Espiau's exhibits served with its motion 8", *Exhibit 2254, Guthrie v. Espiau*, Patent Interference 105,393, (Oct. 18, 2007),6 pgs.

"Katie Marie Nunes Death Certificate", *Exhibit 2258, Guthrie v. Espiau*, Patent Interference 105,393, (Jul. 10, 2000),1 pg.

"Kearney to Pisano Letter", *Re: Guthrie v. Espiau*, (Oct. 19, 2007),12 pgs.

"Modesto Bee Obituaries including Katie Marie Nunes", *Exhibit 2257, Guthrie v. Espiau*, Patent Interference 105,393, (Jul. 10, 2000),3 pgs.

"*Nilssen et al v. Osram Sylvania et al*", *Exhibit 2259, Guthrie v. Espiau*, Patent Interference 105,393, United States Court of Appeals for the Federal Circuit,(Oct. 10, 2007),20 pgs.

"Decision", *Guthrie v. Espiau, Board of Patent Appeals and Interferences* (Interference No. 105,393), (Mar. 24, 2008),43 pgs.

"First Amended Complaint", *Ceravision, Limited v. Luxim Corporation*, (Civ. Action No. C08-02575, U.S.D.C., No. District of Calif.),(Jun. 13, 2008),9 pgs.

"Judgment", *Guthrie v. Espiau, Board of Patent Appeals and Interferences* (Interference No. 105,393), (Mar. 24, 2008),3 pgs.

"China Application Serial No. 200480009058.7, Office Action mailed Mar. 6, 2009", 9 pgs.

"Chinese Application Serial No. 200480009058.7, Office Action mailed Jan. 8, 2010", 10 pgs.

"European Application Serial No. 04706484.5, Office Action mailed Nov. 4, 2010", 4 pgs.

"Japanese Application Serial No. 2006-503150, Office Action mailed Sep. 4, 2009", 4 pgs.

"Korean Application Serial No. 10-2005-7013905, Office Action mailed Mar. 18, 2008", 3 pgs.

"Korean Application Serial No. 10-2005-7013905, Office Action mailed Sep. 27, 2007", 5 pgs.

"Korean Application Serial No. 10-2005-7013905, Office Action mailed Oct. 30, 2006", 5 pgs.

"Chinese Application Serial No. 201010167616.X, Office Action mailed Feb. 28, 2011", 11 pgs.

\* cited by examiner

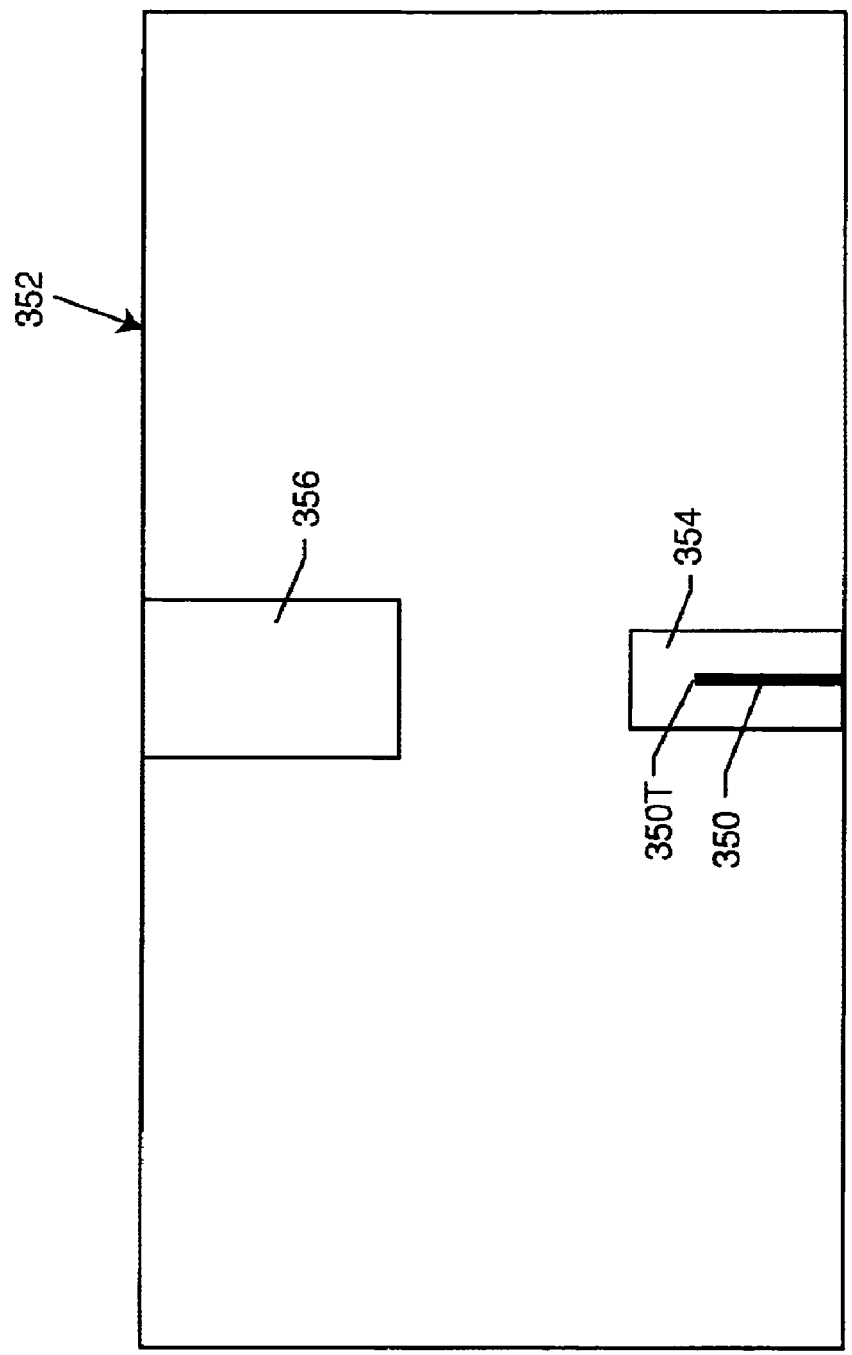

MICROWAVE ENERGIZED PLASMA LAMP WITH DIELECTRIC WAVEGUIDE

CROSS REFERENCE TO RELATED APPLICATIONS

This application is a continuation of application Ser. No. 11/135,047 filed on May 23, 2005, entitled "Microwave Energized Plasma Lamp With Dielectric Waveguide," and issued as U.S. Pat. No. 7,525,253, which is a continuation of application Ser. No. 10/356,340 filed on Jan. 31, 2003, originally entitled "Microwave Energized Plasma Lamp With Solid Dielectric Waveguide," and issued as U.S. Pat. No. 6,922,021, which is a continuation-in-part of application Ser. No. 09/809,718 ("'718"), filed on Mar. 15, 2001, entitled "Plasma Lamp With Dielectric Waveguide," and issued as U.S. Pat. No. 6,737,809, which claimed benefit of priority of provisional patent application Ser. No. 60/222,028, filed on Jul. 31, 2000 and entitled "Plasma Lamp," each of which are incorporated herein in their entirety by this reference.

BACKGROUND OF THE INVENTION

1. Field of the Invention

The field of the present invention relates to devices and methods for generating light, and more particularly to electrodeless plasma lamps.

2. Description of the Related Art

Electrodeless plasma lamps provide point-like, bright, white light sources. Because electrodes are not used, they often have longer useful lifetimes than other lamps. Some plasma lamps direct microwave energy into an air cavity, with the air cavity enclosing a bulb containing a mixture of substances that can ignite, form a plasma, and emit light. However, for many applications, light sources that are brighter, smaller, less expensive, more reliable, and have longer useful lifetimes are desired.

SUMMARY OF THE INVENTION

In a first aspect the invention provides a plasma lamp including: a waveguide body having a dielectric constant greater than about 2; first and second probes coupled to the body; a circuit, including an amplifier portion, coupled to the first probe to provide RF power to the body, and coupled to the second probe to obtain feedback from the body; and a bulb adjacent to the body, containing a fill capable of forming a plasma when RF power is provided to the body.

In a second aspect the invention provides a plasma lamp including: a waveguide body; first and second probes coupled to the body; a bulb adjacent to the body, containing a fill capable of forming a plasma when RF power is provided to the body; and a circuit configured to provide adjustable RF power to the first and second probes enabling at least two modes of operation.

In a third aspect the invention provides a method of operating a plasma lamp including: providing a waveguide body; applying RF power to the body at a first frequency causing the body to resonate in a first resonant mode; using the RF power applied to the body at the first frequency to ignite a plasma; applying RF power to the body at a second frequency causing the body to resonate in a second resonant mode; and using the RF power applied to the body at the second frequency to sustain the plasma.

In a fourth aspect the invention provides a method of operating a plasma lamp including: providing a waveguide body; providing RF power to a plasma through the body; causing the body to resonate in a first resonant mode; and adjusting the RF power applied to the body to cause the body to resonate in a second resonant mode.

In a fifth aspect the invention provides a method for controlling reflection of power from a waveguide body of a plasma lamp back to a microwave source coupling power into the body. The body is capable of resonating in at least a first resonant mode and a second resonant mode. The method includes: positioning a first probe within the body near an electric field minimum of the first resonant mode and not near an electric field minimum of the second resonant mode; positioning a second probe within the body anywhere except near an electric field minimum of the first resonant mode or the second resonant mode; connecting the first probe to an output of the source; and connecting the second probe to an input of the source.

A more complete understanding of the present invention and other aspects and advantages thereof will be gained from a consideration of the following description of the preferred embodiments read in conjunction with the accompanying drawing figures provided herein. In the figures and description, numerals indicate the various features of the invention, like numerals referring to like features throughout both the drawings and description.

BRIEF DESCRIPTION OF THE DRAWINGS

FIG. 23 schematically depicts a DWIPL having a body with a high dielectric constant. A drive feed extending into the body is surrounded by a dielectric material having a high breakdown voltage.

DETAILED DESCRIPTION OF THE PREFERRED EMBODIMENTS

Figure 1:
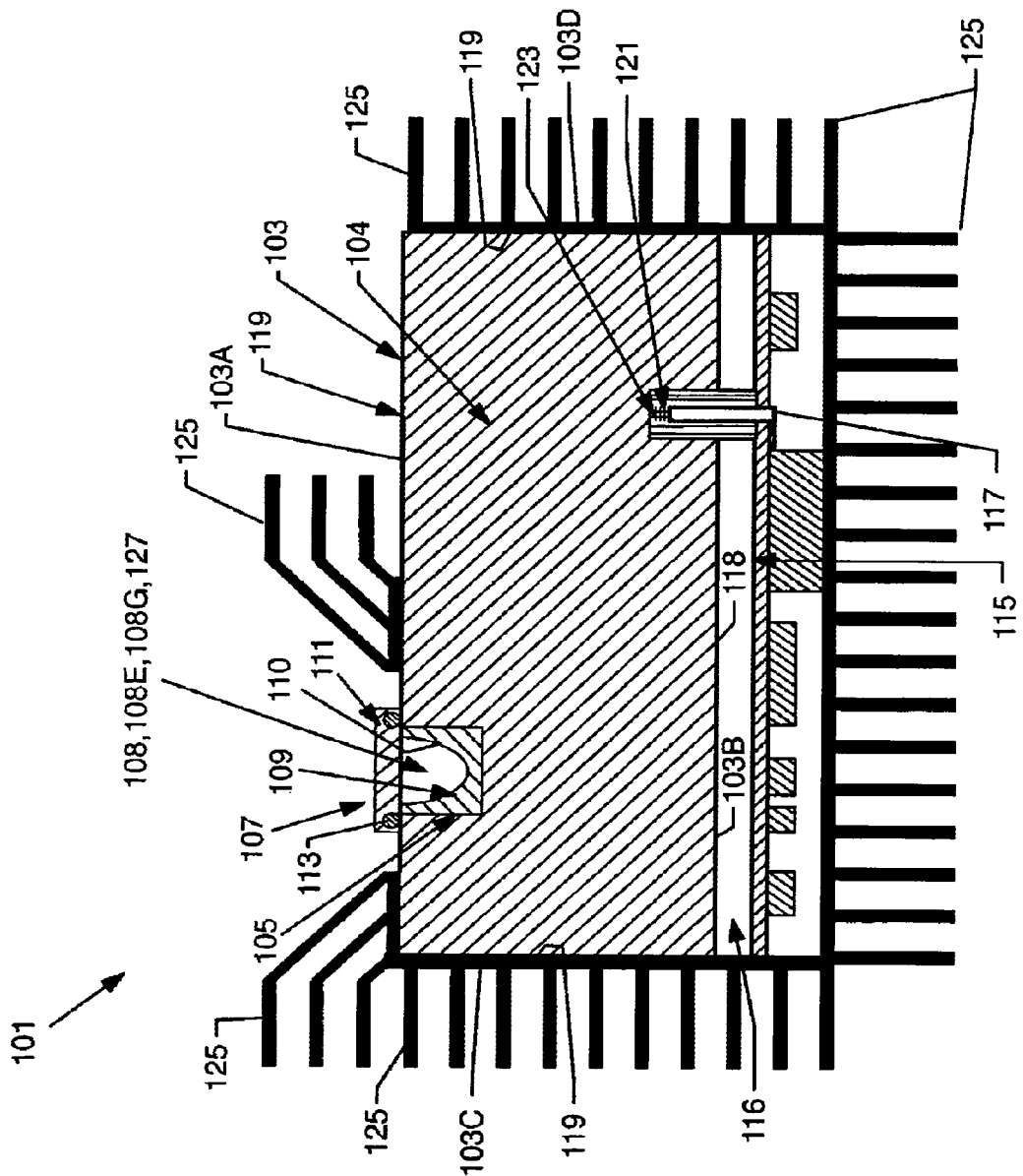
FIG. 1, which is FIG. 1 of the '718 application, shows a sectional view of a "dielectric waveguide integrated plasma lamp" (DWIPL) including a waveguide having a body consisting essentially of a solid dielectric material, integrated with a bulb containing a light-emitting plasma.

While the present invention is open to various modifications and alternative constructions, the preferred embodiments shown in the drawings will be described herein in detail. It is to be understood, however, there is no intention to limit the invention to the particular forms disclosed. On the contrary, it is intended that the invention cover all modifications, equivalences and alternative constructions falling within the spirit and scope of the invention as expressed in the appended claims.

As used herein, the terms "dielectric waveguide integrated plasma lamp," "DWIPL," "microwave energized plasma lamp with solid dielectric waveguide," and "lamp" are synonymous, and the term "lamp body" is synonymous with "waveguide body." The term "probe" herein is synonymous with "feed" in the '718 application. The term "power", i.e., energy per unit time, is used herein rather than "energy" as in the '718 application. The terms "lamp chamber" and "hole" herein are synonymous with "cavity" in the '718 application, and are used in describing construction details, such as seals and materials, of the several DWIPL embodiments disclosed. The term "cavity" is used herein when describing microwave technology-related details such as probe design, coupling and resonant modes. This change in terminology was made because from an electromagnetic point of view a DWIPL body is a resonant cavity.

FIG. 1, copied from the '718 application, shows a "baseline" embodiment of a dielectric waveguide integrated plasma lamp to which the embodiments disclosed herein may be compared. DWIPL 101 includes a source 115 of microwave radiation, a waveguide 103 having a body 104 consisting essentially of a solid dielectric material, and a drive feed 117 coupling the source 115 to the waveguide, which is in the shape of a rectangular prism determined by opposed sides 103A, 103B, and opposed sides 103C, 103D generally transverse to sides 103A, 103B. DWIPL 101 further includes a bulb 107, disposed proximate to side 103A and preferably generally opposed to feed 117, containing a fill 108 including a "starting" gas, such as a noble gas, and a light emitter, which when receiving microwave power at a predetermined operating frequency and intensity forms a plasma and emits light. Source 115 provides microwave power to waveguide 103 via feed 117. The waveguide contains and guides the energy flow to an enclosed lamp chamber 105, depending from side 103A into body 104, in which bulb 107 is disposed. This energy flow frees electrons from the starting gas atoms, thereby creating a plasma. In many cases the light emitter is solid at room temperature. It may contain any one of a number of elements or compounds known in the art, such as sulfur, selenium, a compound containing sulfur or selenium, or a metal halide such as indium bromide. The starting plasma vaporizes the light emitter, and the microwave powered free electrons excite the light emitter electrons to higher energy levels. De-excitation of the light emitter electrons results in light emission. Use of a starting gas in combination with a solid light emitter is not a necessity; a gas fill alone, such as xenon, can be used to start the plasma and to emit light. The preferred operating frequency range for source 115 is from about 0.5 to about 10 GHz. Source 115 may be thermally isolated from bulb 107 which during operation typically reaches temperatures between about 700° C. and about 1000° C., thus avoiding degradation of the source due to heating. Preferably, the waveguide body provides a substantial thermal mass which aids efficient distribution and dissipation of heat and provides thermal isolation between the lamp and source. Additional thermal isolation of the source may be accomplished by using an insulating material or vacuum gap occupying an optional space 116 between source 115 and waveguide 103. When the space 116 is included, appropriate microwave feeds are used to couple the source to the waveguide.

Due to mechanical and other considerations such as heat, vibration, aging and shock, contact between the feed 117 and waveguide 103 preferably is maintained using a positive contact mechanism 121, shown in FIG. 1 as a spring-loaded device. The mechanism provides a constant pressure by the feed on the waveguide to minimize the possibility that microwave power will be reflected back through the feed rather than entering the waveguide. In providing constant pressure, the mechanism compensates for small dimensional changes in the feed and waveguide that may occur due to thermal heating or mechanical shock. Preferably, contact is made by depositing a metallic material 123 directly on the waveguide at its point of contact with feed 117 so as to eliminate gaps that may disturb the coupling.

Sides 103A, 103B, 103C, 103D of waveguide 103, with the exception of those surfaces depending from side 103A into body 104 which form lamp chamber 105, are coated with a thin metallic coating 119 which reflects microwaves in the operating frequency range. The overall reflectivity of the coating determines the level of energy within the waveguide. The more energy that can be stored within the waveguide, the greater the lamp efficiency. Preferably, coating 119 also suppresses evanescent radiation leakage and significantly attenuates any stray microwave field(s). Bulb 107 includes an outer wall 109 having an inner surface 110, and a window 111. Alternatively, the lamp chamber wall acts as the bulb outer wall. The components of bulb 107 preferably include at least one dielectric material, such as a ceramic or sapphire. The ceramic in the bulb may be the same as the material used in body 104. Dielectric materials are preferred for bulb 107 because the bulb preferably is surrounded by the body 104, and the dielectric materials facilitate efficient coupling of microwave power with the fill 108 in the bulb. Outer wall 109 is coupled to window 111 using a seal 113, thereby determining a bulb envelope 127 which contains the fill. To confine the fill within the bulb, seal 113 preferably is a hermetic seal. Outer wall 109 preferably includes alumina because of its white color, temperature stability, low porosity, and low coefficient of thermal expansion. Preferably, inner surface 110 of outer wall 109 is contoured to maximize the amount of light reflected out of cavity 105 through window 111. Preferably, window 111 includes sapphire which has high light transmissivity and a coefficient of thermal expansion which matches well with that of alumina. Window 111 may include a lens to collect and focus the emitted light. During operation when bulb 107 may reach temperatures of up to about 1000° C., body 104 acts as a heatsink for the bulb. Effective heat dissipation is achieved by attaching a plurality of heat-sinking fins 125 to sides 103A, 103C and 103D.

When the waveguide body 104 consists essentially of a dielectric material which generally is unstable at high temperature, such as a titanate, waveguide 103 may be shielded from the heat generated in bulb 107 by interposing a thermal barrier between the body and bulb. Alternatively, outer wall 109 includes a material with low thermal conductivity, such as an NZP ($NaZr_2(PO_4)_3$) ceramic which acts as a thermal barrier.

Although FIG. 1 shows waveguide 103 in the shape of a rectangular prism, a waveguide according to the invention disclosed in the '718 application may be in the shape of a cylindrical prism, a sphere, or in any other shape that can efficiently guide microwave power from a drive feed to a bulb integrated with the waveguide body, including a complex, irregular shape whose resonant frequencies preferably are determined using electromagnetic theory simulation tools. The waveguide dimensions will vary depending upon the microwave operating frequency and the dielectric constant of the waveguide body. Regardless of its shape and size, a waveguide body preferably consists essentially of a solid dielectric material having the following properties: (1) a dielectric constant greater than approximately 2.0; (2) a loss tangent less than approximately 0.01; (3) a thermal shock resistance quantified by a failure temperature greater than approximately 200° C.; (4) a DC breakdown threshold greater than approximately 200 kilovolts/inch; (5) a coefficient of thermal expansion less than approximately $10^{-5}/°$ C.; (6) a zero or slightly negative temperature coefficient of the dielectric constant; (7) stoichiometric stability over a temperature range of about −80° C. to about 1000° C.; and (8) a thermal conductivity of approximately 2 W/mK (watts per milliKelvin). Ceramics having these properties as well as satisfactory electrical and thermo-mechanical properties include alumina, zirconia, certain titanates, and variations or combinations of these materials.

High resonant energy within waveguide 103, corresponding to a high Q-value in the waveguide (where Q is the ratio of the operating frequency to the frequency bandwidth of the resonance), results in high evanescent leakage of microwave energy into lamp chamber 105. Such leakage leads to quasi-static breakdown of the starting gas within envelope 127, thereby generating initial free electrons. The oscillating energy of the free electrons scales as $I\lambda^2$, where I is the circulating intensity of the microwave energy and $\lambda$ is the wavelength. Thus, the higher the microwave energy, the greater is the oscillating energy of the free electrons. By making the oscillating energy greater than the ionization potential of the gas, electron-neutral collisions result in efficient build-up of plasma density. Once a plasma is formed and the incoming power is absorbed, the waveguide's Q-value drops due to the conductivity and absorption properties of the plasma. The drop in Q-value is generally due to a change in waveguide impedance. After plasma formation, the presence of the plasma in the lamp chamber makes the chamber absorptive to the resonant energy, thus changing the impedance. The change in impedance is effectively a reduction in the overall reflectivity of the waveguide. By matching the reflectivity of the drive feed to be close to the reduced reflectivity of the waveguide, a sufficiently high Q-value may be obtained even after plasma formation so that the plasma is sustained. Consequently, a relatively low net reflection back into the energy source is realized. Much of the energy absorbed by the plasma eventually appears as heat. When the waveguide is used as a heatsink, the dimensions of the waveguide may change due to thermal expansion. If the waveguide expands, the microwave frequency that will resonate within the waveguide changes and resonance is lost. In order for resonance to be maintained, the waveguide must have at least one dimension equal to an integer multiple of the half-wavelength of the microwaves being generated by source 115. Such dimensional changes can be compensated for by choosing a dielectric material for body 104 having a temperature coefficient for its refractive index that is approximately equal and opposite in sign to its coefficient of thermal expansion, so that expansion due to heating is at least partially offset by a change in refractive index.

A lamp chamber in a DWIPL is a shaped hole in the solid dielectric lamp body. The hole is covered with a transparent window or lens to keep the fill mixture inside, which typically is a noble gas or a mixture of a noble gas such as argon and a salt or halide such as indium bromide or indium iodide. The cross-section of the hole at the lamp body surface from which the hole depends is termed the "aperture." An aperture can be circular, rectangular, or an arbitrary shape. The three-dimensional shape of the chamber hole can be: a regular prism whose cross-section has the same shape as the aperture, e.g., a cylindrical prism and a circular aperture; a regular prism whose cross-section is shaped differently than the aperture, so that there is a transition region proximate to the aperture; or an arbitrary shape. A lamp chamber bottom can be shaped to serve as a light reflector, so that light striking the bottom is reflected toward the aperture. Specifically, a bottom can be shaped as a paraboloid, an ellipsoid, a chiseled prism, or with one or more curvatures tailored for a specific application.

A lamp chamber can be shaped to provide desired characteristics of the emitted light. For example, the chamber can be a cylinder with a diameter optimally chosen to match the dimensions of a light collecting apparatus connected to the lamp. The diameter is constrained at a lower limit by the requirement that the mean free path of an energized electron be long enough that sufficient electron-ion collisions occur before the electron strikes the chamber wall. Otherwise, the resulting efficiency will be too low. The diameter is constrained at an upper limit dependent on the lamp operating frequency. Otherwise, microwave energy will be emitted through the aperture.

A typical requirement for a lamp used in an application such as a projection television set is to make the chamber have an "optical extent" (or "etendue" E) which depends on the aperture area A and an f-number ("f#"), characterizing the cone angle of the emitted light, which depends on the ratio of the diameter to the chamber depth. Specifically, $E=\pi A/4(f\#)^2$. Typically, the depth is selected to achieve a desired f#, with a greater depth resulting in a smaller f# and a smaller etendue. For a very deep chamber, light emitted toward the chamber middle or bottom may tend to hit the chamber wall and be absorbed, reducing the net efficiency of the lamp. For a very shallow chamber, light may be emitted in too broad a cone angle.

A lamp chamber may include a discontinuity in shape to provide an electric field concentration point (see FIGS. 7A and 8) which tends to facilitate breakdown of the fill mixture when the lamp is off, resulting in easier starting. Such a discontinuity can be a cone- or cup-shape projecting from the chamber bottom or side. Alternatively, a discontinuity can be formed by a deliberately added object, such as a fill tube end extending into the chamber.

There can be several lamp chambers in the same lamp body. The chambers are located at electric field maxima which exist for the selected waveguide operating mode. Preferably, a mode is selected which allows the chambers to be disposed in a configuration useful for providing light to each of several different optical paths. Each chamber can contain the same fill mixture, or the mixtures can be different. Thus, the spectrum of light emitted from each chamber can be the same, or the spectra can be different. For example, a lamp having three chambers, each with a unique fill mixture, could emit from each chamber, respectively, primarily red, blue and green light, so that the light from each chamber could be used for a separate channel of a red-blue-green optical engine. Alternatively, each chamber could contain the same fill mixture so that multiple independent sources would be available for related but separate uses.

A lamp body can essentially consist of more than one solid dielectric material. For example, a lamp body can have a small volume around the lamp chamber made of alumina, to take advantage of its good mechanical, thermal and chemical properties, with the rest of the body made of a material with a higher dielectric constant than that of alumina but which does not have thermal, mechanical and/or electrical properties adequate to contain a plasma. Such a lamp would be a smaller than a lamp having an all-alumina body, likely would operate at a lower frequency than an all-alumina lamp of the same size, and would be less expensive to manufacture since it would require less high dielectric constant material.

The electromagnetic design of a lamp body having more than one solid dielectric material is performed in iterative steps. Firstly, a rough lamp shape is selected and an electromagnetic analysis and simulation performed for a lamp body consisting of the material occupying the greatest amount of body volume. Secondly, the simulation results are assessed to determine how close the lamp is to the desired operating frequency. Thirdly, the simulation is repeated with the several dielectric materials included in the simulated structure. Using the analysis results, the dimensions are adjusted and the simulation repeated until the body has the desired combination of operating frequency, size and proportions of materials.

A lamp body with several materials can be designed to include a layer, such as an evacuated space, inert gas, or a solid material, between two materials to serve as a thermal barrier. An evacuated space contributes to thermal management by increasing the temperature of the chamber wall(s), and providing a region in which the net lamp thermal flow rate results in a greater temperature differential than without the evacuated space (see FIGS. 3A and 3B of the '718 application).

Figure 2:
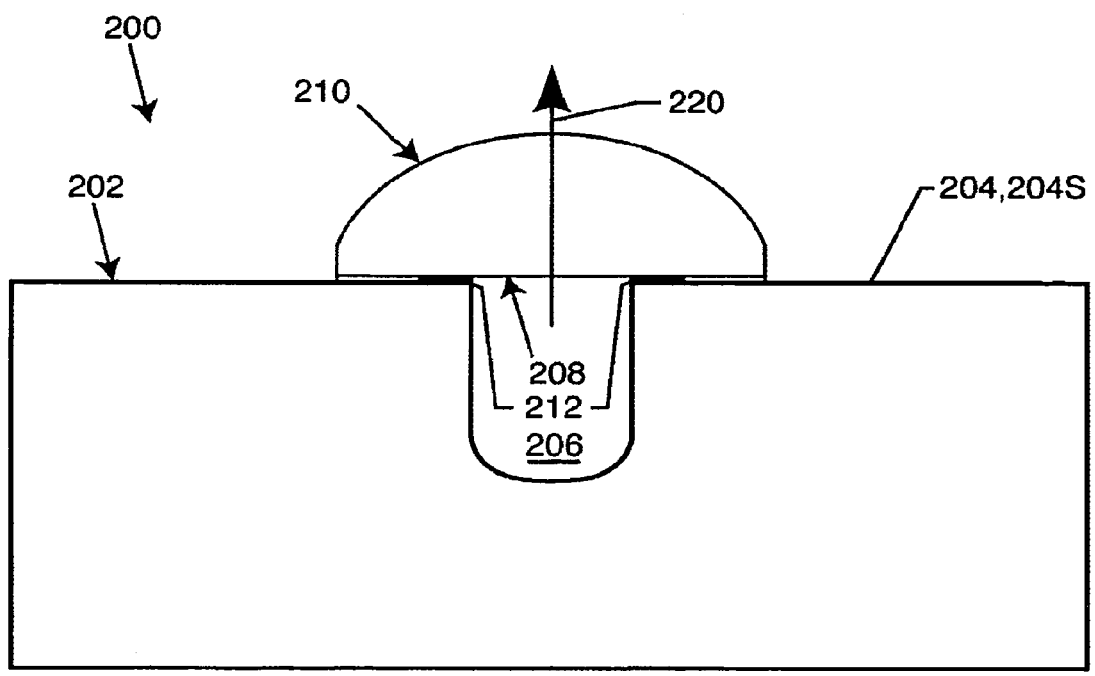
FIG. 2 schematically depicts a DWIPL having a body with a lamp chamber enclosed and sealed by a ball lens.

One or more mechanical elements are required to enclose and seal a lamp chamber against the high thermomechanical stresses and pressures created by a plasma. Referring to FIG. 2, a DWIPL 200 includes a body 202 having a side 204 with a surface 204S from which depends a lamp chamber 206 having an aperture 208. A ball lens 210 is attached to surface 204S by a seal 212. Preferably, lens 210 is made of sapphire. Indicium 220 shows the direction of light emitted from chamber 206.

Figure 3:
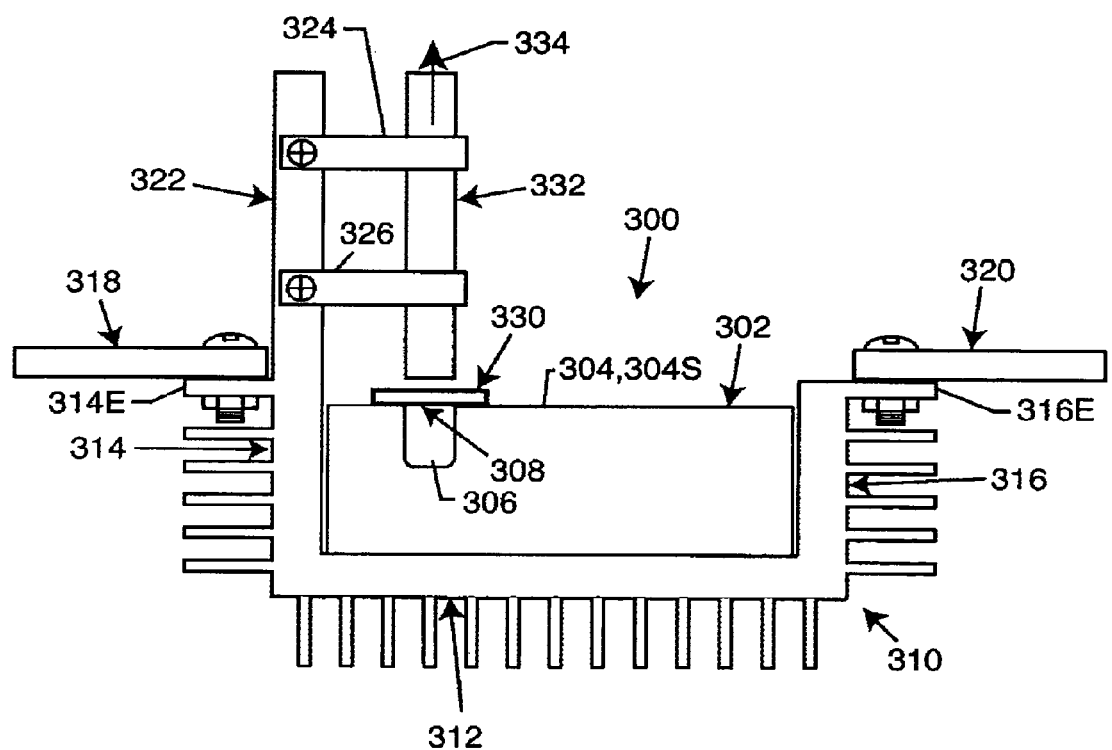
FIG. 3 schematically depicts a DWIPL having a body with a lamp chamber enclosed and sealed by a window or lens aligned with an optical element attached to brackets attached to a flange extending from a heatsink surrounding the body.

A window or lens enclosing and sealing a chamber can be coupled to other optical elements which collect, process and direct lamp light output. Examples include a tube lined with a reflective material or coating, and a light pipe. Such optical elements can be mounted to brackets integrally attached to a heatsink around a lamp body, providing a low cost, high integrity way to mount and attach optical components to the lamp. Referring to FIG. 3, a DWIPL 300 includes a body 302 having a side 304 with a surface 304S from which depends a lamp chamber 306 having an aperture 308. Body 302 is enclosed by a "U-shaped heatsink 310 having a central portion 312 attached and generally orthogonal to opposed, generally parallel first and second portions 314, 316, respectively, having, respectively, ears 314E, 316E generally orthogonal to portions 314, 316 and attached to opposed first and second lamp mounting panels 318, 320, respectively. Portion 314 extends in a flange 322 to which are rigidly attached opposed, generally opposed first and second brackets 324, 326 generally orthogonal to the flange 322. A window/lens 330 attached to surface 304S and covering aperture 308 encloses and seals the chamber 306. An optical element 332, such as a light pipe, is rigidly attached to the brackets 324, 326 and aligned with window/lens 330. Indicium 334 shows the direction of light output from element 332.

A DWIPL can consist of a single integrated assembly including: a lamp body with a sealed lamp chamber; a driver circuit and driver circuit board; a thermal barrier separating the body and driver circuit; and an outer heatsink. Alternatively, separate packages are used for: (a) the lamp body and heatsink; and (b) the driver circuit and its heatsink. For a DWIPL utilizing two probes (see FIGS. 15A and 15B, and FIG. 6 of the '718 application), the body and driver circuit are connected by two RF power cables, one connecting the output of the driver circuit to the body, and the other providing feedback from the body to the driver circuit. The use of two separate packages allows greater flexibility in the distribution of lamp heat and lamp driver heat. This may enable a projection television or other device to be built without including a fan for the lamp. Such two-package configurations may also enable design of television sets having smaller depth in the critical dimension from viewing screen to back panel than heretofore has been achieved.

A DWIPL offers substantial advantages for heat removal because the solid dielectric material(s) used for the lamp body can be chosen for characteristics which result in heat flow along desired paths. A heatsink can have an arbitrary shape, optimized for thermal and end-use considerations. The heatsink for a cylindrical-shaped lamp body might also be cylindrical with fins and mounting details standardized for attachment to a projection television chassis, and with features for mounting optics to the lamp assembly. For a cylindrical lamp and cylindrical heatsink, a useful construction technique is to heat the heatsink until it expands, then place it around the lamp body, and let it cool and contract to form intimate mechanical contact with the body. A metallic heatsink can be used to provide a conductive outer coating of the lamp body. This technique ensures a durable and intimate connection, and satisfies both thermal and electrical requirements of the lamp, reducing its total cost.

Figure 4:
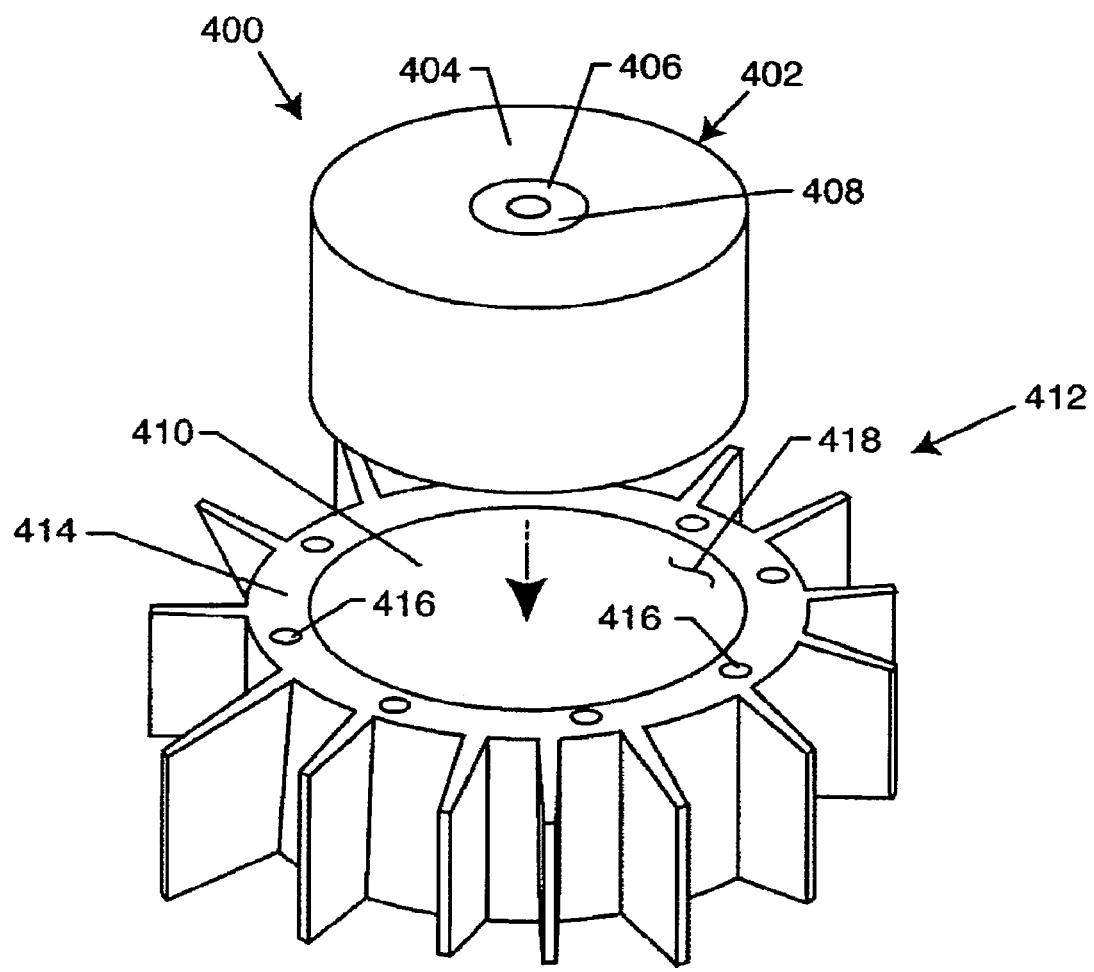
FIG. 4 schematically depicts a DWIPL having a cylindrical body attached to a cylindrical heatsink with a bore which closely receives the body.

Referring to FIG. 4, a DWIPL 400 includes a generally cylindrical lamp body 402 having a top face 404 with a surface 404S to which is attached a window 406 covering a lamp chamber aperture 408. Body 402 is closely received within a generally cylindrical bore 410 of a generally cylindrical metallic heatsink 412 having an annular upper face 414 with a plurality of mounting holes 416. Preferably, a compliant, high temperature thermal interface material, e.g., grease or a silicone pad, is inserted between body 402 and heatsink 412.

Figure 5:
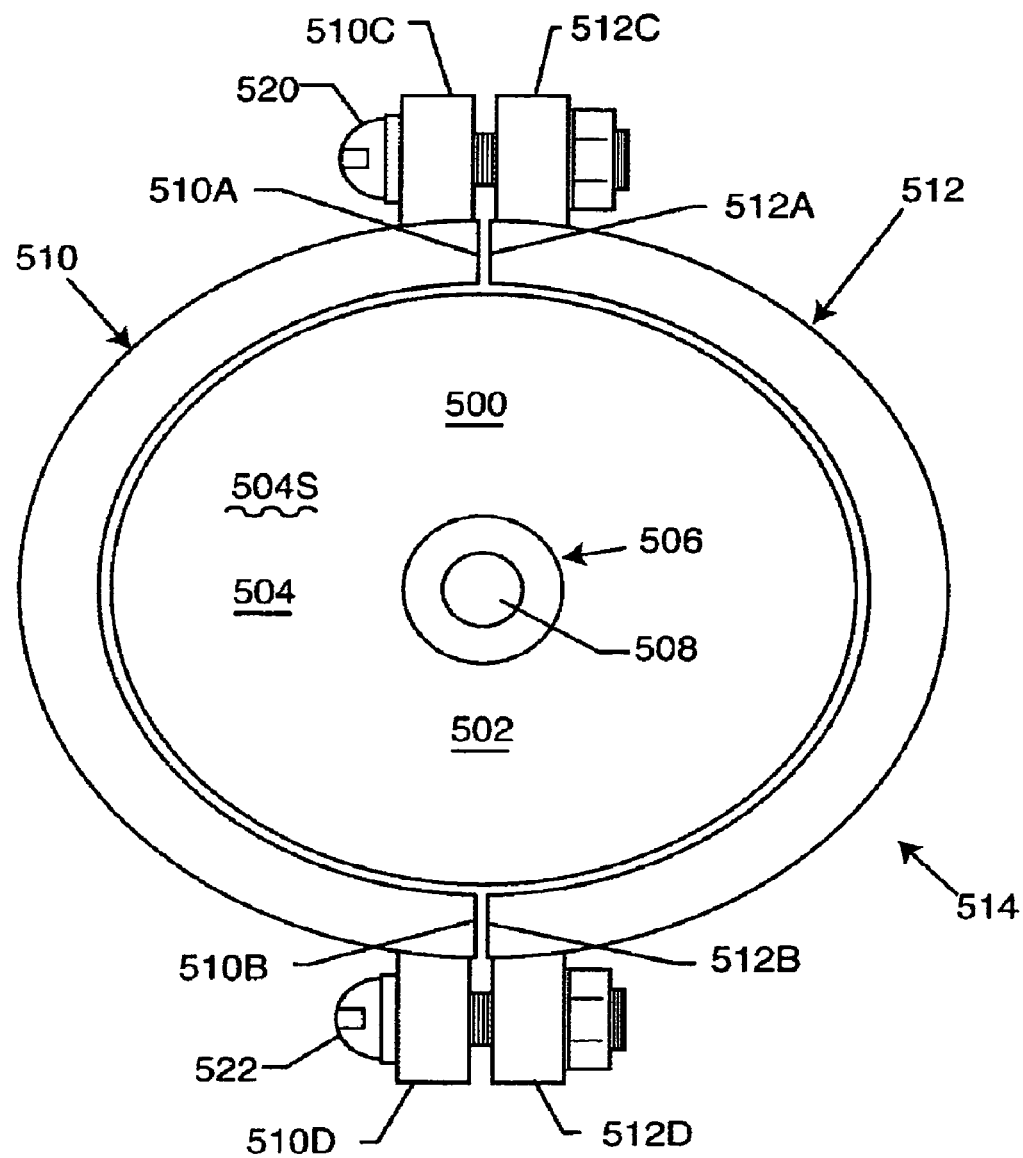
FIG. 5 schematically depicts a DWIPL having a cylindrical body enclosed within a "clamshell"-type heatsink.

Another practical heatsink arrangement is a two-piece "clamshell" in which two similar or identical pieces make intimate contact with a lamp body over a large area. The pieces are held together by fasteners in compression. Referring to FIG. 5, a DWIPL 500 has a generally cylindrical body 502, a top face 504 with a surface 504S, and a window 506 attached to surface 504S and covering a lamp chamber aperture 508. Body 502 is enclosed by semi-cylindrical portions 510, 512 of a clamshell-type heatsink 514. Portions 510 and 512 each are determined by ends 510A, 510B and 512A, 512B, respectively, attached to flanges 510C, 510D and 512C, 512D, respectively. First and second fasteners 520, 522 are used to connect the aligned flanges, compressing portions 510, 512 about the body 502.

Still another heatsink arrangement is to plate a lamp body with a thermally and electrically conductive material, such as silver or nickel, and then solder or braze heatsink pieces to the plating.

When microwave power is applied from the driver circuit to the lamp body, it heats the fill mixture, melting and then vaporizing the salt or halide, causing a large increase in the lamp chamber pressure. Depending on the salt or halide used, this pressure can become as high as 400 atmospheres, and the bulb temperature can be as high as 1000° C. Consequently, a seal attaching a window or lens to a lamp body must be extremely robust.

Figure 6:
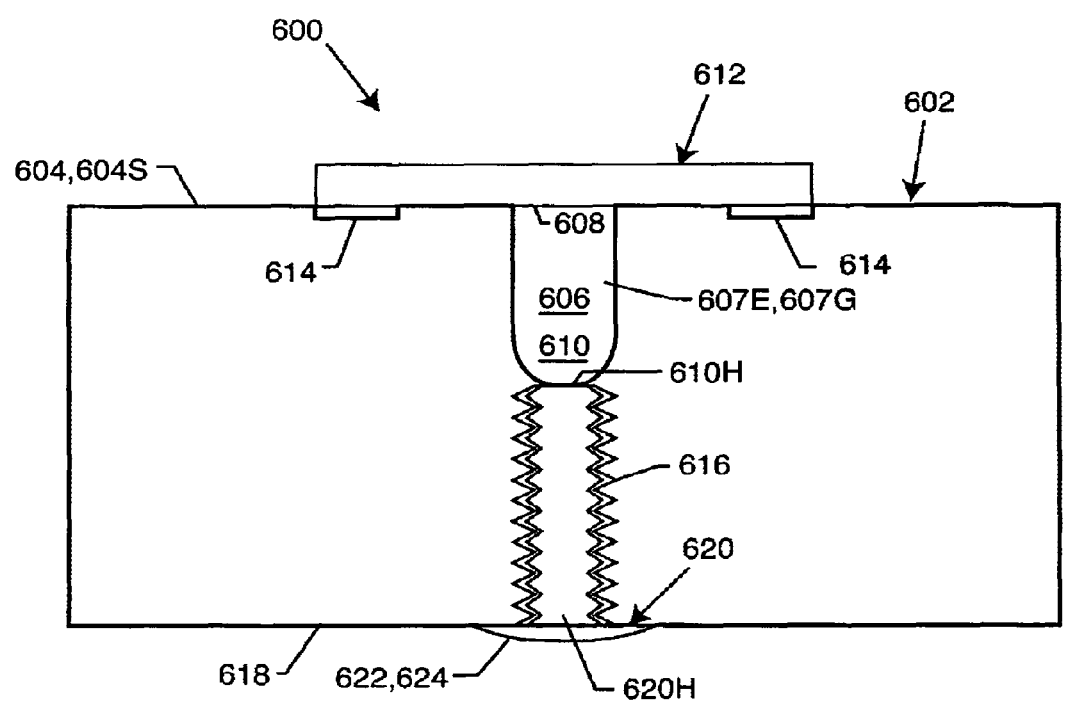
FIG. 6 schematically depicts a DWIPL having a body with a tapped bore extending between a body side opposed to a side having a lamp chamber aperture, and the chamber bottom. A fill, including a starting gas and light emitter, in the chamber is sealed by a window over the aperture and a plug screwed into the bore.

Referring to FIG. 6, a DWIPL 600 includes a body 602 having a side 604 with a surface 604S from which depends a lamp chamber 606 having an aperture 608 and a bottom 610 with a hole 610H. A window 612, preferably made of sapphire, is attached to surface 604S by a seal 614. Lamp body 602 further includes a tapped bore 616 extending between a body side 618 generally opposed to side 604, and chamber bottom 610, so that the bore is in communication with hole 610H. The window 612 is sealed to surface 604S in an inert atmosphere, using a ceramic sealing technique known in the art, such as brazing, frit, or metal sealing. Lamp body 602 and a screw-type plug 620 having a head 622 are then brought into an atmospheric chamber containing the starting gas to be used in the lamp chamber, which is at or near the desired non-operating pressure for the lamp. The light emitter is then deposited in lamp chamber 606 through bore 616 and hole 610H. Plug 620, which provides a mechanical and gas barrier to contain the fill mixture, is then screwed into bore 616, and a metallic or glass material 624 deposited over head 622 to effect a final seal.

Figure 7:
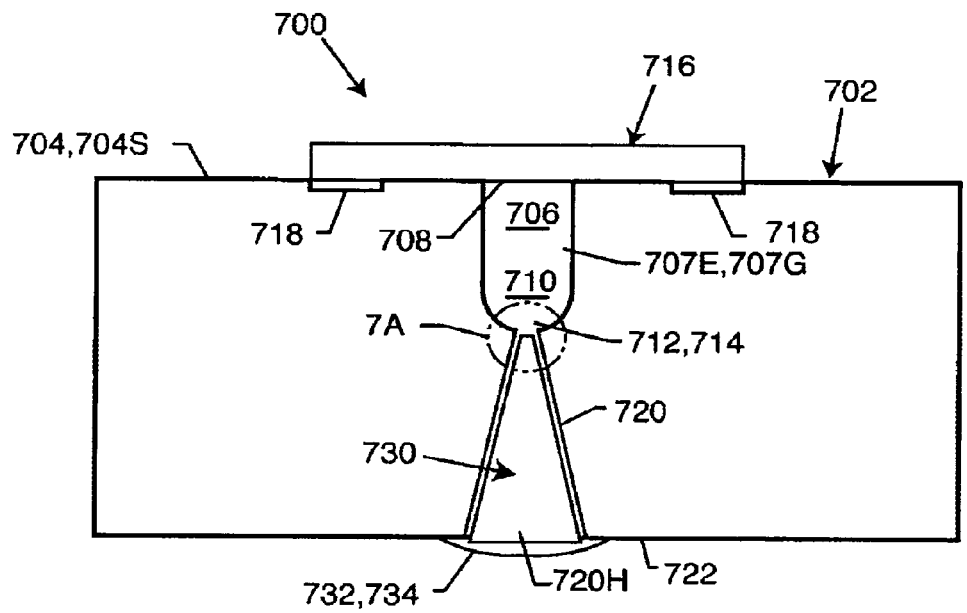
FIG. 7 schematically depicts the FIG. 6 DWIPL wherein the bore is tapered and a tapered plug is press-fitted into the bore.
Figure 7A:
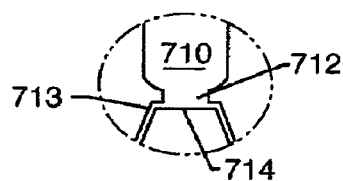
FIG. 7A is a detail view of the circled region "7A" in FIG. 7, showing the plug tip and chamber bottom.

Referring to FIGS. 7 and 7A, a DWIPL 700 includes a body 702 having a side 704 with a surface 704S from which depends a lamp chamber 706 having a first aperture 708 and a lower portion 710 tapering in a neck 712 terminating in a second aperture 714. A window 716, preferably made of sapphire, is attached to surface 704S by a seal 718. Lamp body 702 further includes a tapered bore 720 extending between a body side 722 generally opposed to side 704, and aperture 714, so that the bore is in communication with the neck 712, forming a lip 713. Window 716 is sealed to surface 704S in an inert atmosphere. Lamp body 702 and a plug 730, tapered to match the taper of bore 720 and having a head 732, are then brought into an atmospheric chamber containing the starting gas to be used in the lamp chamber, which is at or near the desired non-operating pressure for the lamp. The light emitter is then deposited in lamp chamber 706 through bore 720 and aperture 714. Plug 730 is then force-fitted into bore 720 so that the plug contacts lip 713, effecting a mechanical seal, and a metallic or glass material 734 deposited over head 732 to effect a final seal.

Figure 8:
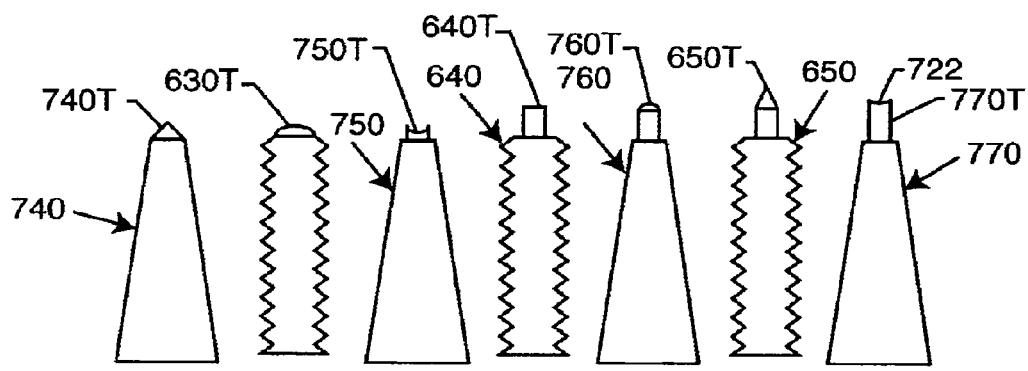
FIG. 8 shows first, second and third plug configurations for the FIG. 6 DWIPL, and first, second, third and fourth plug configurations for the FIG. 7 DWIPL.

FIG. 8 shows three configurations 630, 640, 650 of the screw-type plug 620, and four configurations 740, 750, 760, 770 of the tapered plug 730. Plugs 630, 640 and 650 have, respectively, a dome-shaped tip 630T, a rod-shaped tip 640T, and a chisel-shaped tip 650T. Plugs 740, 750, 760 and 770 have, respectively, a conical tip 740T, a cup-shaped tip 750T, a chisel-shaped tip 760T, and a rod-shaped tip 770T having a concave end 722. If a plug having an extended tip such as plug 650 or plug 760 is used, the tip extends well into chamber 706 creating a discontinuity which provides an electric field concentration point.

Figure 9:
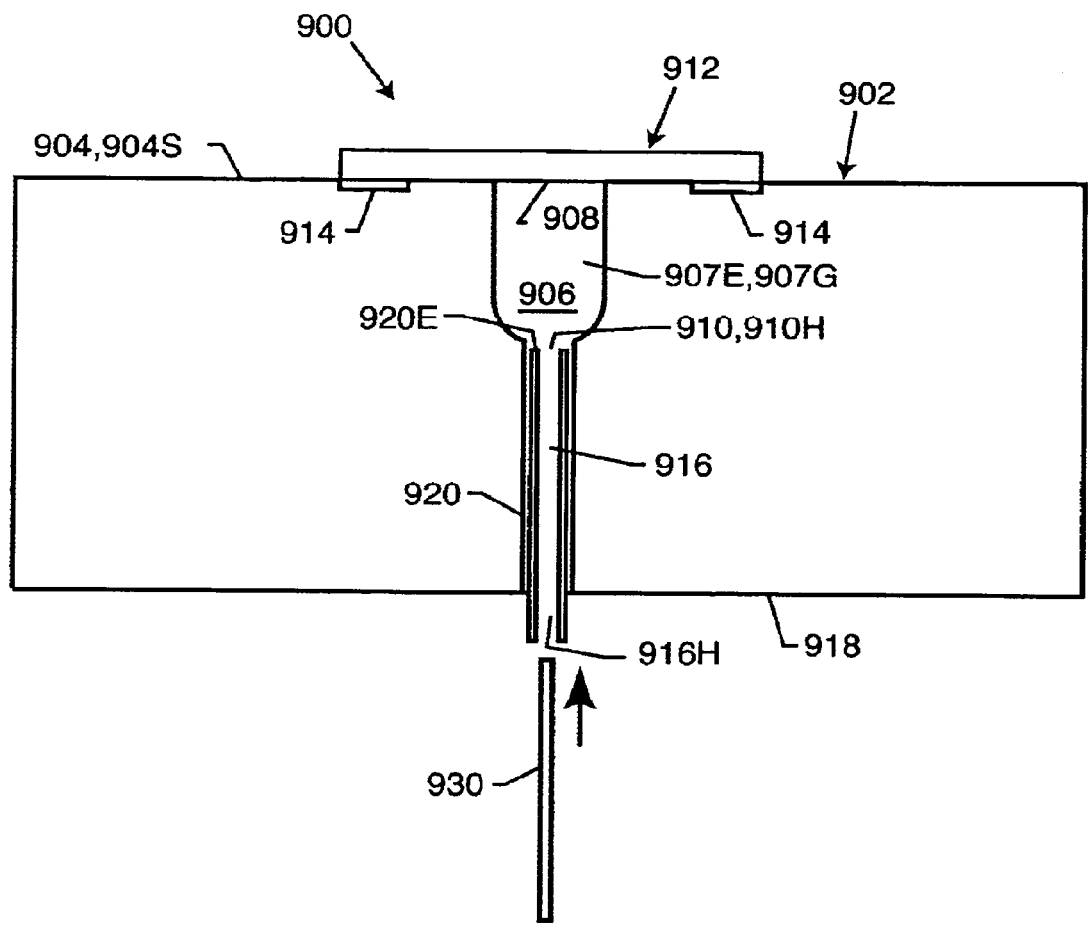
FIG. 9 schematically depicts a DWIPL having a body with a narrow cylindrical bore with a glass or quartz tube inserted therein, extending between a body side opposed to a side having a lamp chamber aperture, and the chamber bottom. Fill in the chamber is sealed by a window over the aperture and a glass or quartz rod inserted into the tube.

Referring to FIG. 9, a DWIPL 900 includes a body 902 having a side 904 with a surface 904S from which depends a lamp chamber 906 having an aperture 908 and a bottom 910 with a hole 910H. A window 912, preferably made of sapphire, is attached to surface 904S by a seal 914. Lamp body 902 further includes a cylindrical bore 916 extending between a body side 918 generally opposed to side 904, and chamber bottom 910, so that the bore is in communication with hole 910H. After window 912 is sealed to surface 904S in an inert atmosphere, a glass or quartz tube 920 having an end 920E is inserted into bore 916 so that end 920E extends through hole 910H into chamber 906. The chamber is then evacuated by a vacuum pump connected to tube 920. A fill mixture of starting gas and light emitter is then deposited into the chamber via the tube. When the fill is complete, a glass or quartz rod 930 having an outer diameter a little smaller than the inner diameter of the tube is inserted into the tube, and the tube and rod heated and pinched off. Thus, tube 920 is filled with a dielectric material which provides a reliable seal. The chamber filling and sealing process can be done without resort to a vacuum chamber, i.e., with the lamp at atmospheric pressure. Alternatively, the lamp body 902 with tube 920 inserted into bore 916 is brought into an atmospheric chamber containing the starting gas to be used in the lamp chamber, which is at or near the desired non-operating pressure for the lamp. The light emitter is then introduced into the chamber via the tube. When the fill is complete, the rod 930 is inserted into the tube, and the tube and rod heated and pinched off.

Figure 10:
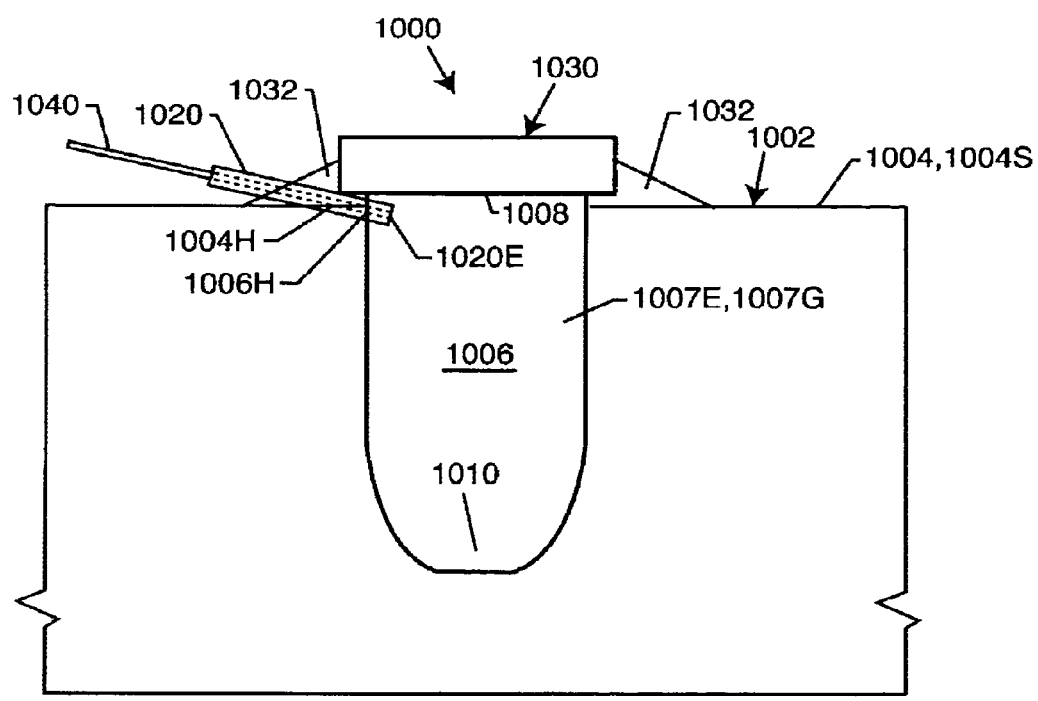
FIG. 10 schematically depicts a DWIPL having a body with a lamp chamber whose aperture is covered by a window. Fill in the chamber is sealed by a glass or quartz rod inserted into a glass or quartz tube inserted into an indent in the chamber wall proximate to the window periphery, and the window.

Referring to FIG. 10, a DWIPL 1000 includes a body 1002 having a side 1004 with a surface 1004S from which depends a lamp chamber 1006 having an aperture 1008 and a bottom 1010. Side 1004 has a hole 1004H in communication with a hole 1006H in chamber 1006. A glass or quartz tube 1020 having an end 1020E is inserted through holes 1004H and 1006H so that the end penetrates the chamber. A window 1030 covering aperture 1008, preferably made of sapphire, is then attached to surface 1004S by a frit or sealing material 1032 which melts at a temperature which will not melt the tube. After the window is sealed to surface 1004S with the tube 1020 in place and hole 1004H plugged by the sealing material, the chamber is evacuated by a vacuum pump connected to the tube. A fill mixture of starting gas and light emitter is then deposited into the chamber via the tube. When the fill is complete, a glass or quartz rod 1040 with an outer diameter a little smaller than the inner diameter of tube 1020 is inserted into the tube, and the tube 1020 and rod 1040 heated and pinched off.

Figure 11:
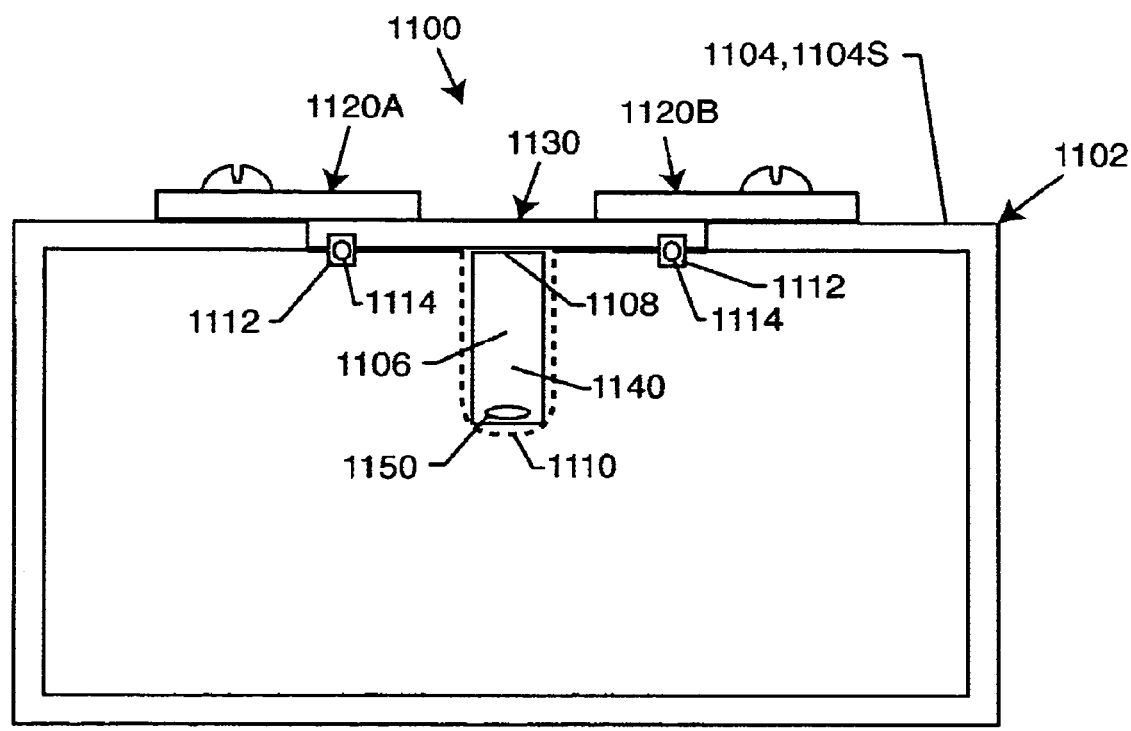
FIG. 11 schematically depicts a DWIPL having a body with a side having a lamp chamber aperture circumscribed by a groove in which is disposed an O-ring. Fill in the chamber is sealed by a window maintained in pressing contact with the O-ring by a clamping mechanism.

Referring to FIG. 11, a DWIPL 1100 includes a body 1102 having a side 1104 with a surface 1104S from which depends a lamp chamber 1106 having an aperture 1108 and a bottom 1110. Side 1104 has an O-ring groove 1112 circumscribing the aperture 1108. DWIPL 1100 further includes first and second clamps 1120A, 1120B, respectively, which can apply mechanical compression to a window 1130 covering the aperture. The lamp body 1102, window 1130, an O-ring 1114, and a fill mixture of starting gas 1140 and light emitter 1150 are brought into an atmospheric chamber containing the gas 1140 at a pressure at or near the desired non-operating pressure for the lamp. The light emitter is then deposited in the chamber 1106, the O-ring 1114 is placed into groove 1112, the window 1130 is placed on top of the O-ring, and the clamps 1120A, 1120B tightened, thus forming a temporary or permanent seal.

Figure 12:
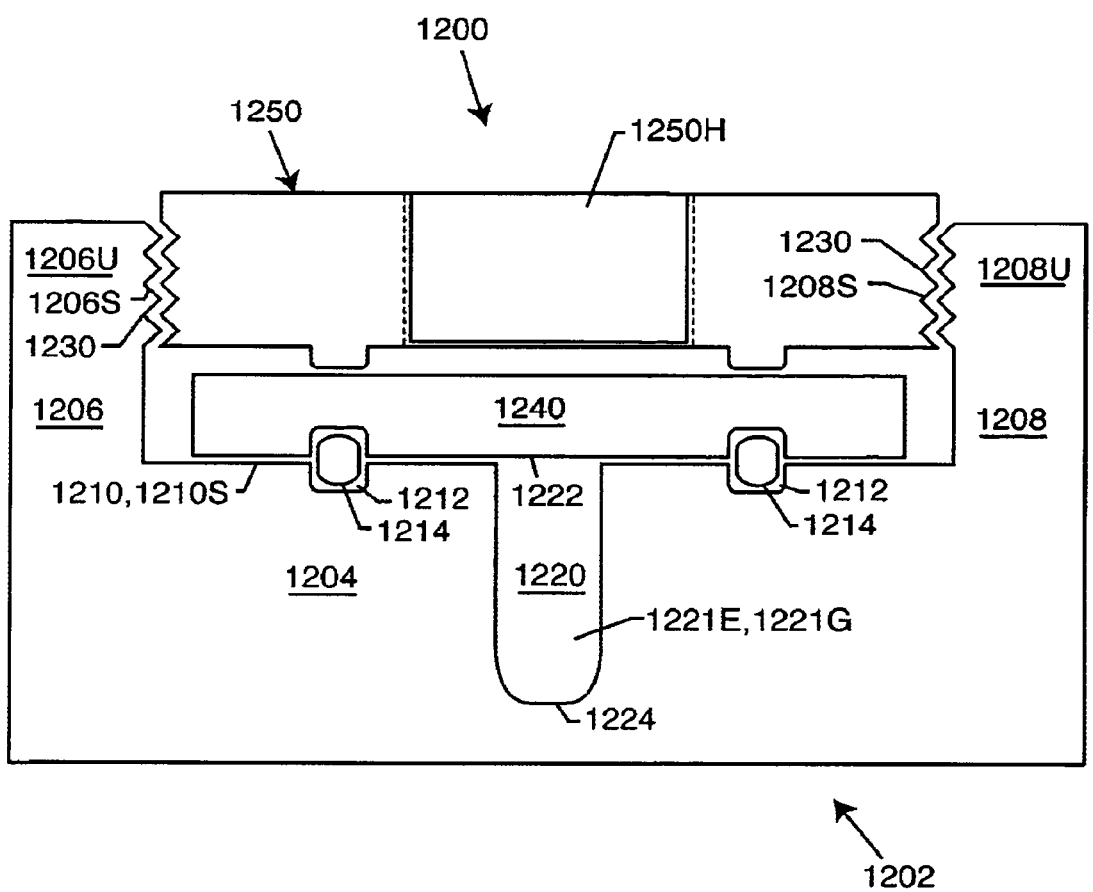
FIG. 12 schematically depicts a DWIPL having a "U"-shaped body with a surface having a lamp chamber aperture circumscribed by a groove in which is disposed an O-ring. Fill in the chamber is sealed by a window maintained in pressing contact with the O-ring by a screw cap.

Referring to FIG. 12, a DWIPL 1200 includes a "U"-shaped body 1202 having a central body portion 1204 attached to generally opposed first and second body portions 1206, 1208, respectively, which are generally orthogonal to body portion 1204 and extend in upper portions 1206U, 1208U, respectively. Body portion 1204 has a side 1210 with a surface 1210S from which depends a lamp chamber 1220 having an aperture 1222 and a bottom 1224. Side 1210 has an O-ring groove 1212 which circumscribes aperture 1222. Upper portions 1206U, 1208U have, respectively, an interior surface 1206S, 1208S, having a thread 1230. The thread may be a metallic attachment to the interior surfaces or cut into the surfaces. As for the FIG. 11 embodiment, the lamp body 1202 and a window 1240, an O-ring 1214, and a fill mixture of starting gas and light emitter are brought into an atmospheric chamber containing the gas at a pressure at or near the desired non-operating pressure for the lamp. The light emitter is deposited in the chamber 1220, the O-ring 1214 is placed into groove 1212, the window 1240 is placed on top of the O-ring, and a screw-type metallic cap 1250 is engaged with the thread 1230. Cap 1250 has therethrough a central hole 1250H which serves as a light tunnel. Screwing down the cap applies pressure to the window, thereby compressing the O-ring to form a temporary or permanent seal.

Figure 13:
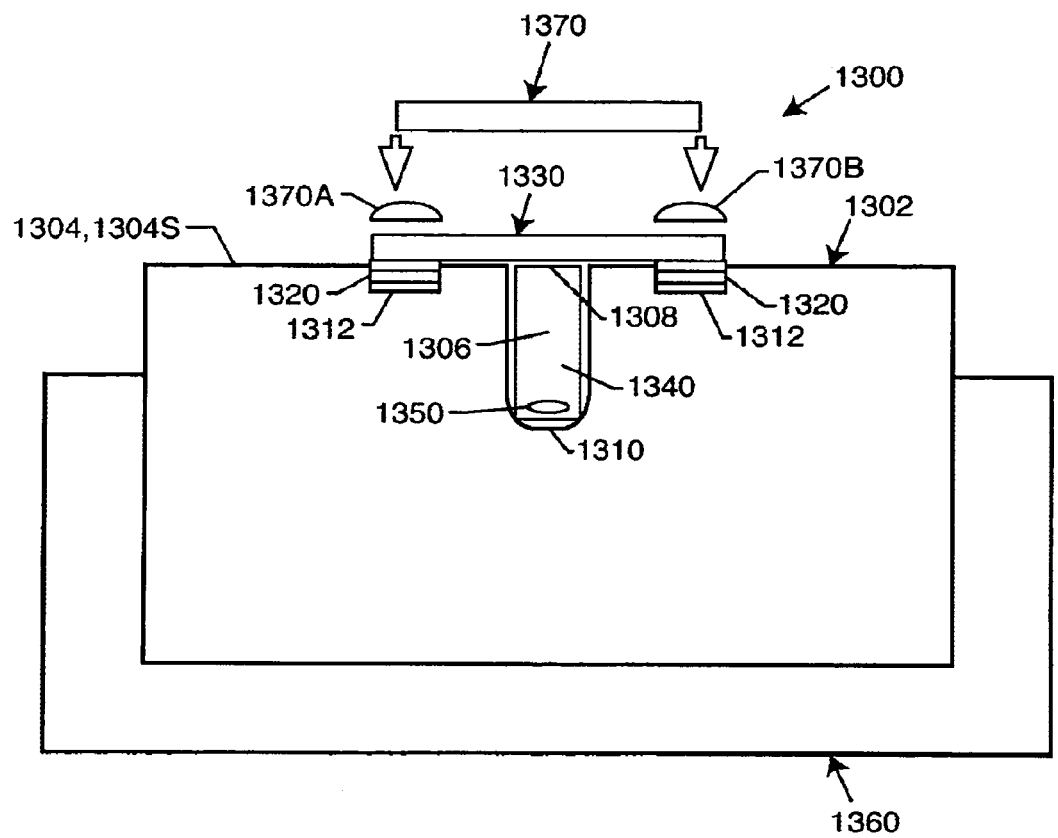
FIG. 13 schematically depicts a DWIPL having a body with a side having a lamp chamber aperture circumscribed by a preformed seal. Fill in the chamber is sealed by a heated window which melts the seal when the window is brought into pressing contact with the seal by a hot mandrel.

Referring to FIG. 13, a DWIPL 1300 includes a body 1302 having a side 1304 with a surface 1304S from which depends a lamp chamber 1306 having an aperture 1308 and a bottom 1310. Side 1304 has therein a detail 1312 circumscribing the aperture 1308 and adapted to closely receive a seal preform 1320, such as a platinum or glass ring. The lamp body 1302, a window 1330, the seal 1320, and a fill mixture of starting gas 1340 and light emitter 1350 are brought into an atmospheric chamber containing the gas 1340 at a pressure at or near the desired non-operating pressure for the lamp. The light emitter is deposited in the chamber 1306, the seal 1320 placed in the detail 1312, and the window 1330 placed on top of the seal preform. The lamp body 1302 is then placed on or clamped to a cold surface 1360, so that the body and fill mixture remain sufficiently cool that no materials vaporize during heating of the seal preform. A hot mandrel 1370 is then applied in pressing contact to window 1330, heating the window and melting the seal preform. Indicia 1370A and 1370B denote melt-through heat transfer. The seal preform material is chosen to melt and flow at a temperature below the thermal limit for the window and lamp body. When the seal preform melts and then is cooled, it forms a seal between the window and side 1304. During the sealing operation, the gas pressure in the lamp chamber must be selected to compensate for expansion during heating.

Figure 14:
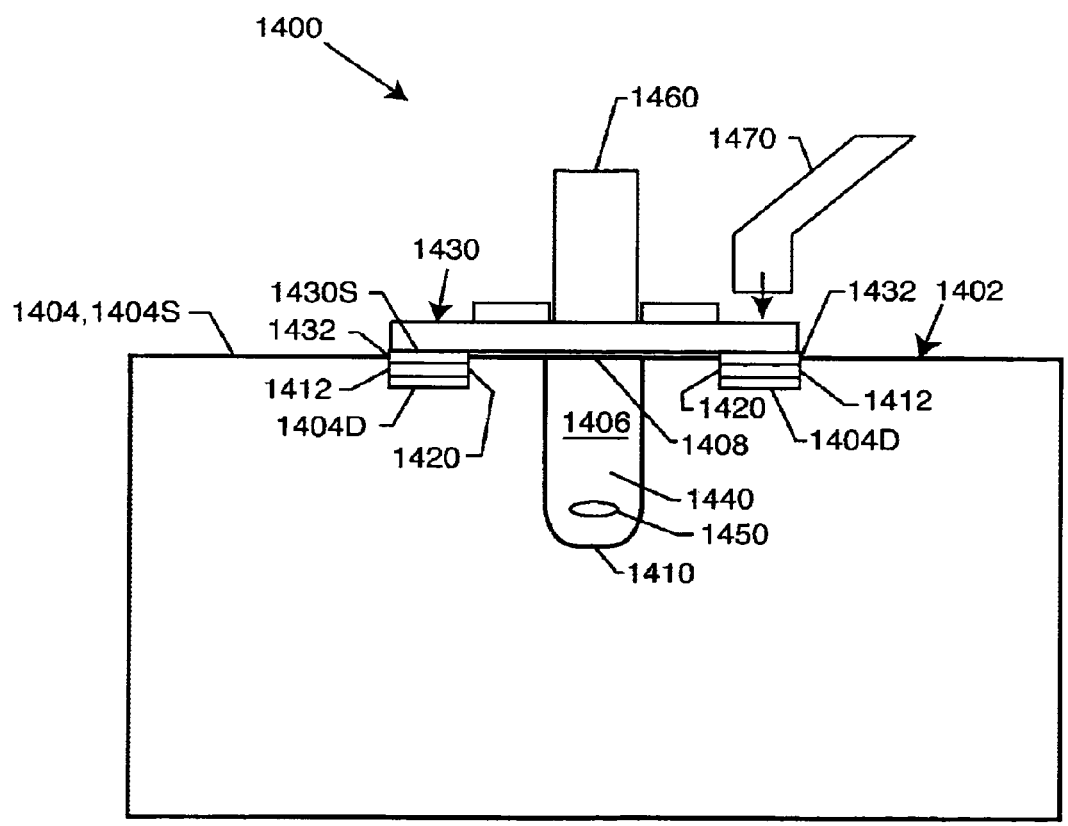
FIG. 14 schematically depicts a DWIPL having a body with a side having a lamp chamber aperture circumscribed by an attached first metallization ring and a preformed seal. Fill in the chamber is sealed when a second metallization ring attached to a window is brought into pressing contact with the first ring by a clamp and heat is applied to melt the preformed seal.

Referring to FIG. 14, a DWIPL 1400 includes a body 1402 having a side 1404 with a surface 1404S from which depends a lamp chamber 1406 having an aperture 1408 and a bottom 1410. Attached to side 1404 by brazing, vacuum deposition or screening, and disposed within a detail 1404D in side 1404 is a first metallization ring 1412 circumscribing the aperture 1408. Within detail 1404D is a seal preform 1420, such as a platinum ring, superposed on ring 1412. A window 1430 has a lower surface 1430S to which, proximate to its periphery, is attached by brazing, vacuum deposition or screening a second metallization ring 1432. The lamp body 1402, the window 1430, the seal perform 1420, and a fill mixture of starting gas 1440 and light emitter 1450 are brought into an atmospheric chamber containing the gas 1440 at a pressure at or near the desired non-operating pressure for the lamp. The light emitter is deposited in the chamber 1406, and the window 1430 placed on top of the seal preform 1420 so that the preform is sandwiched between rings 1412 and 1432. Preferably, a clamp 1460 holds the window in place while a brazing flame or other heat source is applied to melt the preform and form a seal.

Figure 15:
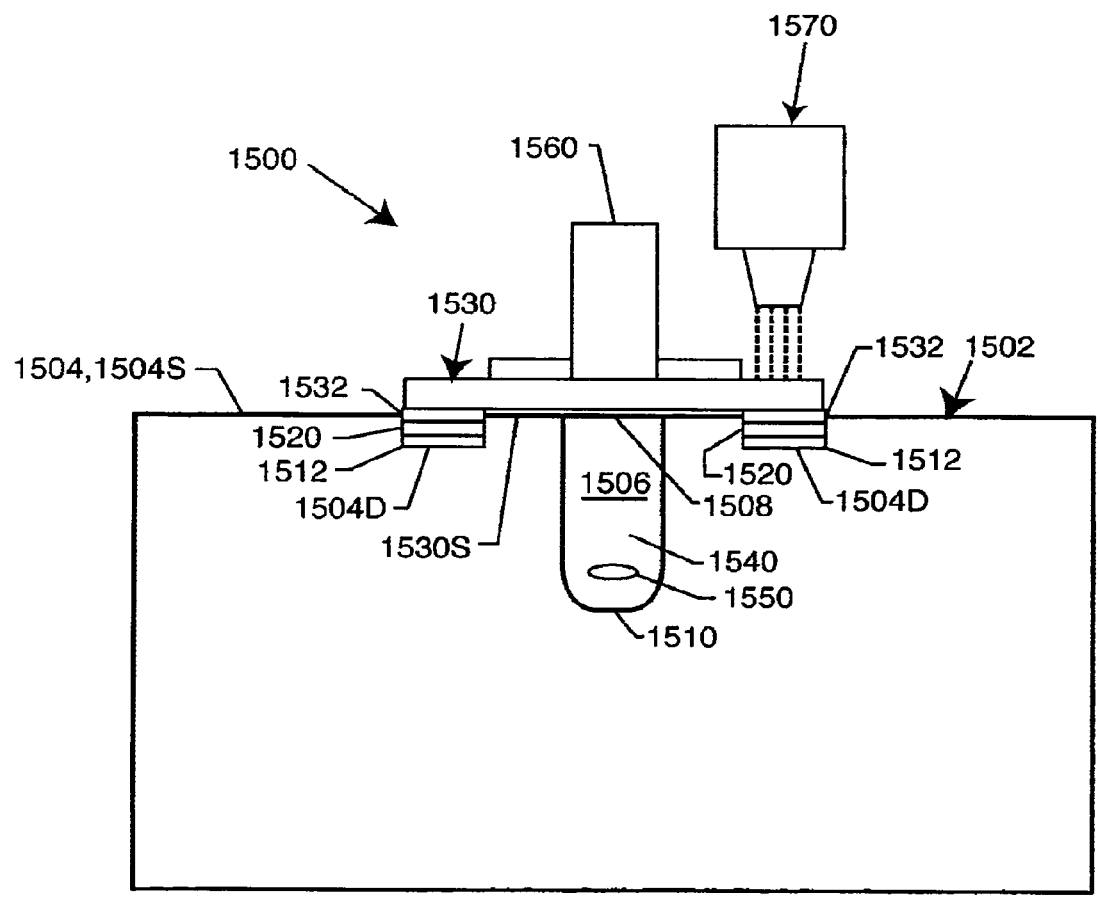
FIG. 15 schematically depicts the FIG. 14 DWIPL wherein a laser is used to melt the preformed seal.

Referring to FIG. 15, a DWIPL 1500 includes a body 1502 having a side 1504 with a surface 1504S from which depends a lamp chamber 1506 having an aperture 1508 and a bottom 1510. Attached to side 1504 by brazing, vacuum deposition or screening, and disposed within a detail 1504D in side 1504 is a first metallization ring 1512 circumscribing the aperture 1508. Within detail 1504D is a seal preform 1520, such as a platinum or glass ring, superposed on ring 1512. A window 1530 has a lower surface 1530S to which, proximate to its periphery, is attached by brazing, vacuum deposition or screening a second metallization ring 1532. The lamp body 1502, the window 1530, the seal preform 1520, and a fill mixture of starting gas 1540 and light emitter 1550 are brought into an atmospheric chamber containing the gas 1540 at a pressure at or near the desired non-operating pressure for the lamp. The mixture is deposited in the chamber 1506, and the window 1530 placed on top of the seal preform 1520 so that the preform is sandwiched between rings 1512 and 1532. Preferably, a clamp 1560 holds the window in place while a laser 1570 is focused and moved in a controlled pattern to melt an then permit cooling of the seal preform material. Laser sealing can be done at atmospheric or partial pressure.

Figure 16:
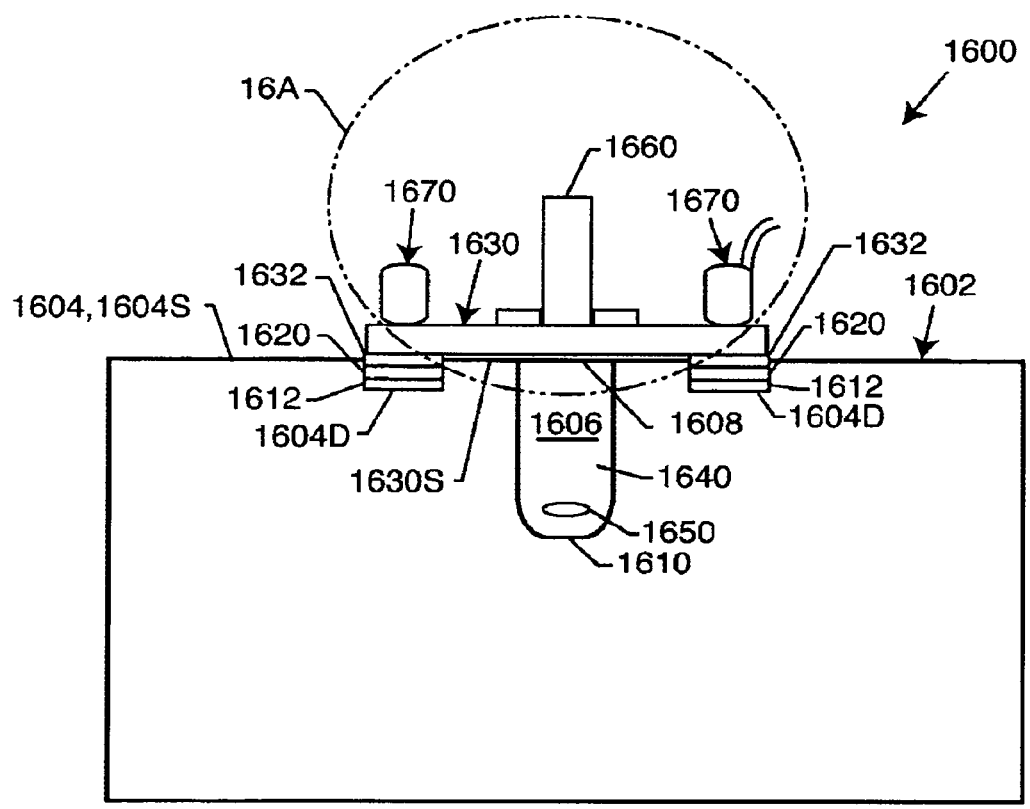
FIG. 16 schematically depicts the FIG. 14 DWIPL wherein the melting of the preformed seal results from inductive heating by an RF coil.
Figure 16A:
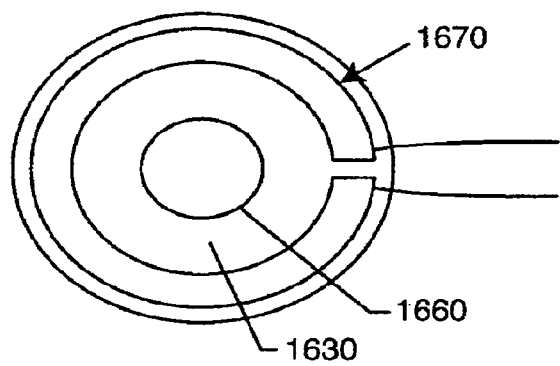
FIG. 16A is a top plan view of the FIG. 16 DWIPL.

Referring to FIGS. 16 and 16A, a DWIPL 1600 includes a body 1602 having a side 1604 with a surface 1604S from which depends a lamp chamber 1606 having an aperture 1608 and a bottom 1610. Attached to side 1604 by brazing, vacuum deposition or screening, and disposed within a detail 1604D of side 1604 is a first metallization ring 1612 circumscribing the aperture 1608. Within detail 1604D is a seal perform 1620, such as a platinum or other conductive material, superposed on ring 1612. A window 1630 has a lower surface 1630S to which, proximate to its periphery, is attached by brazing, vacuum deposition or screening a second metallization ring 1632. The lamp body 1602, the window 1630, the seal preform 1620, and a fill mixture of starting gas 1640 and light emitter 1650 are brought into an atmospheric chamber containing the gas 1640 at a pressure at or near the desired non-operating pressure for the lamp. The light emitter 1650 is deposited in the chamber 1606, and the window 1630 placed on top of the seal preform 1620 so that the preform is sandwiched between rings 1612 and 1632. Preferably, a clamp 1660 holds the window in place while a radio frequency (RF) coil 1670 is moved close to the seal preform. The coil heats and melts the preform which, after cooling, forms a seal between the window and side 1604. RF sealing can be done at atmospheric or partial pressure.

Figure 17B:
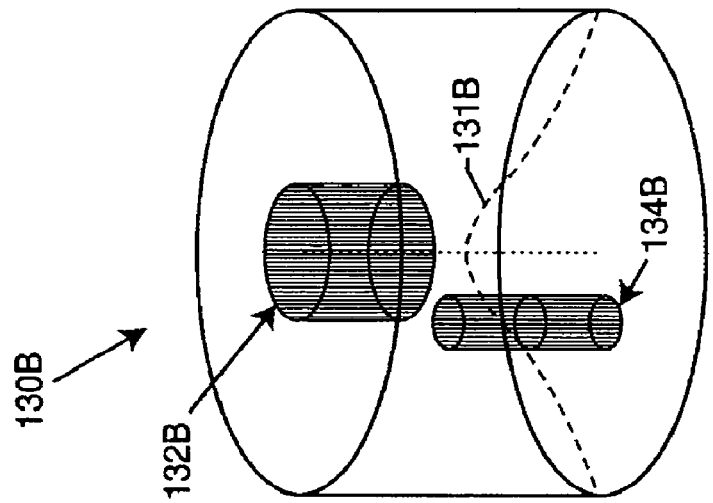
FIG. 17B schematically depicts the FIG. 17A DWIPL wherein the bulb is located at the electric field maximum of the FIG. 17A resonant mode, and a drive probe is offset from the maximum. The FIG. 17B probe is longer than the FIG. 17A probe to compensate for coupling loss due to the offset.
Figure 17A:
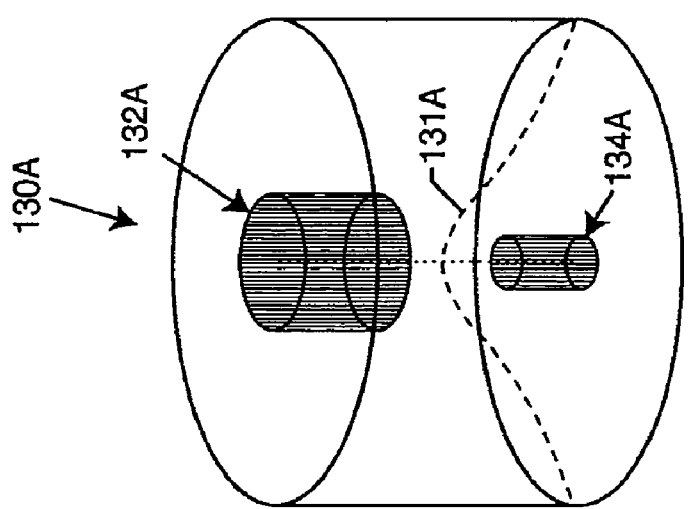
FIG. 17A schematically depicts a DWIPL having a cylindrical body wherein a bulb and a drive probe are located at the electric field maximum of a resonant mode.

Electromagnetically, a DWIPL is a resonant cavity having at least one drive probe supplying microwave power for energizing a plasma contained in at least one bulb. In the following portion of the detailed description "cavity" denotes a DWIPL body. As disclosed in the '718 application, a "bulb" may be a separate enclosure containing a fill mixture disposed within a lamp chamber, or the chamber itself may be the bulb. To provide optimal efficiency, a bulb preferably is located at an electric field maximum of the resonant cavity mode being used. However the bulb can be moved away from a field maximum at the cost of additional power dissipated by the wall and cavity. The location of the drive probe is not critical, as long as it is not at a field minimum, because the desired coupling efficiency can be achieved by varying probe design parameters, particularly length and shape. FIGS. 17A and 17B schematically show two cylindrical lamp configurations 130A, 130B, respectively, both operating at the fundamental cylindrical cavity mode, commonly known as $TM_{0,1,0}$, and having a bulb 132A, 132B, respectively, located at the single electric field maximum. Dashed curves 131A, 131B show, respectively, the electric field distribution in the cavity. In FIG. 17A, a drive probe 134A is located at the field maximum. In FIG. 17B, drive probe 134B is not located at the field maximum; however, it contains a longer probe which provides the same coupling efficiency as probe 134A. Although the $TM_{0,1,0}$ mode is used here as an example, higher order cavity modes, including but not limited to transverse electric field ("TE") and transverse magnetic field ("TM") modes, can also be used.

Drive probe design is critical for proper lamp operation. The probe must provide the correct amount of coupling between the microwave source and lamp chamber to maximize light emitting efficiency and protect the source. There are four major cavity loss mechanisms reducing efficiency: chamber wall dissipation, dielectric body dissipation, plasma dissipation, and probe coupling loss. As defined herein, probe coupling loss is the power coupled out by the drive probe and other probes in the cavity. Probe coupling loss is a major design consideration because any probe can couple power both into and out of the cavity. If the coupling between the source and cavity is too small, commonly known as "undercoupling", much of the power coming from the source will not enter the cavity but be reflected back to the source. This will reduce light emission efficiency and microwave source lifetime. If initially the coupling between the source and cavity is too large, commonly known as "over-coupling", most of the power from the source will enter the cavity. However, the cavity loss mechanisms will not be able to consume all of the power and the excess will be coupled out by the drive probe and other probes in the cavity. Again, light emission efficiency and microwave source lifetime will be reduced. In order to maximize light emission efficiency and protect the source, the drive probe must provide an appropriate amount of coupling such that reflection from the cavity back to the source is minimized at the resonant frequency. This condition, commonly known as "critical coupling," can be achieved by adjusting the configuration and location of the drive probe. Probe design parameters depend on the losses in the cavity, which depend on the state of the plasma and the temperature of the lamp body. As the plasma state and/or body temperature change, the coupling and resonant frequency will also change. Moreover, inevitable inaccuracies during DWIPL manufacture will cause increased uncertainty in the coupling and resonant frequency.

It is not practical to adjust probe physical parameters while a lamp is operating. In order to maintain as close to critical coupling as possible under all conditions, a feedback configuration is required (see FIG. 6 of the '718 application), such as lamp configurations 140A, 140B shown, respectively, in FIGS. 18A and 18B for a rectangular prism-shaped cavity and a cylindrical cavity. A second "feedback" probe 142A, 142B, respectively, is introduced into a cavity 144A, 144B, respectively. Feedback probe 142A, 142B, respectively, is connected to input port 146A, 146B, respectively, of a combined amplifier and control circuit (ACC) 148A, 148B, respectively, and a drive probe 150A, 150B, respectively, is connected to ACC output port 152A, 152B, respectively. Each configuration forms an oscillator. Resonance in the cavity enhances the electric field strength needed to create the plasma and increases the coupling efficiency between the drive probe and bulb. Both the drive probe and feedback probe may be located anywhere in the cavity except near an electric field minimum for electric field coupling, or a magnetic field minimum for magnetic field coupling. Generally, the feedback probe has a lesser amount of coupling than the drive probe because it samples the electric field in the cavity with minimum increase in coupling loss.

From a circuit perspective, a cavity behaves as a lossy narrow bandpass filter. The cavity selects its resonant frequency to pass from the feedback probe to the drive probe. The ACC amplifies this preferred frequency and puts it back into the cavity. If the amplifier gain is greater than the insertion loss at the drive probe entry port vis-a-vis insertion loss at the feedback probe entry port, commonly known as $S_{21}$, oscillation will start at the resonant frequency. This is done automatically and continuously even when conditions, such as plasma state and temperature, change continuously or discontinuously. Feedback enables manufacturing tolerances to be relaxed because the cavity continually "informs" the amplifier of the preferred frequency, so accurate prediction of eventual operating frequency is not needed for amplifier design or DWIPL manufacture. All the amplifier needs to provide is sufficient gain in the general frequency band in which the lamp is operating. This design ensures that the amplifier will deliver maximum power to the bulb under all conditions.

Figure 18B:
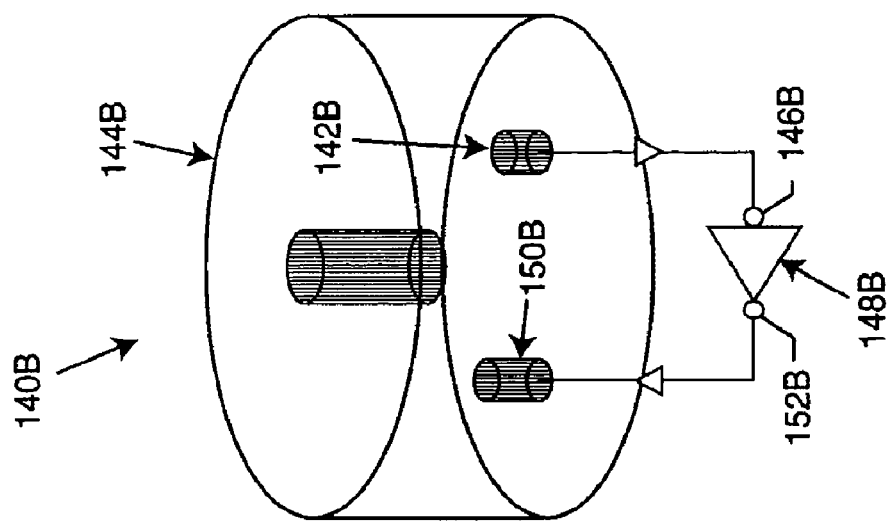
FIG. 18B schematically depicts a DWIPL having a cylindrical body wherein are disposed a bulb, and a drive probe and a feedback probe connected by a combined amplifier and control circuit.
Figure 18A:
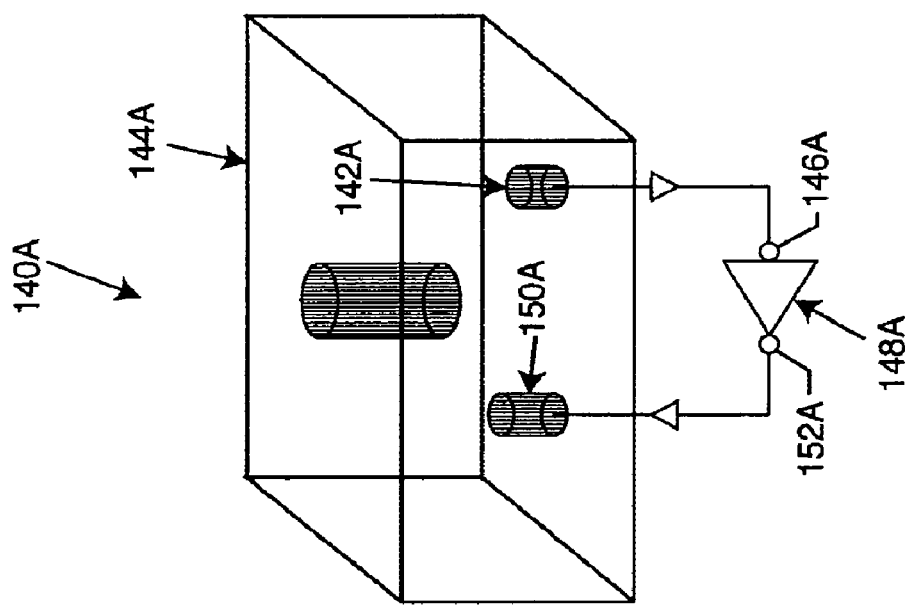
FIG. 18A schematically depicts a DWIPL having a rectangular prism-shaped body wherein are disposed a bulb, and a drive probe and a feedback probe connected by a combined amplifier and control circuit.

In order to maximize light emission efficiency, a drive probe is optimized for a plasma that has reached its steady state operating point. This means that prior to plasma formation, when losses in a cavity are low, the cavity is over-coupled. Therefore, a portion of the power coming from the microwave source does not enter the cavity and is reflected back to the source. The amount of reflected power depends on the loss difference before and after plasma formation. If this difference is small, the power reflection before plasma formation will be small and the cavity will be near critical coupling. Feedback configurations such as shown in FIG. 18A or 18B will be sufficient to break down the gas in the bulb and start the plasma formation process. However, in most cases the loss difference before and after plasma formation is significant and the drive probe becomes greatly over-coupled prior to plasma formation. Because much of the power is reflected back to the amplifier, the electric field strength may not be large enough to cause gas breakdown. Also, the large amount of reflected power may damage the amplifier or reduce its lifetime.

Figure 19:
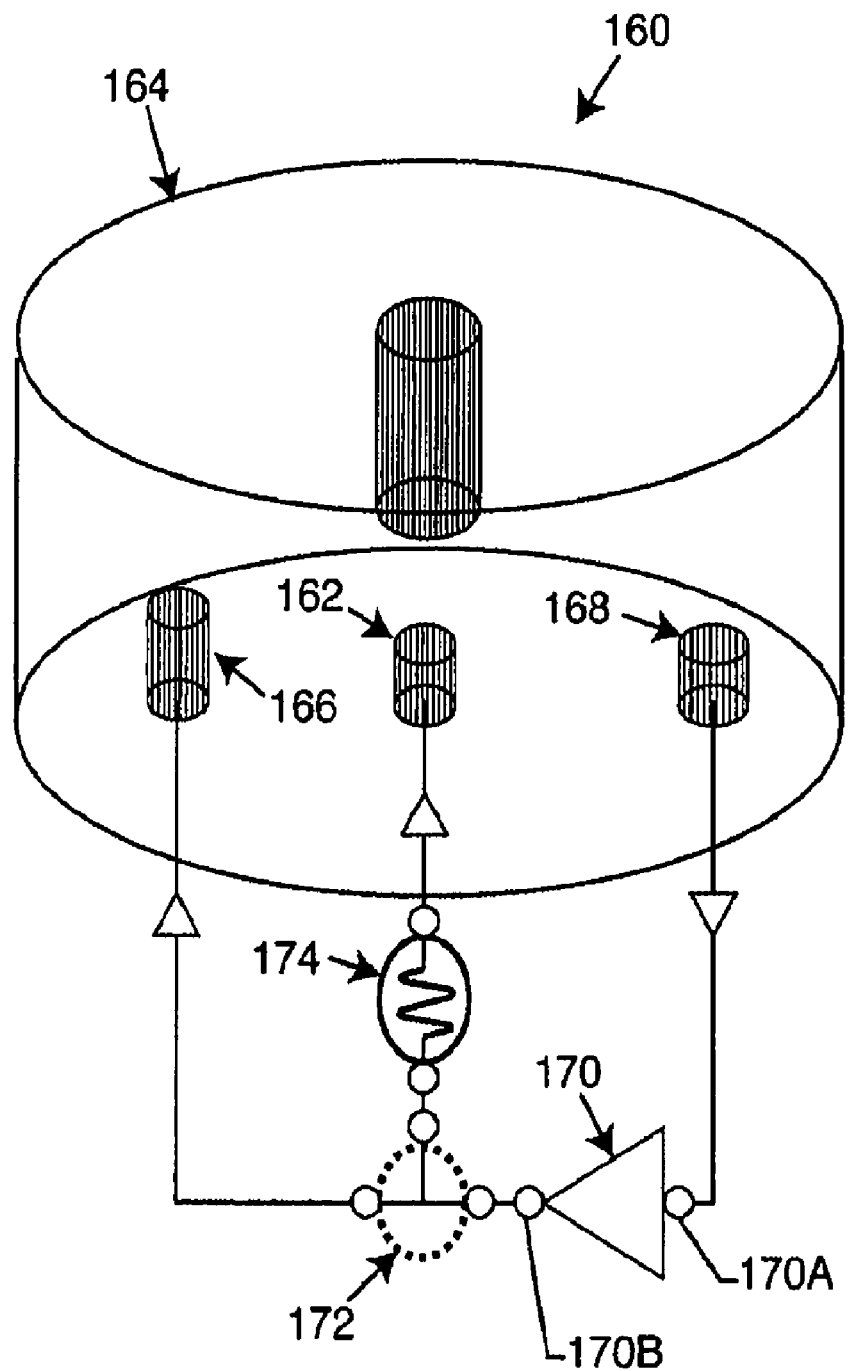
FIG. 19 schematically depicts a first embodiment of a DWIPL utilizing a start probe. The DWIPL has a cylindrical body wherein are disposed a bulb, a drive probe, a feedback probe, and the start probe. The feedback probe is connected to the drive probe by a combined amplifier and control circuit, and a splitter, and is connected to the start probe by the amplifier and control circuit, the splitter; and a phase shifter.

FIG. 19 shows a lamp configuration 160 which solves the drive probe over-coupling problem wherein a third "start" probe 162, optimized for critical coupling before plasma formation, is inserted into a cavity 164. Start probe 162, drive probe 166, and feedback probe 168 can be located anywhere in the cavity except near a field minimum. Power from output port 170B of an ACC 170 is split into two portions by a splitter 172: one portion is delivered to drive probe 166; the other portion is delivered to start probe 162 through a phase shifter 174. Probe 168 is connected to input port 170A of ACC 170. Both the start and drive probes are designed to couple power into the same cavity mode, e.g., $TM_{0,1,0}$ for a cylindrical cavity as shown in FIG. 19. The splitting ratio and amount of phase shift between probes 166 and 162 are selected to minimize reflection back to the amplifier. Values for these parameters are determined by network analyzer S-parameter measurements and/or simulation software such as High Frequency Structure Simulator (HFSS) available from Ansoft Corporation of Pittsburgh, Pa. In summary, the start probe is critically coupled before plasma formation and the drive probe is critically coupled when the plasma reaches steady state. The splitter and phase shifter are designed to minimize reflection back to the combined amplifier and control circuit.

Figure 20:
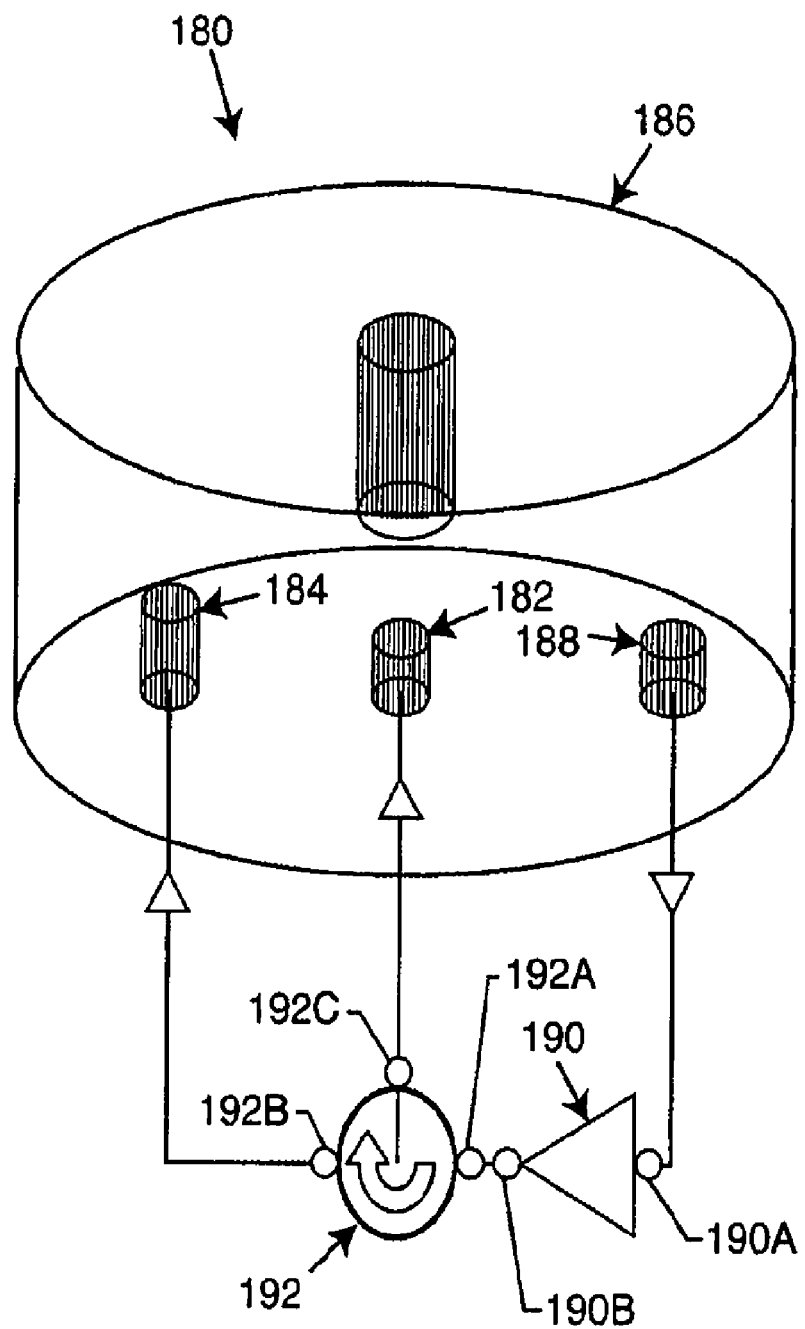
FIG. 20 schematically depicts a second embodiment of a DWIPL utilizing a start probe. The DWIPL has a cylindrical body wherein are disposed a bulb, a drive probe, a feedback probe, and the start probe. The feedback probe is connected to the drive probe and the start probe by a combined amplifier and control circuit, and a circulator.

FIG. 20 shows a second lamp configuration 180 which solves the drive probe over-coupling problem. Both start probe 182 and drive probe 184 are designed to couple power into the same cavity mode, e.g., $TM_{0,1,0}$ for a cylindrical cavity such as cavity 186. Configuration 180 further includes a feedback probe 188 connected to input port 190A of an ACC 190. The three probes can be located anywhere in the cavity except near a field minimum. Power from output port 190B of ACC 190 is delivered to a first port 192A of a circulator 192 which directs power from port 192A to a second port 192B which feeds drive probe 184. Prior to plasma formation, there is a significant amount of reflection coming out of the drive probe because it is over-coupled before the plasma reaches steady state. Such reflection is redirected by circulator 192 to a third port 192C which feeds the start probe 182. Before plasma formation, the start probe is critically coupled so that most of the power is delivered into the cavity 186 and start probe reflection is minimized. Only an insignificant amount of power goes into port 192C and travels back to ACC output port 190B. Power in the cavity increases until the fill mixture breaks down and begins forming a plasma. Once the plasma reaches steady state, the drive probe 184 is critically coupled so reflection from the drive probe is minimized. At that time, only an insignificant amount of power reaches the now under-coupled start probe 182. Although the start probe now has a high reflection coefficient, the total amount of reflected power is negligible because the incident power is insignificant. In summary, the start probe is critically coupled before plasma formation and the drive probe is critically coupled when the plasma reaches steady state. The circulator directs power from port 192A to 192B, from port 192B to port 192C, and from port 192C to port 192A.

Figure 21B:
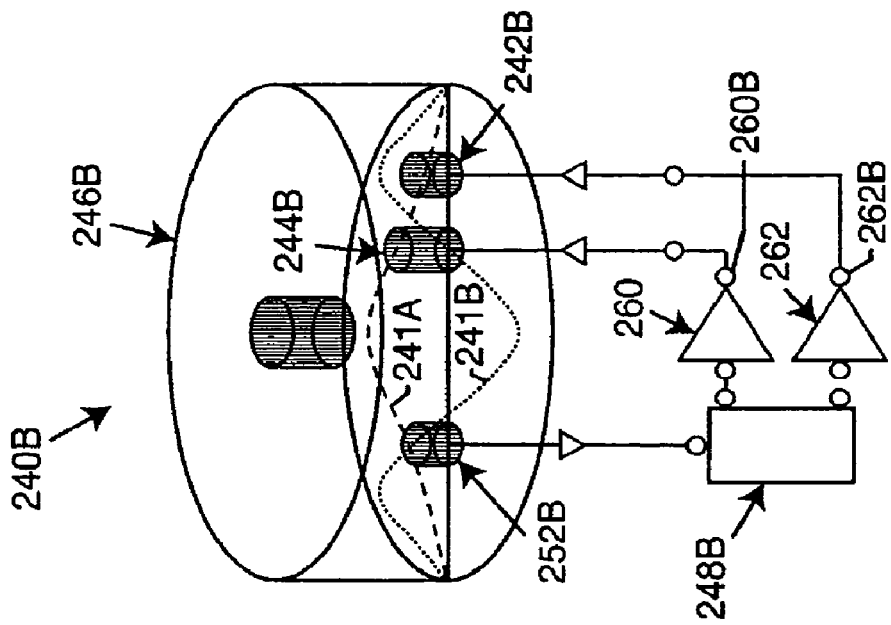
FIG. 21B schematically depicts an alternative configuration of the FIG. 21A embodiment wherein the feedback probe is connected to the drive probe by a diplexer and a first combined amplifier and control circuit, and to the start probe by the diplexer and a second combined amplifier and control circuit.
Figure 21A:
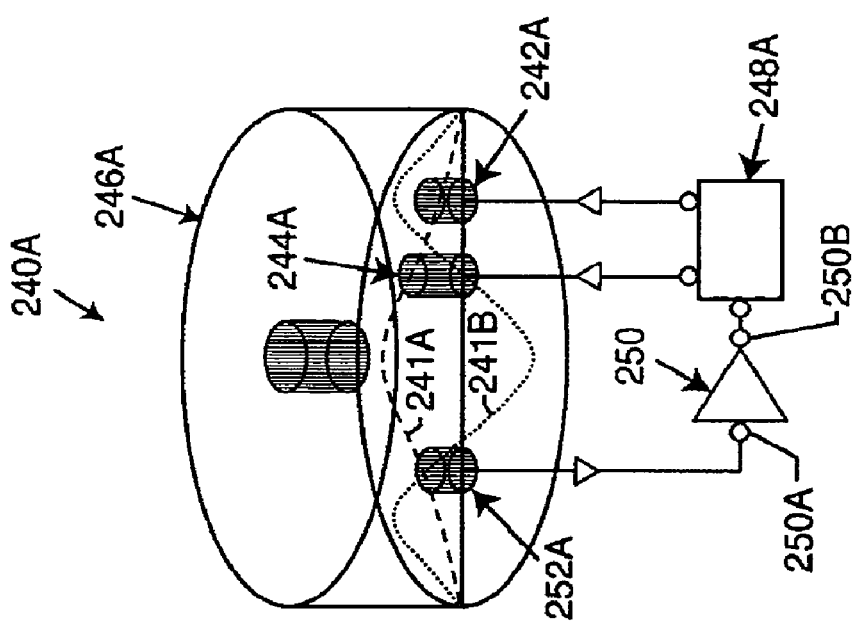
FIG. 21A schematically depicts a third embodiment of a DWIPL utilizing a start probe. The DWIPL has a cylindrical body wherein are disposed a bulb, a drive probe, a feedback probe, and the start probe. The feedback probe is connected to the drive probe and the start probe by a combined amplifier and control circuit, and a diplexer.

FIGS. 21A and 21B show third and fourth lamp configurations 240A, 240B which solve the drive probe over-coupling problem. A "start" cavity mode is used before plasma formation, and a separate "drive" cavity mode is used to power the plasma to its steady state and maintain that state. Start probe 242A, 242B, respectively, operates in the start cavity mode, and drive probe 244A, 244B, respectively, operates in the drive cavity mode. As indicated by dashed curves 241A and 241B, preferably the drive cavity mode is the fundamental cavity mode and the start cavity mode is a higher order cavity mode. This is because normally it requires more power to maintain the steady state plasma with the desired light output than to break down the gas for plasma formation. Therefore it is more economical to design a DWIPL so the high power microwave source operates at a lower frequency. For a cylindrical cavity such as cavities 246A and 246B, the start probe 242A, 242B, respectively, can be critically coupled at the resonant frequency of the $TM_{0,2,0}$ mode before plasma formation, and the drive probe 244A, 244B, respectively, can be coupled at the resonant frequency of the $TM_{0,1,0}$ mode after the plasma reaches steady state. The feedback probe can be located anywhere in the cavity except near a field minimum of the drive cavity mode or a field minimum of the start cavity mode. The start probe can be located anywhere in the cavity except near any field minima of the start cavity mode. The drive probe should be located near or at a field minimum of the start cavity mode but not near a field minimum of the drive cavity mode. This minimizes the coupling loss of the drive probe before plasma formation so that the electric field in the cavity can reach a higher value to break down the gas. A diplexer 248A, 248B, respectively, is used to separate the two resonant frequencies. In FIG. 21A, a single ACC 250 is used to power both cavity modes. The two frequencies are separated by diplexer 248A and fed to the start probe 242A and drive probe 244A. Feedback probe 252A is connected to input port 250A of ACC 250. In FIG. 21B, two separate amplifiers 260, 262 are used to power the two cavity modes independently. Diplexer 248B separates the two frequencies coming out of feedback probe 252B. In summary, the start probe operates in one cavity mode and the drive probe operates in a different mode. The feedback probe can be located anywhere in the cavity except near a field minimum of either mode. The start probe can be located anywhere in the cavity except near a field minimum of the start cavity mode. The drive probe should be located near or at a field minimum of the start cavity mode but not near a field minimum of the drive cavity mode.

An alternative approach is to add a second feedback probe, which eliminates the need for a diplexer. The first feedback probe is located at a field minimum of the start cavity mode to couple out only the drive cavity mode. The second feedback probe is located at a field minimum of the drive cavity mode to couple out only the start cavity mode.

Figure 22B:
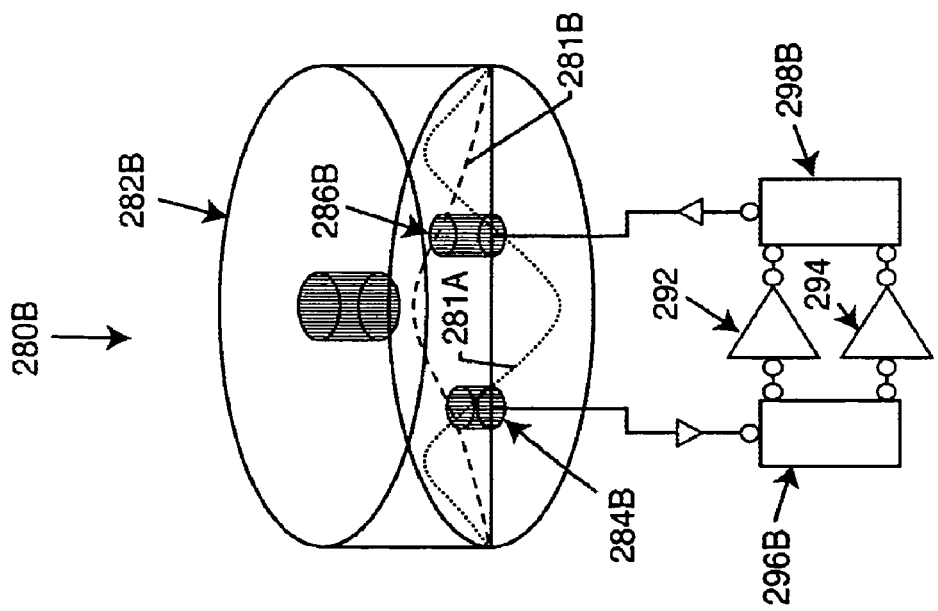
FIG. 22B schematically depicts an alternative configuration of the FIG. 22A embodiment wherein the feedback probe is connected to the drive probe by first and second diplexers and first and second combined amplifiers and control circuits.
Figure 22A:
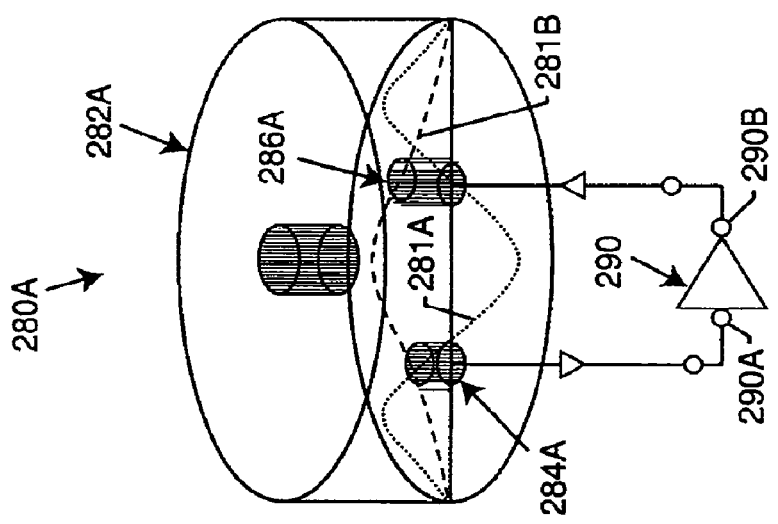
FIG. 22A schematically depicts a DWIPL wherein a start resonant mode is used before plasma formation and a drive resonant mode is used to power the plasma to steady state. The DWIPL has a cylindrical body wherein are disposed a bulb, a drive probe, and a feedback probe. A combined amplifier and control circuit connects the drive and feedback probes.

FIGS. 22A and 22B show lamp configurations 280A, 280B, respectively, which do not include a start probe but utilize two separate cavity modes. As indicated by curves 281A and 281B, respectively, in cavities 282A and 282B, a relatively high order start cavity mode is used before plasma formation and a relatively low order drive cavity mode is used to power the plasma to steady state and maintain the state. Preferably, for economy and efficiency, the drive cavity mode again is the fundamental cavity mode and the start cavity mode is a higher order cavity mode. For example, the $TM_{0,2,0}$ mode of a cylindrical lamp cavity can be used before plasma formation, and the $TM_{0,1,0}$ mode can be used to maintain the plasma in steady state. By utilizing two cavity modes, it is possible to design a single drive probe that is critically coupled both before plasma formation and after the plasma reaches steady state, thereby eliminating the need for a start probe. The feedback probe 284A, 284B, respectively, can be located anywhere in the cavity except near a field minimum of either cavity mode. The drive probe 286A, 286B, respectively, should be located near a field minimum of the start cavity mode but not near a field minimum of the drive cavity mode. By placing the drive probe near but not at a field minimum of the start cavity mode, the drive probe can be designed to provide the small amount of coupling needed before plasma formation and the large amount of coupling required after the plasma reaches steady state. In FIG. 22A, a single ACC 290 is used to power both cavity modes. In FIG. 22B, two separate ACC's 292, 294 are used to power the two cavity modes independently. A first diplexer 296B separates the two frequencies coming out of feedback probe 284B and a second diplexer 298B combines the two frequencies going into drive probe 286B. In summary, the drive probe is critically coupled at the start cavity mode resonant frequency before plasma formation and critically coupled at the drive cavity mode resonant frequency when the plasma reaches steady state. The feedback probe can be located anywhere in the cavity except near a field minimum of either cavity mode. The drive probe should be located near a field minimum of the start cavity mode but not near a field minimum of the drive cavity mode.

The '718 application disclosed a technique for drive probe construction wherein a metallic microwave feed is in intimate contact with the high dielectric material of the lamp body. This method has a drawback in that the amount of coupling is very sensitive to the exact dimensions of the probe. A further drawback is that due to the large temperature variation before plasma formation and after the plasma reaches steady state, a mechanism such as a spring is needed to maintain contact between the feed and body. These constraints complicate the manufacturing process and consequently increase production cost.

FIG. 23 shows a technique which avoids both problems. A metallic microwave feed 350 extending into a lamp body 352 is surrounded by a dielectric material 354 having a high breakdown voltage. Body 352 includes a lamp chamber 356. Due to the large amount of power delivered within a limited space, the electric field strength near tip 350T of feed 350 is very high; therefore a high breakdown voltage material is required. Typically, material 354 has a lower dielectric constant than that of the dielectric material forming body 352. Material 354 acts as a "buffer" which desensitizes the dependency of coupling on probe dimensions, thereby simplifying fabrication and reducing cost.

The amount of coupling between the microwave source and body can be adjusted by varying the location and dimensions of the probe, and the dielectric constant of material 354. In general, if the probe length is less than a quarter of the operating wavelength, a longer probe will provide greater coupling than a shorter probe. Also, a probe placed at a location with a higher field will provide greater coupling than a probe placed at a location where the field is relatively low. This technique is also applicable to a start probe or a feedback probe. The probe location, shape and dimensions can be determined using network analyzer S-parameter measurements and/or simulation software such as HFSS.

Figure 24:
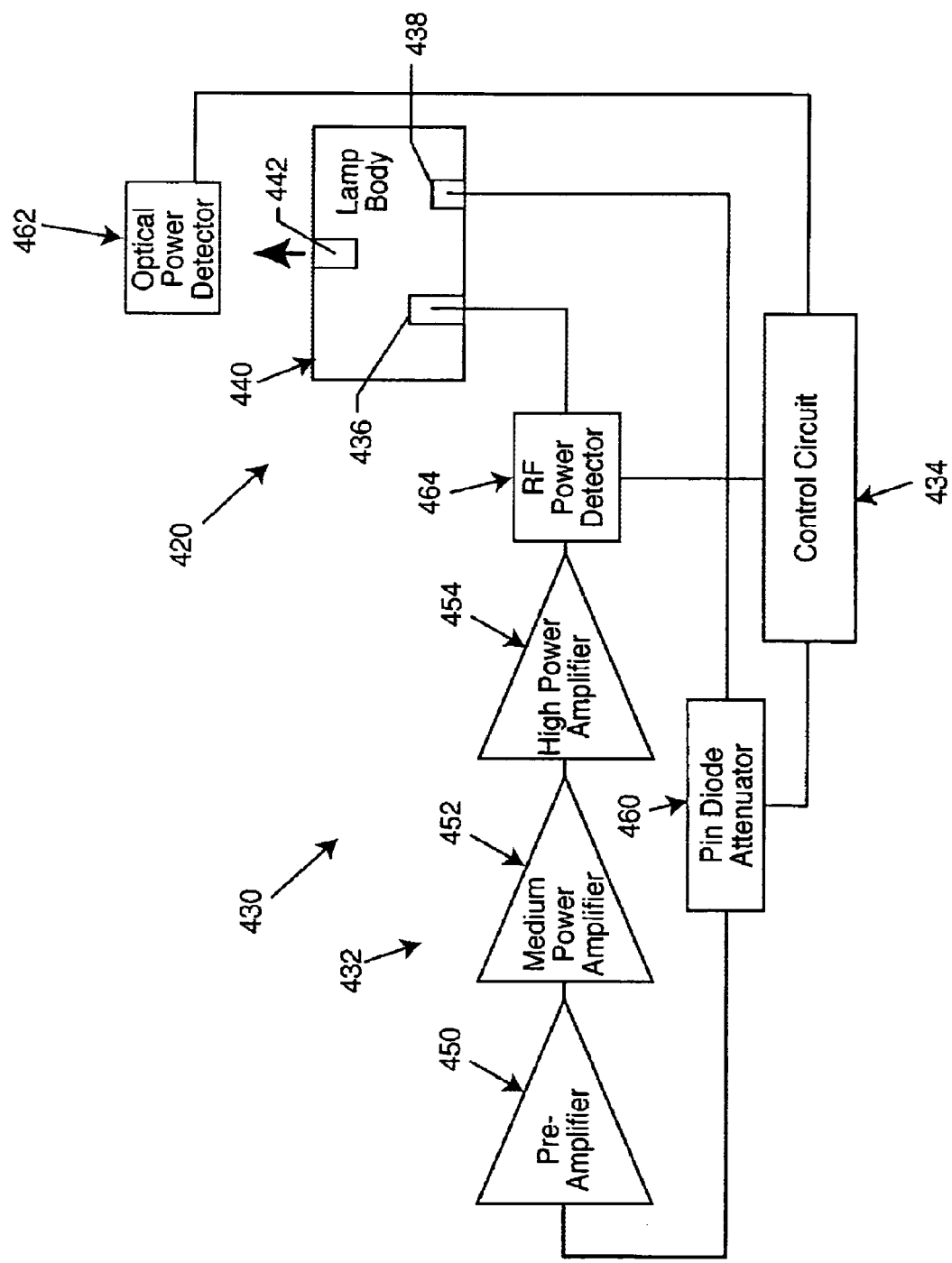
FIG. 24 is a block diagram of a first configuration of the FIGS. 18A, 18B, 22A and 22B combined amplifier and control circuit.

FIG. 24 shows a circuit 430 including an amplifier 432 and a control circuit 434, suitable for DWIPL's having only a drive probe 436 and feedback probe 438 such as shown in FIGS. 18A, 18B, 22A and 22B. The function of amplifier 432 is to convert DC power into microwave power of an appropriate frequency and power level so that sufficient power can be coupled into lamp body 440 and lamp chamber 442 to energize a fill mixture and form a light-emitting plasma.

Preferably, amplifier 432 includes a preamplifier stage 450 with 20 to 30 dBm of gain, a medium power amplifier stage 452 with 10 to 20 dB of gain, and a high power amplifier stage 454 with 10 to 18 dB of gain. Preferably, stage 450 uses the Motorola MHL21336, 3G Band RF Linear LDMOS Amplifier, stage 452 uses the Motorola MRF21030 Lateral N-Channel RF Power MOSFET; and stage 454 uses the Motorola MRF21125 Lateral N-Channel RF Power MOSFET. These devices as well as complete information for support and bias circuits are available from Motorola Semiconductor Products Sector in Austin, Tex. Alternatively, stages 450, 452 and 454 are contained in a single integrated circuit. Alternatively, stages 450 and 452, and control circuit 434 are packaged together, and high power stage 454 is packaged separately.

Amplifier 432 further includes a PIN diode attenuator 460 in series with stages 450, 452 and 454, preferably connected to preamplifier stage 450 to limit the amount of power which the attenuator must handle. Attenuator 460 provides power control for regulating the amount of power supplied to lamp body 440 appropriate for starting the lamp, operating the lamp, and controlling lamp brightness. Since the amplifier chain formed by stages 450, 452 and 454 has a fixed gain, varying the attenuation during lamp operation varies the power delivered to body 440. Preferably, the attenuator 460 acts in combination with control circuit 434, which may be analog or digital, and an optical power detector 462 which monitors the intensity of the light emitted and controls attenuator 460 to maintain a desired illumination level during lamp operation, even if power conditions and/or lamp emission characteristics change over time. Alternatively, an RF power detector 464 connected to drive probe 436, amplifier stage 454 and control circuit 434 is used to control the attenuator 460. Additionally, circuit 434 can be used to control brightness, i.e., controlling the lamp illumination level to meet end-application requirements. Circuit 434 includes protection circuits and connects to appropriate sensing circuits to provide the functions of over-temperature shutdown, over-current shutdown, and over-voltage shutdown. Circuit 434 can also provide a low power mode in which the plasma is maintained at a very low power level, insufficient for light emission but sufficient to keep the fill mixture gas ionized. Circuit 434 also can shut down the lamp slowly by increasing the attenuation. This feature limits the thermal shock a lamp repeatedly experiences and allows the fill mixture to condense in the coolest portion of the lamp chamber, promoting easier lamp starting.

Alternatively, attenuator 460 is combined with an analog or digital control circuit to control the output power at a high level during the early part of the lamp operating cycle, in order to vaporize the fill mixture more quickly than can be achieved at normal operating power. Alternatively, attenuator 460 is combined with an analog or digital control circuit which monitors transmitted and/or reflected microwave power levels through an RF power detector and controls the attenuator to maintain the desired power level during normal lamp operation, even if the incoming power supply voltage changes due to variations in the AC supply or other loads.

Figure 25:
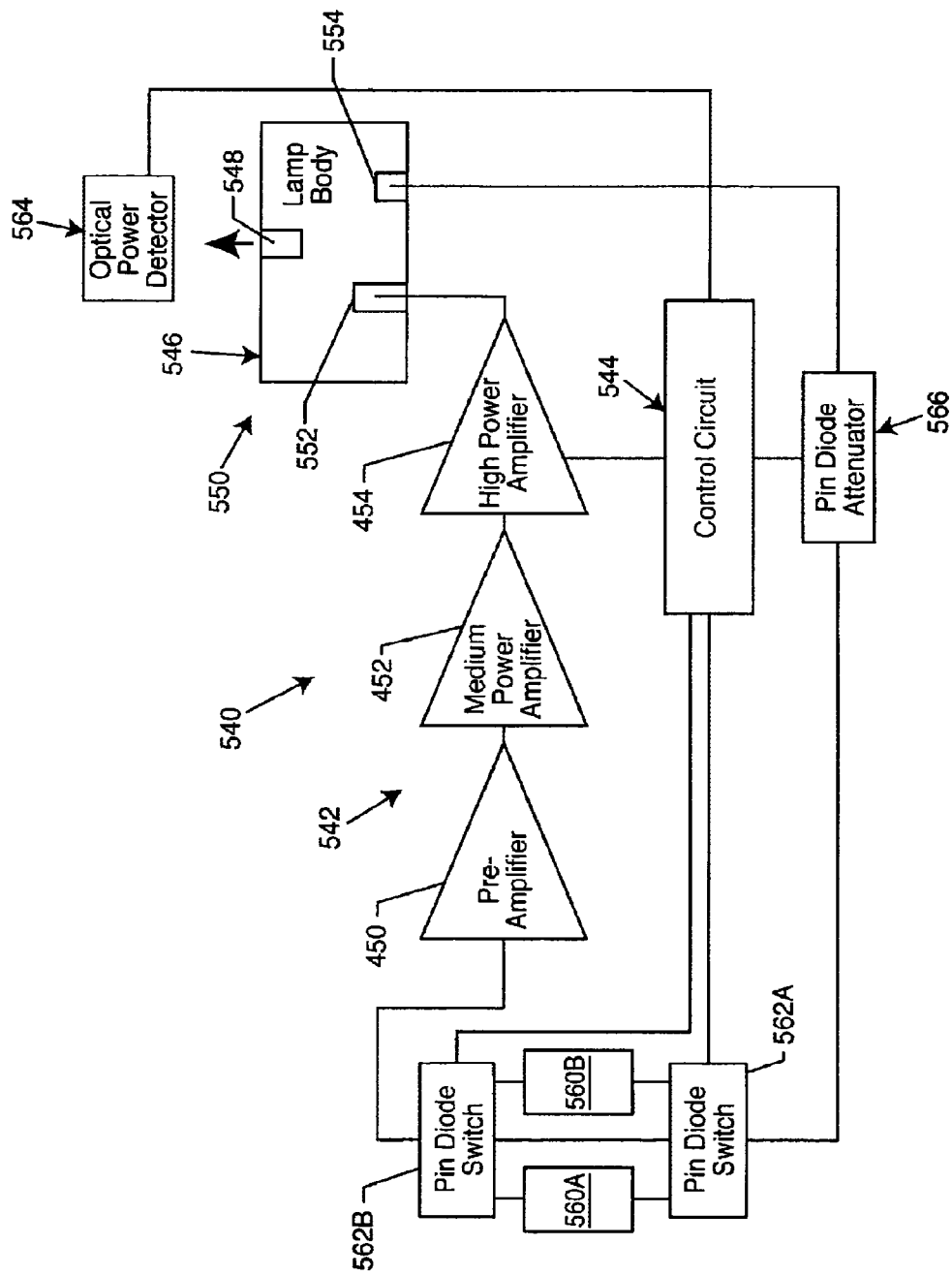
FIG. 25 is a block diagram of a second configuration of the FIGS. 18A, 18B, 22A and 22B combined amplifier and control circuit.

FIG. 25 shows an alternative circuit 540 including an amplifier 542 and a control circuit 544, suitable for supplying and controlling power to the body 546 and lamp chamber 548 of a DWIPL 550 having a drive probe 552 and feedback probe 554, such as shown in FIGS. 18A, 18B, 22A and 22B. A "starting" bandpass filter 560A and an "operating" bandpass filter 560B, in parallel and independently selectable and switchable, are in series with the FIG. 24 amplifier chain and preferably, as in FIG. 24, on the input side of the chain. Filters 560A and 560B filter out frequencies corresponding to undesired resonance modes of body 546. By selecting and switching into the circuit a suitable filter bandpass using first and second PIN diode switches 562A, 562B, the DWIPL 550 can operate only in the cavity mode corresponding to the selected frequency band, so that all of the amplifier power is directed into this mode. By switching in filter 560A, a preselected first cavity mode is enabled for starting the lamp. Once the fill mixture gas has ionized and the plasma begun to form, a preselected second cavity mode is enabled by switching in filter 560B. For a short time, both filters provide power to the lamp to ensure that the fill mixture remains a plasma. During the period when both filters are switched in, both cavity modes propagate through body 546 and the amplifier chain. When a predetermined condition has been met, such as a fixed time delay or a minimum power level, filter 560A is switched out, so that only the cavity mode for lamp operation can propagate through the amplifier chain. Control circuit 544 selects, deselects, switches in, and switches out filters 560A and 560B, following a predetermined operating sequence. An optical power detector 564 connected to control circuit 544 performs the same function as detector 462 in the FIG. 24 embodiment.

Figure 26:
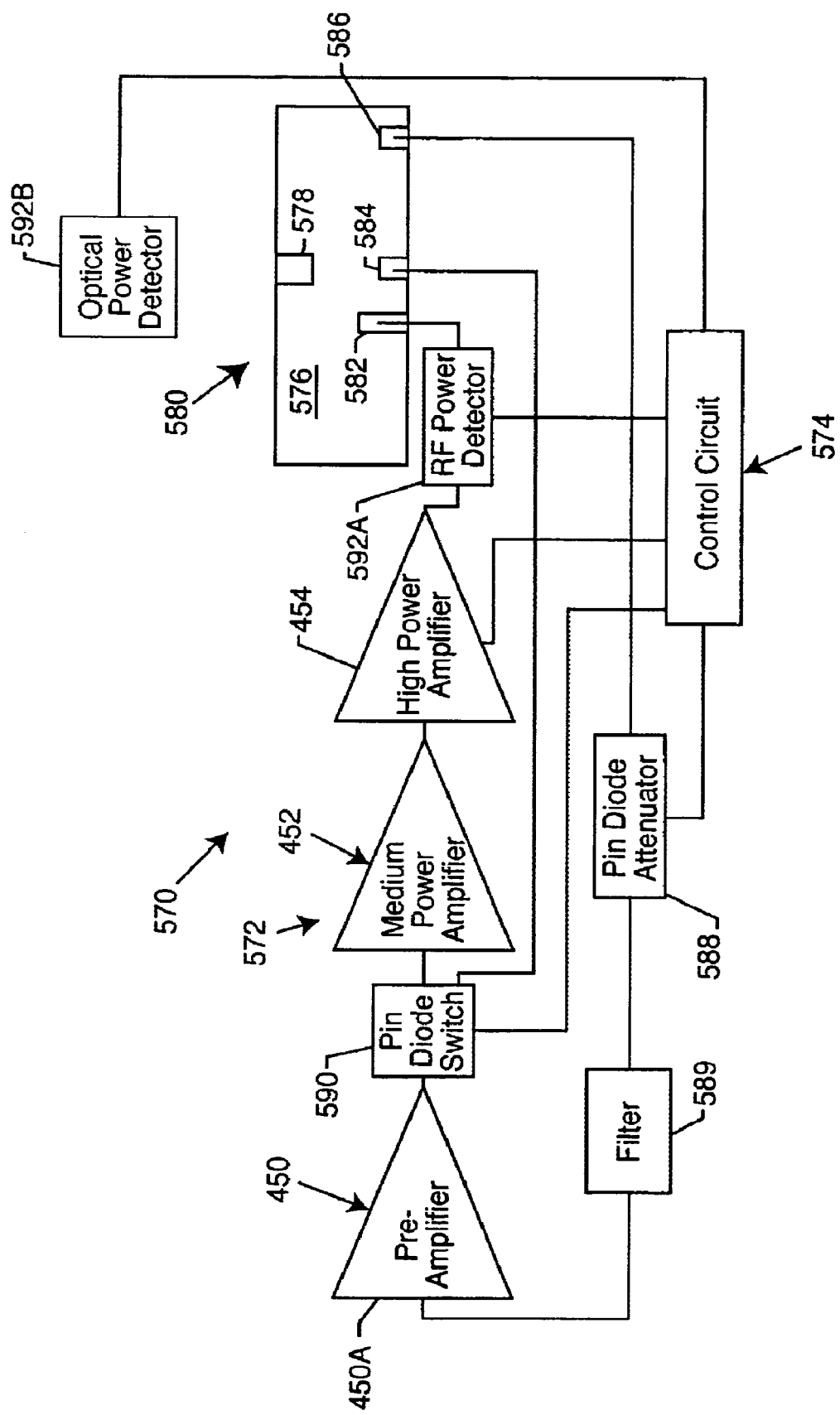
FIG. 26 is a block diagram of a configuration of the FIGS. 19, 20, 21A and 21B combined amplifier and control circuit.

FIG. 26 shows a circuit 570 including an amplifier 572 and an analog or digital control circuit 574, suitable for supplying and controlling power to the body 576 and lamp chamber 578 of a DWIPL 580 having a drive probe 582, a feedback probe 586 and a start probe 584, such as shown in FIGS. 19, 20, 21A and 21B. The feedback probe 586 is connected to input 450A of preamplifier 450 through a PIN diode attenuator 588 and a filter 589. The start probe 584 is designed to be critically coupled when lamp 580 is off. To start the lamp, a small amount of microwave power is directed into start probe 584 from preamplifier stage 450 or medium power stage 452 of the amplifier chain. The power is routed through a bipolar PIN diode switch 590 controlled by control circuit 574. Switch 590 is controlled to send RF microwave power to start probe 584 until the fill mixture gas becomes ionized. A sensor 592A monitors power usage within body 576, and/or a sensor 592B monitors light intensity indicative of gas ionization. A separate timer control circuit, which is part of control circuit 574, allocates an adequate time for gas breakdown. Once the gas has been ionized, control circuit 574 turns on switch 590 which routes microwave power to high power stage 454 which provides microwave power to drive probe 582. For a short time, start probe 584 and drive probe 582 both provide power to the lamp to ensure that the fill mixture remains a plasma. When a predetermined condition has been met, such as a fixed time period or an expected power level, control circuit 574 turns off switch 590 thereby removing power to start probe 584 so that the plasma is powered only by drive probe 582. This provides maximum efficiency.

To enhance the Q-value (i.e., the ratio of the operating frequency to the resonant frequency bandwidth) of the DWIPL 580 during starting, the control circuit 574 can bias the transistors of high power stage 454 to an impedance that minimizes leakage out of probe 582 into stage 454. To accomplish this, circuit 574 applies a DC voltage to the gates of the transistors to control them to the appropriate starting impedance.

What is claimed is:

1. An electrodeless plasma lamp comprising:
a lamp body including at least one solid dielectric material;
a power source to provide radio frequency (RF) power to the lamp body;
a probe configured to couple the power into the lamp body from the power source at a frequency such that the lamp body resonates in a fundamental resonant mode having an electric field maximum, the probe being located in the lamp body at a position spaced from the electric field maximum; and
a bulb positioned proximate the electric field maximum, the bulb containing a fill that forms a light emitting plasma when the power is received from the lamp body.

2. The electrodeless plasma lamp of claim 1, wherein the length an shape of the probe are such that power is over-coupled to the lamp body prior to plasma formation.

3. The electrodeless plasma lamp of claim 1, wherein the probe is located in the lamp body such that the power is over-coupled to the lamp body prior to plasma formation.

4. The electrodeless plasma lamp of claim 1, wherein the probe is positioned in the lamp body such that the source of the power is critically coupled to the lamp body during steady state operation after plasma formation.

5. The electrodeless plasma lamp of claim 1, wherein the probe is longer than the length that would be required for a probe positioned at the electric field maximum in order to provide maximum coupling efficiency from the probe to the bulb.

6. The electrodeless plasma lamp of claim 1, wherein the fundamental resonant mode is a transverse magnetic (TM) mode.

7. The electrodeless plasma lamp of claim 1, wherein the lamp body is circular cylindrical in shape having a height less than a diameter of the lamp body.

8. The electrodeless plasma lamp of claim 7, wherein the bulb is elongate and is positioned along an axis of rotational symmetry of the lamp body.

9. The plasma lamp of claim 7, wherein the lamp body has a planar base from which the probe extends, and a planar upper surface proximate to which the bulb is positioned.

10. The electrodeless plasma lamp of claim 1, wherein the lamp body is rectangular prism-shaped having a height less than a length of the lamp body.

11. The electrodeless plasma lamp of claim 1, wherein the lamp body has an outer surface that is coated with a metallic material except in regions where the power is coupled between the lamp body and the source and in a region where the power is coupled from the lamp body to the bulb.

12. The electrodeless plasma lamp of claim 1, wherein the bulb is elongate.

13. The electrodeless plasma lamp of claim 12, wherein a longitudinal axis of the bulb is aligned with the electric field maximum.

14. The electrodeless plasma lamp of claim 1, wherein a portion of the fill is located above a plane in which an upper surface of the lamp body lies.

15. The electrodeless plasma of claim 1, further comprising a feedback probe to obtain feedback from the lamp body, the feedback probe positioned in the body at a position that is not at the electric field maximum.

16. The electrodeless plasma lamp of claim 1, wherein an exposed end of the bulb is proximate metallic material that is grounded.

17. The electrodeless plasma lamp of claim 1, wherein the solid dielectric material has a dielectric constant greater than 2.

18. A method of generating light, the method comprising:
providing a lamp body;
providing a power source coupled to the lamp body by a probe, the power being provided at a frequency such that the lamp body resonates in a fundamental resonant mode having an electric field maximum, the probe being located in the lamp body at a position spaced from the electric field maximum;
providing a bulb positioned proximate the electric field maximum;
applying power from the power source to the lamp body through the probe; and
coupling at least a portion of the power from the lamp body to the fill to form a light-emitting plasma.

19. The method of claim 18, further comprising coupling power to a portion of the fill that is located above a plane in which an upper surface of the lamp body lies.

20. An electrodeless plasma lamp comprising:
a lamp body;
means for providing power to the lamp body via a probe, the power being provided at a frequency such that the lamp body resonates in a fundamental resonant mode having an electric field maximum, the probe being located in the lamp body at a position spaced from the electric field maximum; and
providing a bulb positioned proximate the electric field maximum, wherein at least a portion of the power is coupled from the lamp body to the fill to form a light-emitting plasma.

* * * * *

UNITED STATES PATENT AND TRADEMARK OFFICE
CERTIFICATE OF CORRECTION

| | | |
|---|---|---|
| PATENT NO. | : 8,125,153 B2 | Page 1 of 1 |
| APPLICATION NO. | : 12/392208 | |
| DATED | : February 28, 2012 | |
| INVENTOR(S) | : Frederick M. Espiau et al. | |

It is certified that error appears in the above-identified patent and that said Letters Patent is hereby corrected as shown below:

On the face page, in field (56), under "Other Publications", in column 2, line 4, delete "of Patents" and insert -- of the Patents --, therefor.

On the face page, in field (56), under "Other Publications", in column 2, line 5, delete "Cervasion" and insert -- Ceravision --, therefor.

In column 20, line 51, in Claim 2, delete "an" and insert -- and --, therefor.

In column 21, line 7, in Claim 9, delete "The plasma" and insert -- The electrodeless plasma --, therefor.

In column 21, line 27, in Claim 15, delete "plasma of" and insert -- plasma lamp of --, therefor.

Signed and Sealed this
Twenty-eighth Day of August, 2012

David J. Kappos
*Director of the United States Patent and Trademark Office*